United States Patent
Yoshioka

(10) Patent No.: US 7,395,808 B2
(45) Date of Patent: Jul. 8, 2008

(54) CONTROL SYSTEM OF INTERNAL COMBUSTION ENGINE

(75) Inventor: Mamoru Yoshioka, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 31 days.

(21) Appl. No.: 11/628,959

(22) PCT Filed: Jun. 14, 2005

(86) PCT No.: PCT/JP2005/011199

§ 371 (c)(1),
(2), (4) Date: Dec. 8, 2006

(87) PCT Pub. No.: WO2005/124131

PCT Pub. Date: Dec. 29, 2005

(65) Prior Publication Data

US 2007/0266991 A1    Nov. 22, 2007

(30) Foreign Application Priority Data

Jun. 17, 2004  (JP) .............................. 2004-179673
Apr. 28, 2005  (JP) .............................. 2005-131797

(51) Int. Cl.
*F02D 41/12*   (2006.01)
*F02M 23/08*   (2006.01)

(52) U.S. Cl. ........................ 123/325; 123/326; 123/327; 123/493

(58) Field of Classification Search ................. 123/325, 123/327, 493, 339.1, 339.14, 339.19
See application file for complete search history.

(56) References Cited

U.S. PATENT DOCUMENTS

| | | | | |
|---|---|---|---|---|
| 3,669,083 A | * | 6/1972 | Fort ............................ | 123/325 |
| 3,821,943 A | * | 7/1974 | Toda et al. ................... | 123/327 |
| 4,106,471 A | * | 8/1978 | Nakajima et al. ......... | 123/198 F |
| 4,207,845 A | * | 6/1980 | Semmler ..................... | 123/325 |
| 4,366,790 A | * | 1/1983 | DeBoynton ................. | 123/325 |
| 4,391,243 A | * | 7/1983 | Bessho ........................ | 123/325 |
| 4,434,759 A | * | 3/1984 | Iezuka et al. ................ | 123/325 |
| 4,481,923 A | * | 11/1984 | Ozaki ......................... | 123/320 |

(Continued)

FOREIGN PATENT DOCUMENTS

EP    0 866 219 A2    9/1998

(Continued)

*Primary Examiner*—Thomas N Moulis
(74) *Attorney, Agent, or Firm*—Oliff & Berridge, PLC

(57) ABSTRACT

There is provided a control system for controlling an internal combustion engine with an exhaust system provided with a catalyst, comprising a fuel cut means for stopping the supply of fuel to the internal combustion engine when the vehicle in which the internal combustion engine is mounted is in a decelerating state, the control system of an internal combustion engine characterized in that, in the case that the fuel cut is executed, when the speed SPD of the vehicle is higher than a predetermined first vehicle speed Sh, the intake air amount Ga of the internal combustion engine is made smaller than the intake air amount Gai of when the internal combustion engine is in the idling state (step 120), while when the speed SPD is the first vehicle speed Sh or less, the intake air amount Ga is made larger than the intake air amount Gai of when the internal combustion engine is in the idling state (step 130).

30 Claims, 24 Drawing Sheets

U.S. PATENT DOCUMENTS

| | | | | |
|---|---|---|---|---|
| 4,537,169 | A * | 8/1985 | Tsuge et al. | 123/325 |
| 4,570,592 | A * | 2/1986 | Otobe | 123/339.23 |
| 4,648,374 | A * | 3/1987 | Kobayashi et al. | 123/587 |
| 4,862,367 | A * | 8/1989 | Tada et al. | 701/93 |
| 4,877,101 | A * | 10/1989 | Tada et al. | 180/177 |
| 5,186,080 | A * | 2/1993 | Simon et al. | 477/109 |
| 5,289,807 | A * | 3/1994 | Yonekawa | 123/325 |
| 5,337,557 | A * | 8/1994 | Toyoda | 60/276 |
| 5,337,715 | A * | 8/1994 | Gonzales et al. | 123/325 |
| 5,722,363 | A * | 3/1998 | Iida et al. | 123/305 |
| 5,724,952 | A * | 3/1998 | Miyashita et al. | 123/688 |
| 6,128,899 | A * | 10/2000 | Oono et al. | 60/295 |
| 6,389,807 | B1 | 5/2002 | Suzuki et al. | |
| 6,394,069 | B1 * | 5/2002 | Kondo | 123/339.19 |
| 6,434,453 | B1 * | 8/2002 | Kuroda et al. | 701/22 |
| 6,526,745 | B1 | 3/2003 | Ogiso | |
| 6,739,295 | B1 * | 5/2004 | Yamaoka et al. | 123/90.15 |
| 6,876,918 | B2 * | 4/2005 | Kabe et al. | 701/110 |
| 7,249,583 | B2 * | 7/2007 | Bidner et al. | 123/198 DB |
| 2004/0250792 | A1 * | 12/2004 | Mizobuchi et al. | 123/322 |

FOREIGN PATENT DOCUMENTS

| | | |
|---|---|---|
| EP | 1 359 305 A2 | 11/2003 |
| JP | A 05-018295 | 1/1993 |
| JP | A 06-307271 | 11/1994 |
| JP | A 10-250411 | 9/1998 |
| JP | A 10-252532 | 9/1998 |
| JP | A 2001-107777 | 4/2001 |
| JP | A 2001-164970 | 6/2001 |
| JP | A 2001-182570 | 7/2001 |

* cited by examiner

CONTROL SYSTEM OF INTERNAL COMBUSTION ENGINE

TECHNICAL FIELD

The present invention relates to a control system of an internal combustion engine.

BACKGROUND ART

In the past, for the purpose of improving the fuel efficiency etc., there has been known a control system of an internal combustion engine suspending the supply of fuel to the internal combustion engine, that is, executing a fuel cut, when it is judged that the vehicle is in a decelerating state (for example, engine braking state) and the supply of fuel to the internal combustion engine mounted in that vehicle is not necessary.

Further, in such a control system of an internal combustion engine, while the fuel cut is in progress, air is prevented from flowing into the catalyst provided in the exhaust system of the internal combustion engine to prevent the catalyst from entering a state of excess oxygen and to suppress deterioration of the catalyst (for example, Japanese Patent Publication (A) No. 2001-182570).

DISCLOSURE OF THE INVENTION

However, when prohibiting the flow of air into the catalyst while a fuel cut is in progress in this way, while catalyst deterioration is suppressed, there was the problem that an odor was given off when stopping the vehicle after deceleration. This odor is the odor of hydrogen sulfide given off from the catalyst. The reason is believed to be that prohibiting the inflow of air into the catalyst while a fuel cut is in progress results in the catalyst not being supplied with oxygen during deceleration and, for this reason, the sulfur oxides which had been held in the catalyst turning to hydrogen sulfide and easily being released to the outside when the vehicle is stopped.

The present invention was made in consideration of this problem and has as its object the provision of a control system of an internal combustion engine provided with a fuel cut means for executing a fuel cut stopping the supply of fuel to the internal combustion engine mounted in a vehicle when the vehicle is in a decelerating state, the control system of internal combustion engine designed to suppress the deterioration of the catalyst provided in the exhaust system of the internal combustion engine accompanying the fuel cut and suppress the generation of an odor after deceleration.

The present invention provides the control systems of an internal combustion engine described in the claims as means for achieving the object.

According to a first aspect of the present invention, there is provided a control system for controlling an internal combustion engine with an exhaust system provided with a catalyst, comprising a fuel cut means for executing a fuel cut stopping the supply of fuel to the internal combustion engine when the vehicle in which the internal combustion engine is mounted is in a decelerating state, the control system of an internal combustion engine characterized in that, in the case that the fuel cut is executed, when the speed of the vehicle is higher than a predetermined first vehicle speed, the intake air amount of the internal combustion engine is made smaller than the intake air amount of when the internal combustion engine is in the idling state while, when the speed of the vehicle is the first vehicle speed or less, the intake air amount of the internal combustion engine is made larger than the intake air amount of when the internal combustion engine is in the idling state.

When the vehicle speed is in the high speed region, in general, the catalyst temperature is high and catalyst deterioration accompanying execution of the fuel cut easily occurs. In this connection, according to the first aspect, in the case that the fuel cut is executed, when the vehicle speed is relatively high, the intake air amount is reduced and thereby the amount of air flowing through the catalyst is reduced, so the catalyst is prevented from being placed in an excess oxygen state and occurrence of catalyst deterioration can be suppressed. On the other hand, when the vehicle speed is in the medium or low speed region, considering the fact that after this the vehicle speed may drop considerably or the vehicle may be stopped, the problem of an odor after deceleration is a concern. In this connection, in the first aspect, in the case that the fuel cut is executed, when the vehicle speed is in the medium or low speed region, the intake air amount is increased and thereby the amount of air flowing through the catalyst is made larger so that, during deceleration, the catalyst can be fed with sufficient oxygen and, after deceleration, the state where the sulfur oxides which had been held in the catalyst become hydrogen sulfide and are easily released to the outside can be suppressed. Further, as a result, the generation of an odor after deceleration can be suppressed.

The second aspect of the present invention provides the first aspect wherein the intake air amount of the internal combustion engine is controlled by a throttle valve and wherein, in the case that the fuel cut is executed and when the vehicle speed is higher than the first vehicle speed, the opening degree of the throttle valve is made smaller than the opening degree of when the internal combustion engine is in the idling state, while when the vehicle speed is the first vehicle speed or less, the opening degree of the throttle valve is made greater than the opening degree of when the internal combustion engine is in the idling state.

In the second aspect, the intake air amount of the internal combustion engine is controlled by a throttle valve to control the amount of air flowing through the catalyst. The second aspect, as well, can provide actions and effects similar to the first aspect.

A third aspect of the present invention provides the first aspect wherein, in the case that the fuel cut is executed and when the vehicle speed is higher than the first vehicle speed or a rotational speed of the internal combustion engine is higher than a predetermined rotational speed, the intake air amount of the internal combustion engine is made smaller than the intake air amount of when the internal combustion engine is in the idling state, while when the vehicle speed is the first vehicle speed or less and a rotational speed of the internal combustion engine is the predetermined rotational speed or less, the intake air amount of the internal combustion engine is made greater than the intake air amount of when the internal combustion engine is in the idling state.

In addition to when the vehicle speed is in the high speed region and even when the rotational speed of the internal combustion engine is in the high speed region, in general, the catalyst temperature is high and catalyst deterioration accompanying execution of a fuel cut easily occurs. In this connection, according to the third aspect, in the case that the fuel cut is executed and when the vehicle speed is relatively high or the rotational speed of the internal combustion engine is relatively high, the intake air amount is made smaller and thereby the amount of air flowing through the catalyst is made smaller, so the catalyst is prevented from being placed in an excess oxygen state and the occurrence of catalyst deterioration can be suppressed. On the other hand, when the vehicle speed is in the medium or low speed region and the rotational speed of the internal combustion engine is in the medium or low speed region, the vehicle speed may subsequently drop considerably or the vehicle may stop, so the problem of an odor after deceleration is a concern. In this connection, in the third aspect, in the case that the fuel cut is executed and when the vehicle speed is in the medium or low speed region and the rotational speed of the internal combustion engine is in the medium or low speed region, the intake air amount is increased and thereby the amount of air flowing through the catalyst is made larger, so during deceleration the catalyst can be supplied with sufficient oxygen and after deceleration the state where the sulfur oxides which had been held in the catalyst become hydrogen sulfide and are easily released to the outside can be suppressed. Further, as a result, the generation of an odor after deceleration can be suppressed.

A fourth aspect of the present invention provides the third aspect wherein the intake air amount of the internal combustion engine is controlled by a throttle valve and wherein, in the case that the fuel cut is executed and when the vehicle speed is higher than the first vehicle speed or a rotational speed of the internal combustion engine is higher than the predetermined rotational speed, the opening degree of the throttle valve is made smaller than the opening degree of when the internal combustion engine is in the idling state, while when the vehicle speed is the first vehicle speed or less and a rotational speed of the internal combustion engine is the predetermined rotational speed or less, the opening degree of the throttle valve is made larger than the opening degree of when the internal combustion engine is in the idling state.

In the fourth aspect, the intake air amount of the internal combustion engine is controlled by a throttle valve to control the amount of air flowing through the catalyst. The fourth aspect as well can give actions and effects similar to the third aspect.

A fifth aspect of the present invention provides a control system for controlling an internal combustion engine with an exhaust system provided with a catalyst, comprising a fuel cut means for executing a fuel cut stopping the supply of fuel to the internal combustion engine when the vehicle in which the internal combustion engine is mounted is in a decelerating state, the control system of internal combustion engine characterized in that, in the case that the fuel cut is executed and when the speed of the vehicle is higher than a predetermined first vehicle speed, the intake air amount of the internal combustion engine is made smaller than the intake air amount of when the internal combustion engine is in the idling state, while when the speed of the vehicle is the first vehicle speed or less and higher than a predetermined second vehicle speed lower than the first vehicle speed, the intake air amount of the internal combustion engine is made larger than the intake air amount of when the internal combustion engine is in the idling state.

The fifth aspect, as well, can provide actions and effects substantially the same as the first aspect.

A sixth aspect of the present invention provides the fifth aspect where the intake air amount of the internal combustion engine is controlled by a throttle valve and wherein, in the case that the fuel cut is executed and when the speed of the vehicle is higher than the first vehicle speed, the opening degree of the throttle valve is made smaller than the opening degree of when the internal combustion engine is in the idling state, while when the speed of the vehicle is the first vehicle speed or less and higher than the second vehicle speed, the opening degree of the throttle valve is made larger than the opening degree of when the internal combustion engine is in the idling state.

In the sixth aspect, the intake air amount of the internal combustion engine is controlled by a throttle valve to control the amount of air flowing through the catalyst. The sixth aspect as well can provide actions and effects similar to the fifth aspect.

A seventh aspect of the present invention provides a control system for controlling an internal combustion engine with an exhaust system provided with a catalyst, comprising a fuel cut means for executing a fuel cut stopping the supply of fuel to the internal combustion engine when a vehicle in which the internal combustion engine is mounted is in a decelerating state, the control system of internal combustion engine characterized in that, in the case that the fuel cut is executed, and when the speed of the vehicle is a predetermined first vehicle speed or less, the amount of air flowing through the catalyst is increased compared with when the speed of the vehicle is higher than the first vehicle speed.

An eighth aspect of the present invention provides a control system for controlling an internal combustion engine with an exhaust system provided with a catalyst, comprising a fuel cut means for executing a fuel cut stopping the supply of fuel to the internal combustion engine when a vehicle in which the internal combustion engine is mounted is in a decelerating state, the control system of internal combustion engine characterized in that, in the case that the fuel cut is executed and, when the speed of the vehicle is higher than a predetermined first vehicle speed, the opening degree of the throttle valve is made smaller than the opening degree of when the internal combustion engine is in the idling state, while when the speed of the vehicle is the first vehicle speed or less, the opening degree of the throttle valve is made larger than the opening degree of when the internal combustion engine is in the idling state.

A ninth aspect of the present invention provides the seventh aspect wherein in the case that the fuel cut is executed, when the speed of the vehicle is the first vehicle speed or less and the temperature of the catalyst is a predetermined catalyst temperature or less, the amount of air flowing through the catalyst is increased compared with when the speed of the vehicle is higher than the first vehicle speed or the temperature of the catalyst is higher than the predetermined catalyst temperature.

A 10th aspect of the present invention provides the eighth aspect wherein in the case that the fuel cut is executed and when the speed of the vehicle is higher than the first vehicle speed or the temperature of the catalyst is higher than a predetermined catalyst temperature, the opening degree of the throttle valve is made smaller than the opening degree of when the internal combustion engine is in the idling state, while when the speed of the vehicle is the first vehicle speed or less and the temperature of the catalyst is the predetermined catalyst temperature or less, the opening degree of the throttle valve is made larger than the opening degree of when the internal combustion engine is in the idling state.

An 11th aspect of the present invention provides a control system for controlling an internal combustion engine with an exhaust system provided with a catalyst, comprising a fuel cut means for executing a fuel cut stopping the supply of fuel to the internal combustion engine when the vehicle in which the internal combustion engine is mounted is in a decelerating state, the control system of an internal combustion engine characterized in that, in the case that the fuel cut is executed and when the speed of the vehicle is a predetermined first vehicle speed or less and is higher than a predetermined second vehicle speed lower than the first vehicle speed, the amount of air flowing through the catalyst is increased compared with when the speed of the vehicle is higher than the first vehicle speed.

A 12th aspect of the present invention provides a control system for controlling an internal combustion engine with an exhaust system provided with a catalyst, comprising a fuel cut means for executing a fuel cut stopping the supply of fuel to the internal combustion engine when the vehicle in which the internal combustion engine is mounted is in a decelerating state, the control system of an internal combustion engine characterized in that, in the case that the fuel cut is executed and when the speed of the vehicle is higher than a predetermined first vehicle speed, the opening degree of the throttle valve is made smaller than the opening degree of when the internal combustion engine is in the idling state, while when the speed of the vehicle is the first vehicle speed or less and higher than a predetermined second vehicle speed lower than the first vehicle speed, the opening degree of the throttle valve is made larger than the opening degree of when the internal combustion engine is in the idling state.

By the seventh to 12th aspects as well, deterioration of the catalyst provided in the exhaust system of the internal combustion engine accompanying the fuel cut can be suppressed and the generation of an odor after deceleration can be suppressed.

A 13th aspect of the present invention provides any one of the first to 12th aspects wherein the smaller the amount of oxygen held in the catalyst, the higher the first vehicle speed is set.

The smaller the amount of oxygen held in the catalyst, the greater the amount of air required to flow through the catalyst during deceleration for sufficiently suppressing the generation of an odor. According to the 13th aspect, the smaller the amount of oxygen held in the catalyst, the higher the first vehicle speed is set, so when the amount of oxygen held in the catalyst is relatively small, even if the vehicle speed is relatively high, the intake air amount is increased and thereby the amount of air flowing through the catalyst is made larger. As a result, the generation of an odor can be suppressed more reliably.

A 14th aspect of the present invention provides any one of the first to 12th aspects wherein the greater the maximum oxygen holding amount of the catalyst, the higher the first vehicle speed is set.

In general, the greater the maximum oxygen holding amount of the catalyst, the greater the amount of air required to flow through the catalyst during deceleration for sufficiently suppressing the generation of an odor. According to the 14th aspect, the greater the maximum oxygen holding amount of the catalyst, the higher the first vehicle speed is set, so when the maximum oxygen holding amount of the catalyst is relatively large, even when the vehicle speed is relatively high, the intake air amount is increased and thereby the amount of air flowing through the catalyst is made larger. As a result, the generation of an odor can be suppressed more reliably.

A 15th aspect of the present invention provides any one of the first to sixth aspects wherein the greater the maximum oxygen holding amount of the catalyst or the larger the degree of deceleration in the decelerating state, the larger the intake air amount of the internal combustion engine when making the intake air amount of the internal combustion engine larger than the intake air amount of when the internal combustion engine is in the idling state.

As explained above, the greater the maximum oxygen holding amount of the catalyst, the greater the amount of air required to flow through the catalyst during deceleration for sufficiently suppressing the generation of an odor. Therefore, to reliably suppress generation of an odor, the greater the maximum oxygen holding amount, the greater the amount of air which must be flowing through the catalyst in a certain time. Further, the greater the degree of deceleration of the vehicle, the shorter the time until the vehicle stops, so to reliably suppress generation of an odor, the greater the degree of deceleration of the vehicle, the shorter the time in which a sufficient amount of air must flow through the catalyst.

In this connection, in 15th aspect, the greater the maximum oxygen holding amount of the catalyst, or the greater the degree of deceleration in the decelerating state, the greater the intake air amount of the internal combustion engine when making the intake air amount of the internal combustion engine larger than the intake air amount of when the internal combustion engine is in the idling state and thereby the greater the amount of air flowing through the catalyst. Due to this, the greater the maximum oxygen holding amount or the greater the degree of deceleration, the greater the amount of air which can flow through the catalyst in a certain time and as a result the shorter the time in which a sufficient amount of air can flow through the catalyst, so it is possible to reliably suppress generation of an odor.

The 16th aspect of the present invention provides any one of the first to sixth aspects wherein when the degree of deceleration is larger than a predetermined deceleration degree in the decelerating state, compared to when the degree of deceleration is the predetermined deceleration degree or less, the intake air amount of the internal combustion engine when the intake air amount of the internal combustion engine is made greater than the intake air amount of when the internal combustion engine is in the idling state is increased.

When the degree of deceleration of the vehicle is large, the time until the vehicle stops becomes shorter, and, therefore, to reliably suppress generation of an odor, it is necessary to pass a sufficient amount of air through the catalyst faster. In this connection, in the 16th aspect, when the degree of deceleration is larger than a predetermined deceleration degree, compared to when the degree of deceleration is the predetermined deceleration degree or less, the intake air amount of the internal combustion engine when the intake air amount of the internal combustion engine is made greater than the intake air amount of when the internal combustion engine is in the idling state is increased and therefore the amount of air flowing through the catalyst is made larger, so a sufficient amount of air can be made to flow through the catalyst faster and generation of an odor can be reliably suppressed.

The 17th aspect of the present invention provides any one of the first to sixth aspects wherein when the brake is in an operating state in the decelerating state, compared to when the brake is in a nonoperating state, the intake air amount of the internal combustion engine when the intake air amount of the internal combustion engine is made greater than the intake air amount of when the internal combustion engine is in the idling state is increased.

When the brake is in an operating state, it is highly likely that the vehicle will be stopped shortly so, to reliably suppress generation of an odor, a sufficient amount of air has to be made to quickly flow through the catalyst. In this connection, in the 17th aspect, when the brake is in an operating state, compared to when the brake is in a nonoperating state, the intake air amount of the internal combustion engine when the intake air amount of the internal combustion engine is made greater than the intake air amount of when the internal combustion engine is in the idling state is increased, whereby the amount of air flowing through the catalyst is made larger, so a sufficient amount of air can be made to quickly pass through the catalyst and generation of an odor can be reliably suppressed.

The 18th aspect of the present invention provides any one of the first, third, and fifth aspects wherein when the cumulative value of the intake air amount of the internal combustion engine when a fuel cut is in progress is a predetermined cumulative value of the intake air amount or more, the intake air amount of the internal combustion engine is prohibited from being made smaller than the intake air amount of when the internal combustion engine is in the idling state while the fuel cut is in progress.

The 19th aspect of the present invention provides any one of the second, fourth, sixth, eighth, 10th, and 12th aspects wherein when the cumulative value of the intake air amount of the internal combustion engine when a fuel cut is in progress is a predetermined cumulative value of the intake air amount or more, the opening degree of the throttle valve is prohibited from being made smaller than the opening degree of when the internal combustion engine is in the idling state while the fuel cut is in progress.

When the vehicle speed is high or when the rotational speed of the internal combustion engine is high, if for example reducing the opening degree of the throttle valve to reduce the intake air amount, the negative pressure in the cylinder will become higher and downward oil leakage from the valve stem or upward oil leakage from the piston ring part will sometimes occur. For this reason, making the opening degree of the throttle valve smaller etc. to reduce the intake air amount is preferably limited to when necessary for suppression of catalyst deterioration. On the other hand, if a sufficient amount of air is flowing to the catalyst and the catalyst holds sufficient oxygen, even if the amount of flowing air is subsequently limited, there will be almost no effect of suppression of the catalyst deterioration.

As explained above, the 18th aspect provides any one of the first, third, and fifth aspects wherein when the cumulative value of the intake air amount of the internal combustion engine when a fuel cut is in progress is a predetermined cumulative value of the intake air amount or more, the intake air amount of the internal combustion engine is prohibited from being made smaller than the intake air amount of when the internal combustion engine is in the idling state while a fuel cut is in progress. Further, the 19th aspect provides any one of the second, fourth, sixth, eighth, 10th, and 12th aspects wherein when the cumulative amount of the intake air amount of the internal combustion engine when a fuel cut is in progress is a predetermined cumulative value of intake air amount or more, the opening degree of the throttle valve is prohibited from being made smaller than the opening degree of when the internal combustion engine is in the idling state while the fuel cut is in progress. The cumulative value of the intake air amount is considered to be the cumulative value of the amount of air flowing through the catalyst, so according to the 18th and 19th aspects, by suitably setting the predetermined cumulative value of the intake air amount, the effect of suppression of catalyst deterioration can be sufficiently obtained and occurrence of the downward oil leakage or upward oil leakage can be reduced.

The 20th aspect of the present invention provides any one of the seventh, ninth, and 11th aspects wherein the greater the maximum oxygen holding amount of the catalyst or the greater the degree of deceleration in the decelerating state, the larger the amount of the air flowing through the catalyst when making the amount of air flowing through the catalyst larger.

By the 20th aspect as well, substantially the same actions and effects as the 15th aspect can be obtained.

The 21st aspect of the present invention provides any one of the seventh, ninth, and 11th aspects wherein when the degree of deceleration is larger than a predetermined deceleration degree in the decelerating state, compared to when the degree of deceleration is the predetermined deceleration degree or less, the amount of air flowing through the catalyst when increasing the amount of air flowing through the catalyst is made larger.

By the 21st aspect as well, substantially the same actions and effects as the 16th aspect can be obtained.

The 22nd aspect of the present invention provides any one of the seventh, ninth, and 11th aspects wherein when the brake is in an operating state in the decelerating state, compared to when the brake is in a nonoperating state, the amount of air flowing through the catalyst when making the amount of air flowing through the catalyst larger is made larger.

By the 22nd aspect as well, substantially the same actions and effects as the 17th aspect can be obtained.

The 23rd aspect of the present invention provides any one of the seventh, ninth, and 11th aspects wherein when the cumulative value of the amount of air flowing through the catalyst when the fuel cut is in progress is a predetermined cumulative value of the catalyst flowing air amount or more, the amount of air flowing through the catalyst is prohibited from being made smaller than the amount of air flowing through the catalyst when the internal combustion engine is in the idling state while a fuel cut is in progress.

By the 23rd aspect as well, substantially the same actions and effects as the 18th and 19th aspects can be obtained.

The 24th aspect of the present invention provides any one of the eighth, 10th, and 12th aspects wherein the greater the maximum oxygen holding amount of the catalyst or the greater the degree of deceleration in the decelerating state, the greater the opening degree of the throttle valve when making the opening degree of the throttle valve larger than the opening degree of when the internal combustion engine is in the idling state.

By the 24th aspect as well, substantially the same actions and effects as the 15th aspect can be obtained.

The 25th aspect of the present invention provides any one of the eighth, 10th, and 12th aspects wherein when the degree of deceleration is larger than a predetermined deceleration degree in the decelerating state, compared to when the degree of deceleration is the predetermined deceleration degree or less, the opening degree of the throttle valve when making the opening degree of the throttle valve larger than the opening degree of when the internal combustion engine is in the idling state is increased.

By the 25th aspect as well, substantially the same actions and effects as the 16th aspect can be obtained.

The 26th aspect of the present invention provides any one of the eighth, 10th, and 12th aspects wherein when the brake is in an operating state in the decelerating state, compared to when the brake is in a nonoperating state, the opening degree of the throttle valve when making the opening degree of the throttle valve larger than the opening degree of when the internal combustion engine is in the idling state is increased.

By the 26th aspect as well, substantially the same actions and effects as the 17th aspect can be obtained.

The 27th aspect of the present invention provides a control system for controlling an internal combustion engine with an exhaust system provided with a catalyst, comprising a fuel cut means for executing a fuel cut stopping the supply of fuel to the internal combustion engine when a vehicle in which the internal combustion engine is mounted is in a decelerating state, the control system of internal combustion engine characterized in that, in the case that the fuel cut is executed, the higher the speed of the vehicle, the smaller the intake air amount of the internal combustion engine.

When the vehicle speed is in the high speed region, generally the catalyst temperature is high and catalyst deterioration accompanying the fuel cut easily occurs. On the other hand, when the vehicle speed is in the medium or low speed region, the vehicle speed may subsequently drop considerably or the vehicle may be stopped and therefore the problem of an odor after deceleration is possible. In this connection, in the 27th aspect, in the case that the fuel cut is executed, the higher the speed of the vehicle, the smaller the intake air amount of the internal combustion engine. That is, in the case that the fuel cut is executed, when the vehicle speed is relatively high, the intake air amount is reduced and thereby the amount of air flowing through the catalyst is reduced, while when the vehicle speed is in the medium or low speed region, the intake air amount is increased and thereby the amount of air flowing through the catalyst is made larger.

By doing this, when the vehicle speed is in the high speed region where catalyst deterioration easily occurs, the catalyst is prevented from being placed in a state of excess oxygen and the occurrence of catalyst deterioration can be suppressed, while when the vehicle speed is in the medium or low speed region where the problem of an odor after deceleration is feared, the catalyst can be supplied with sufficient oxygen and, after deceleration, the state where the sulfur oxides which had been held in the catalyst become hydrogen sulfide and are easily released to the outside can be suppressed and therefore the generation of an odor after deceleration can be suppressed. That is, by the 27th aspect, the deterioration of the catalyst provided in the exhaust system of the internal combustion engine accompanying the fuel cut can be suppressed and the generation of an odor after deceleration can be suppressed.

The 28th aspect of the present invention provides the 27th aspect wherein the greater the degree of deceleration in the decelerating state, the greater the intake air amount of the internal combustion engine is made when the fuel cut is executed.

As explained above, the greater the degree of deceleration of the vehicle, the shorter the time until the vehicle stops, so to reliably suppress generation of an odor, the greater the degree of deceleration of the vehicle, the shorter the time in which a sufficient amount of air must flow through the catalyst. In this connection, in the 28th aspect, the greater the degree of deceleration in the decelerating state, the greater the intake air amount of the internal combustion engine is made when the fuel cut is executed and thereby the greater the amount of air flowing through the catalyst. Due to this, the greater the degree of deceleration, the greater the amount of air which can flow through the catalyst in a certain time and as a result the shorter the time in which a sufficient amount of air can flow through the catalyst, so it is possible to reliably suppress generation of an odor.

The 29th aspect of the present invention provides any one of the first to 28th aspects wherein the fuel cut is suspended when a rotational speed of the internal combustion engine becomes a predetermined fuel cut suspension rotational speed or less, and the fuel cut suspension rotational speed is set lower the greater the intake air amount of the internal combustion engine when the fuel cut is in progress.

The greater the intake air amount of the internal combustion engine when a fuel cut is in progress, the less the possibility of the engine stalling when the fuel cut is suspended (when the fuel supply is restarted). For this reason, in this case, the fuel cut suspension rotational speed can be set low. Further, if setting the fuel cut suspension rotational speed low, the fuel cut execution time becomes longer by that amount, so a greater amount of air can flow through the catalyst and generation of an odor can be reliably suppressed. Due to this, according to the 29th aspect, it is possible to reliably suppress generation of an odor from the catalyst.

The 30th aspect of the present invention provides the 29th aspect wherein in the case that a fuel cut is in progress, when making the intake air amount of the internal combustion engine larger than the intake air amount of when the internal combustion engine is in the idling state, the fuel cut suspension rotational speed is set lower compared to when the intake air amount of the internal combustion engine is smaller than the intake air amount of when the internal combustion engine is in the idling state.

If making the intake air amount of the internal combustion engine greater than the intake air amount of when the internal combustion engine is in the idling state while a fuel cut is in progress, the possibility of the engine stalling when a fuel cut is suspended (when the supply of fuel is resumed) can be reduced by exactly the amount of increase of the intake air amount. For this reason, in this case, compared to when the intake air amount of the internal combustion engine is made smaller than the intake air amount of when the internal combustion engine is in the idling state, the fuel cut suspension rotational speed can be set lower. Further, when the fuel cut suspension rotational speed is set lower, as explained above, the fuel cut execution time becomes longer by that amount, so a greater amount of air can flow through the catalyst, and it is possible to reliably suppress generation of an odor. Due to this, by the 30th aspect, it is possible to reliably suppress generation of an odor from the catalyst.

Note that, the control systems of an internal combustion engine described in the claims exhibit the common effect that if executing a fuel cut stopping the supply of fuel to an internal combustion engine mounted in a vehicle when the vehicle is in a decelerating state, deterioration of the catalyst provided in the exhaust system of the internal combustion engine accompanying the fuel cut can be suppressed and generation of an odor after deceleration can be suppressed.

Below, the present invention will be more clearly understood from the attached drawings and the description of the preferred embodiments of the present invention.

BRIEF DESCRIPTION OF THE DRAWINGS

FIG. 16 is a flowchart showing the control routine of the operational control executed in a modified embodiment of the embodiment explained with reference to FIG. 14.

BEST MODE FOR WORKING THE INVENTION

Below, embodiments of the present invention will be explained in detail with reference to the drawings.

Figure 1:
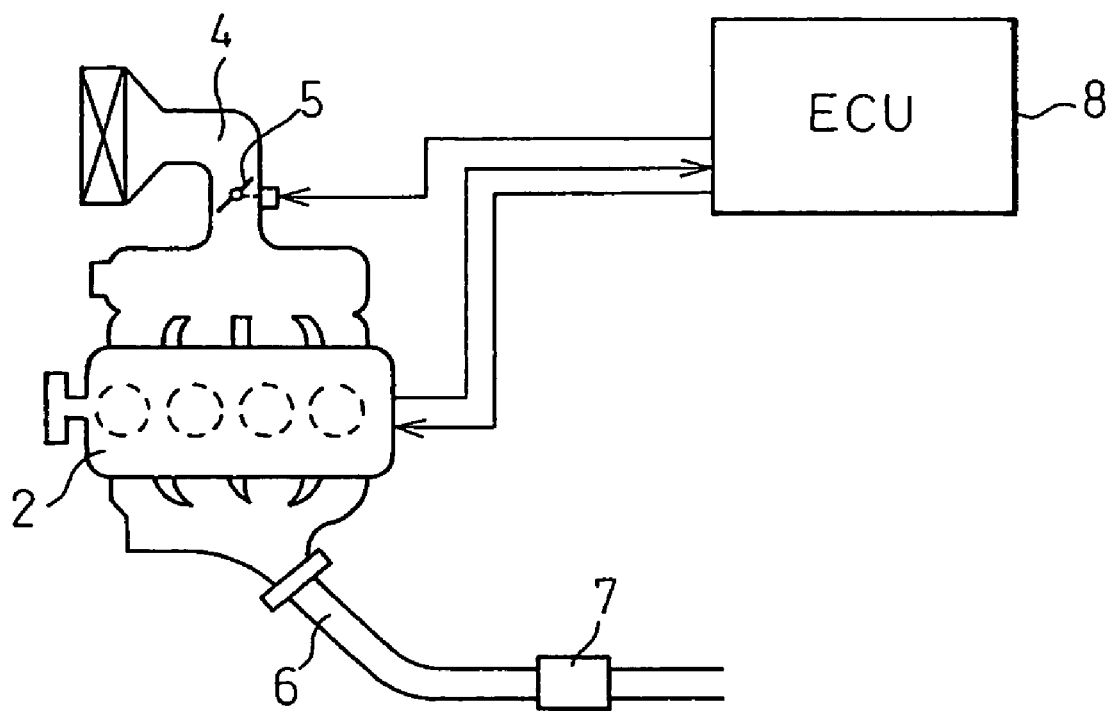
FIG. 1 is a view for explaining the case of application of the present invention to a gasoline engine mounted in a vehicle.
Figure 2:
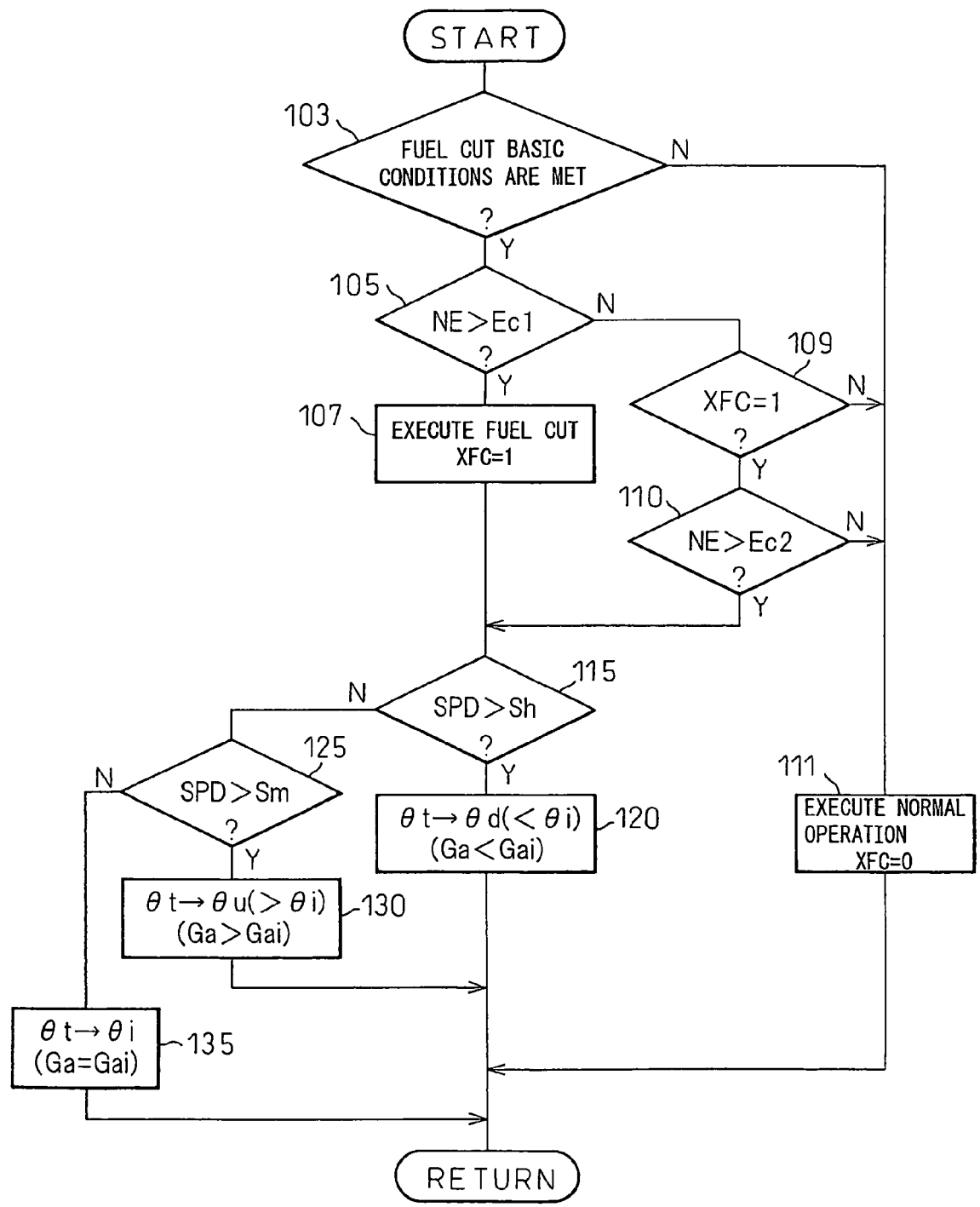
FIG. 2 is a flowchart showing a control routine of operational control executed in an embodiment of the present invention.

FIG. 1 is a view for explaining the case of applying the present invention to a gasoline engine mounted in a vehicle. In FIGS. 1, 2 indicates an internal combustion engine (engine) body, 4 indicates an intake passage, and 6 indicates an exhaust gas passage. The intake passage 4 is provided inside it with a throttle valve 5 for controlling the intake air amount of the internal combustion engine. Further, the exhaust gas passage 6 is provided with a three-way catalyst for purifying the exhaust gas (hereinafter simply referred to as a "catalyst") 7.

The electronic control unit (ECU) 8 is comprised of a known type of a digital computer provided with a CPU (central processing unit), RAM (random access memory), ROM (read only memory), and input/output ports connected by a bidirectional bus. It receives and sends signals with various types of sensor and drive devices to calculate parameters necessary for controlling the rotational speed of the internal combustion engine (engine rotational speed) and intake air amount, etc., and to control the combustion air-fuel ratio (the amount of fuel injection), the ignition timing, and various other aspects relating to engine operation based on the calculated parameters. Note that the above-mentioned throttle valve 5 is also connected to the ECU 8. Signals from the ECU 8 are used to control the throttle valve opening degree θt.

In the present embodiment, at the time of normal operation, first the required torque is found from the accelerator opening degree and engine rotational speed, next the required intake air amount Gar corresponding to the required torque is determined. Further, a signal from the ECU 8 is used to drive the throttle valve 5 so as to realize the required intake air amount Gar corresponding to the required torque and control the throttle valve opening degree θt. The fuel injector (not shown) is driven so as to realize the amount of fuel injection Qr corresponding to the actual intake air amount Ga accompanying the throttle valve opening degree θt.

Further, when the accelerator opening degree is zero and the vehicle speed is substantially zero and it is judged that the internal combustion engine is in an idling state, the intake air amount is made the predetermined idling intake air amount Gai and the throttle valve opening degree θt is made the predetermined idling throttle valve opening degree θi for realizing this idling intake air amount Gai. Further, the amount of fuel injection is made the amount of fuel injection Qi in accordance with the actual intake air amount accompanying this throttle valve opening degree θi.

Further, in the present embodiment, when it is judged that the vehicle mounting the internal combustion engine is in a decelerating state (for example, engine brake state), the supply of fuel to the internal combustion engine is stopped, that is, a "fuel cut" is executed. More specifically, in the present embodiment, when the vehicle is in a decelerating state and the accelerator opening degree is zero and the engine rotational speed is a predetermined rotational speed or more, in principle a fuel cut is executed. By executing this fuel cut, the fuel efficiency can be improved.

However, when such a fuel cut is executed, air flows into the catalyst provided in the exhaust system, so the catalyst would sometimes end up being placed in an excess oxygen state and being deteriorated. Therefore, to suppress catalyst deterioration accompanying this fuel cut, it is proposed to prevent air from flowing into the catalyst while a fuel cut is in progress.

However, when prohibiting the inflow of air into the catalyst while a fuel cut is in progress in this way, while catalyst deterioration can be suppressed, there was the problem that an odor, more specifically, a hydrogen sulfide ($H_2S$) odor, is given off at the time the vehicle is stopped after deceleration. Further, this problem is considered to arise due to the following reasons. That is, the catalyst provided in the exhaust system of the internal combustion engine (for example, three-way catalyst) generally has the action of holding sulfur oxides (SOx) formed by combustion of the sulfur ingredient in the fuel in the catalyst when the flowing exhaust gas has a lean air-fuel ratio. Further, when the catalyst holds sufficient oxygen (that is, when the catalyst is in the "oxidized state"), even when the air-fuel ratio of the flowing exhaust gas is the stoichiometric air-fuel ratio, the sulfur oxides in the exhaust gas can be held in the catalyst. Further, due to this action, during normal times when the internal combustion engine is operated with a combustion air-fuel ratio (that is, the air-fuel ratio in the combustion chamber) of the stoichiometric air-fuel ratio, the sulfur oxides in the exhaust gas are held in the catalyst provided in the exhaust system.

On the other hand, the catalyst has the property that when catalyst does not hold sufficient oxygen (that is, when the catalyst is in the "reduced state"), if the air-fuel ratio of the flowing exhaust gas is made rich or the stoichiometric air-fuel ratio, it will release the sulfur oxides held in the catalyst up to then. Further, the sulfur oxides released in the exhaust gas react with the hydrogen produced in the process of combustion of the fuel to form hydrogen sulfide which, when released to the outside, generates an odor (hydrogen sulfide odor).

Further, such an odor due to hydrogen sulfide seldom becomes a problem while the vehicle is moving since the exhaust gas easily diffuses, but when the vehicle is stopped, diffusion of the exhaust gas becomes difficult, so the odor remains in the surroundings and easily gives an unpleasant feeling to the passengers of the vehicle.

If considering the case of prohibiting the flow of air into the catalyst while a fuel cut is in progress during deceleration, since the flow of air into the catalyst is prohibited, the catalyst is not sufficiently supplied with oxygen during deceleration. As a result, after deceleration, the sulfur oxides which had been held in the catalyst form hydrogen sulfide which is easily released to the outside. In particular, in the case where an operation is continued before deceleration where the fuel is increased for the purpose of increasing the output and reducing the catalyst temperature so that the combustion air-fuel ratio is rich (fuel increment operation), the catalyst does not hold sufficient oxygen, so the possibility of the hydrogen sulfide being released to the outside becomes higher. Further, when as a result of the deceleration the vehicle speed falls considerably or the vehicle comes to a stop, as explained above, diffusion of the exhaust gas becomes difficult, so the possibility of the odor causing a problem becomes higher.

Therefore, in the embodiments of the present invention, to suppress catalyst deterioration and deal also with the problem of such an odor, special operational control is performed while the fuel cut is in progress. This operational control, simply speaking, is to reduce the amount of air flowing through the catalyst when the fuel cut is executed and the vehicle speed is in the high speed region and the amount of air flowing through the catalyst when the fuel cut is executed and the vehicle speed is in the medium or low speed region.

Further, by doing this, when the vehicle speed is in the high speed region where generally the catalyst temperature is high and catalyst deterioration easily occurs accompanying the fuel cut, the amount of air flowing through the catalyst is made smaller, the catalyst is prevented from being placed in an excess oxygen state and catalyst deterioration can be suppressed. Further, when the vehicle speed is in the medium or low speed region where the vehicle shortly being stopped is expected and the problem of odor after deceleration is feared, since the amount of air flowing through the catalyst is made larger, during deceleration the catalyst can be supplied with sufficient oxygen and after deceleration the state where the sulfur oxides which had been held in the catalyst become hydrogen sulfide and are easily released to the outside can be suppressed, as a result, the generation of an odor after deceleration can be suppressed.

Next, in the present embodiment, the operational control for suppression of catalyst deterioration and dealing with the problem of odor will be explained specifically with reference to FIG. 2. FIG. 2 is a flowchart of the control routine for executing this operational control. This control routine is executed by the ECU 8 by interruption every predetermined time.

When this control routine starts, first, at step 103, it is judged whether the fuel cut basic conditions are met. The fuel cut basic conditions in the present embodiment are that the vehicle is in a decelerating state and the accelerator opening degree is zero. At step 103, when it is judged that the fuel cut basic conditions are not met, the routine proceeds to step 111, where, as explained above, normal operation is executed where the amount of fuel injection and the intake air amount (throttle valve opening degree θt) are controlled based on the accelerator opening degree and the engine rotational speed, the fuel cut execute flag XFC is made "0", and the control routine ends (more specifically, the control routine is executed again from the start).

On the other hand, when it is judged at step 103 that the fuel cut basic conditions are met, the routine proceeds to step 105 where it is judged if the engine rotational speed NE is larger than a predetermined first engine rotational speed Ec1. This judgment is performed for preventing a fuel cut being started when the engine rotational speed NE is low and causing engine stalling. The predetermined first engine rotational speed Ec1 is determined by experiments etc. in advance based on this intent.

When it is judged at step 105 that the engine rotational speed NE is larger than the predetermined first engine rotational speed Ec1, the routine proceeds to step 107 where the fuel cut is executed and the fuel cut execute flag XFC is made "1", then the routine proceeds to step 115. On the other hand, when it is judged at step 105 that the engine rotational speed NE is the predetermined first engine rotational speed Ec1 or less, the routine proceeds to step 109 where it is judged whether the fuel cut execute flag XFC is "1". This judgment is judgment of whether a fuel cut is in progress.

When it is judged at step 109 that the fuel cut execute flag XFC is not "1", that is, a fuel cut is not in progress, the routine proceeds to step 111 wherein normal operation is executed. That is, in this case, the engine rotational speed NE is low, so if a fuel cut were started, it might cause the engine to stall. Therefore, normal operation is executed without any fuel cut. On the other hand, when it is judged at step 109 that the fuel cut execute flag XFC is "1", that is, a fuel cut is in progress, the routine proceeds to step 110 where it is judged if the engine rotational speed NE is larger than a predetermined second engine rotational speed Ec2. Here, this second engine rotational speed Ec2 is a value smaller than the first engine rotational speed Ec1.

Further, when it is judged at step 110 that the engine rotational speed NE is larger than the predetermined second engine rotational speed Ec2, the routine proceeds to step 115 while a fuel cut is in progress. On the other hand, when it is judged at step 110 that the engine rotational speed NE is the predetermined second engine rotational speed Ec2 or less, the routine proceeds to step 111 where the fuel cut is suspended and normal operation is returned to. In this case, the fuel cut is suspended, normal operation is started, the fuel cut execute flag XFC is made "0", and the control routine ends (more specifically, the control routine is executed again from the start).

In this way, in the present embodiment, separate from the engine rotational speed Ec1 for judging whether to start a fuel cut, an engine rotational speed Ec2 (<Ec1) for judging whether to suspend the fuel cut is set. Further, by providing hysteresis to the condition of the engine rotational speed relating to execution of a fuel cut in this way, repeated start and suspension of the fuel cut can be suppressed.

When the routine proceeds to step 115, it is judged if the current speed of the vehicle (vehicle speed) SPD is higher than a predetermined first vehicle speed Sh. Here, the first vehicle speed Sh is the vehicle speed where it is judged that catalyst deterioration easily occurs due to the high catalyst temperature etc. when the vehicle speed SPD is higher than it and is determined in advance by experiments etc. based on this idea.

When it is judged at step 115 that the vehicle speed SPD is higher than the first vehicle speed Sh, the routine proceeds to step 120. Further, at step 120, the throttle valve opening degree θt is made a predetermined opening degree θd smaller than the opening degree θi of when the internal combustion engine is in the idling state and the control routine ends in that state. That is, in this case, the throttle valve opening degree θt is made an opening degree θd smaller than the opening degree θi of when the internal combustion engine is in the idling state. As a result, the intake air amount Ga is made smaller than the intake air amount Gai of when the internal combustion engine is in the idling state (for example, is made half of the intake air amount Gai of the time of the idling state) and the control routine ends (more specifically, the control routine is executed again from the start).

On the other hand, when it is judged at step 115 that the vehicle speed SPD is the first vehicle speed Sh or less, the routine proceeds to step 125. At this step 125, it is judged whether the current vehicle speed SPD is higher than a predetermined second vehicle speed Sm. Here, the second vehicle speed Sm is a vehicle speed lower than the first vehicle speed Sh and a vehicle speed where the internal combustion engine is judged to be substantially in the idling state when the vehicle speed SPD is below it and is determined in advance by experiments etc. based on this idea.

When it is judged at step 125 that the vehicle speed SPD is higher than the second vehicle speed Sm, the routine proceeds to step 130. Further, at step 130, the throttle valve opening degree θt is made a predetermined opening degree θu larger than the opening degree θi of when the internal combustion engine is in the idling state and the control routine ends in that state. That is, in this case, the throttle valve opening degree θt is made an opening degree θu larger than the opening degree θi of when the internal combustion engine is in the idling state and, as a result, the intake air amount Ga is made greater than the intake air amount Gai of when the internal combustion engine is in the idling state and the control routine ends (more specifically, the control routine is executed again from the start).

On the other hand, when it is judged at step 125 that the vehicle speed SPD is the second vehicle speed Sm or less, the routine proceeds to step 135. When the routine proceeds to step 135, the throttle valve opening degree θt is made the opening degree θi of when the internal combustion engine is in the idling state and the control routine ends in that state. That is, in this case, the throttle valve opening degree θt is made the opening degree θi of when the internal combustion engine is in the idling state and, as a result, the intake air amount Ga is made the intake air amount Gai of when the internal combustion engine is in the idling state and the control routine ends (more specifically, the control routine is executed again from the start).

As explained above, when executing the control routine shown in FIG. 2, when the fuel cut is executed and the vehicle speed is higher than a predetermined first vehicle speed Sh, the throttle valve opening degree θt is made smaller than the opening degree θi of when the internal combustion engine is in the idling state and the intake air amount Ga of the internal combustion engine is made smaller than the intake air amount Gai of when the internal combustion engine is in the idling state, while when the fuel cut is executed and the vehicle speed is the first vehicle speed or less and higher than a predetermined second vehicle speed lower than the first vehicle speed, the throttle valve opening degree θt is made larger than the opening degree θi of when the internal combustion engine is in the idling state and the intake air amount Ga of the internal combustion engine is made larger than the intake air amount Gai of when the internal combustion engine is in the idling state.

Here, if considering the fact that when a fuel cut is being executed, the intake air amount Ga of the internal combustion engine become equal to the amount of air flowing through the catalyst provided in the exhaust system, when executing the control routine shown in FIG. 2, the amount of air flowing through the catalyst is reduced when the vehicle speed is higher than a predetermined first vehicle speed Sh, while the amount of air flowing through the catalyst is increased when the vehicle speed is the first vehicle speed or less and higher than the second vehicle speed.

Further, as explained above, if doing this, when the vehicle speed is in the high speed region where generally the catalyst temperature is high and catalyst deterioration accompanying the fuel cut easily occurs, the amount of air flowing through the catalyst is reduced, the catalyst is prevented from being placed in an excess oxygen state, and catalyst deterioration can be suppressed. Further, when the vehicle speed is in the medium or low speed region where the vehicle is expected to shortly stop and the problem of odor after deceleration is feared, the amount of air flowing through the catalyst is made larger, during deceleration the catalyst can be supplied with sufficient oxygen, and after deceleration the state where the sulfur oxides which had been held in the catalyst become hydrogen sulfide and are easily released to the outside can be suppressed, so as a result, the generation of an odor after deceleration can be suppressed.

Note that, in the explanation of the above embodiment, the first vehicle speed Sh was determined considering suppression of catalyst deterioration, but as clear from the explanation up to now, it is preferably determined further considering suppression of generation of odor. That is, for example, a vehicle speed of the vehicle speed Y or more where the necessary amount of air for sufficiently suppressing the generation of odor can flow through the catalyst until the vehicle stops in the case that the amount of air flowing through the catalyst is increased as explained above when the vehicle speed SPD becomes the vehicle speed Y or less, is made the first vehicle speed Sh.

Below, other embodiments of the present invention will be explained. Note that the embodiments explained below have many parts in common with the above-mentioned embodiment in terms of configuration and actions and effects. The explanation of these common parts will in principle be omitted.

Figure 3:
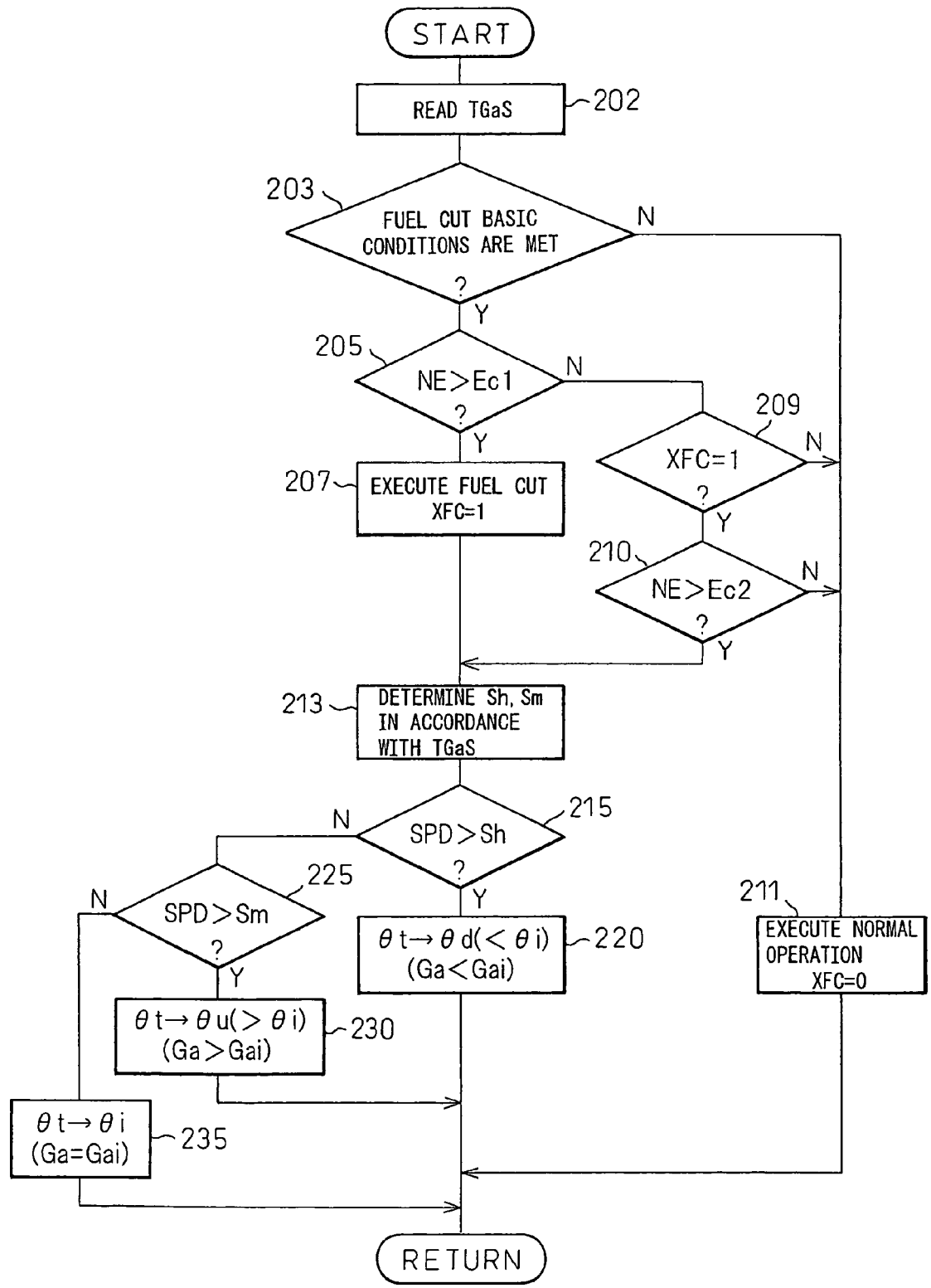
FIG. 3 is a flowchart showing a control routine of operational control executed in another embodiment of the present invention.

In the embodiment explained next with reference to FIG. 3, the smaller the amount of oxygen held in the catalyst 7, the higher the first vehicle speed Sh is set. FIG. 3 is a flowchart showing an example of a control routine for executing such operation control.

Normally, the smaller the amount of oxygen held in the catalyst 7, the greater the amount of air required to flow through the catalyst 7 during deceleration to place the catalyst 7 in the oxidized state to sufficiently suppress generation of an odor. According to the present embodiment, the smaller the amount of oxygen held in the catalyst 7, the higher the first vehicle speed Sh is set, so when the amount of oxygen held in the catalyst 7 is comparatively small, even when the vehicle speed SPD is relatively high, the intake air amount Ga is made larger and therefore the amount of air flowing through the catalyst 7 is made larger. As a result, the generation of an odor can be suppressed more reliably.

Referring to FIG. 3, this control routine is substantially the same as the control routine shown in FIG. 2. It differs in the point that step 202 is provided before step 203 corresponding to step 103 of FIG. 2 and in the point that step 213 is provided before step 215 corresponding to step 115 of FIG. 2.

That is, when this control routine starts, first, at step 202, the cumulative value TGaS of the intake air-amount after the end of the fuel increment operation is read, then the routine proceeds to step 203. Here, the "fuel increment operation" is an operation wherein the fuel is increased and the combustion air-fuel ratio is made rich for the purpose of increasing the output and/or reducing the catalyst temperature, but when this fuel increment operation is performed, the catalyst enters a reduced state, so it is believed that the cumulative value TGaS of the intake air amount after the end of the fuel increment operation is proportional to the amount of oxygen held in the catalyst 7. Therefore, in the present embodiment, the cumulative value TGaS is used as an indicator expressing the amount of oxygen held in the catalyst 7. Note that, here, as the intake air amount Ga for finding the cumulative value TGaS, the intake air amount Ga estimated from the operating state of the internal combustion engine etc. may also be used. It is also possible to provide an air flow meter and use its detection value. The cumulative value TGaS is calculated by the ECU 8 based on the obtained value of the intake air amount Ga.

Further, at the step 213, the first vehicle speed Sh and second vehicle speed Sm are determined in accordance with the cumulative value TGaS obtained at step 202. These first vehicle speed Sh and second vehicle speed Sm are used as judgment standards at step 215 corresponding to step 115 of FIG. 2 and at step 225 corresponding to step 125 of FIG. 2, respectively.

Figure 4:
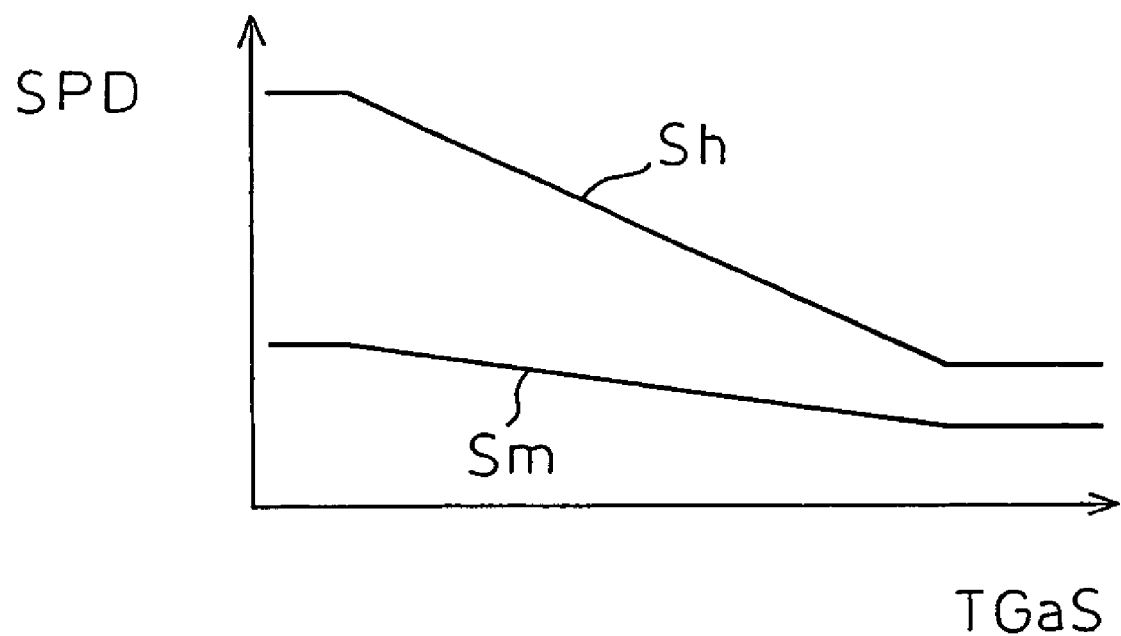
FIG. 4 is a map for finding the first vehicle speed Sh and second vehicle speed Sm used as the judgment standard at step 215 and step 225 of FIG. 3 based on the cumulative value TGaS of the intake air amount after the end of the fuel increment operation.

The first vehicle speed Sh and second vehicle speed Sm are determined at step 213 using for example the map shown in FIG. 4. This maps the first vehicle speed Sh and second vehicle speed Sm suitable for the different values of the cumulative value TGaS found in advance. As shown in the map of FIG. 4, in the present embodiment, the smaller the cumulative value TGaS (that is, the smaller the amount of oxygen held in the catalyst 7), the higher the first vehicle speed Sh and second vehicle speed Sm tend to be. This trend is stronger in particular for the first vehicle speed Sh. This means that the smaller the cumulative value TGaS (that is, the smaller the amount of oxygen held in the catalyst), the broader and higher the speed region where the amount of air flowing through the catalyst is made larger while a fuel cut is executed.

As clear from the above explanation and from FIG. 3 and FIG. 4, when executing the control routine shown in FIG. 3, the smaller the amount of oxygen held in the catalyst 7, the higher the first vehicle speed Sh is set. Further, as explained above, by doing this, when the amount of oxygen held in the catalyst 7 is relatively small, even when the vehicle speed SPD is relatively high, the intake air amount Ga is made larger and thereby the amount of air flowing through the catalyst 7 is made larger, so generation of an odor can be suppressed more reliably.

Figure 5:
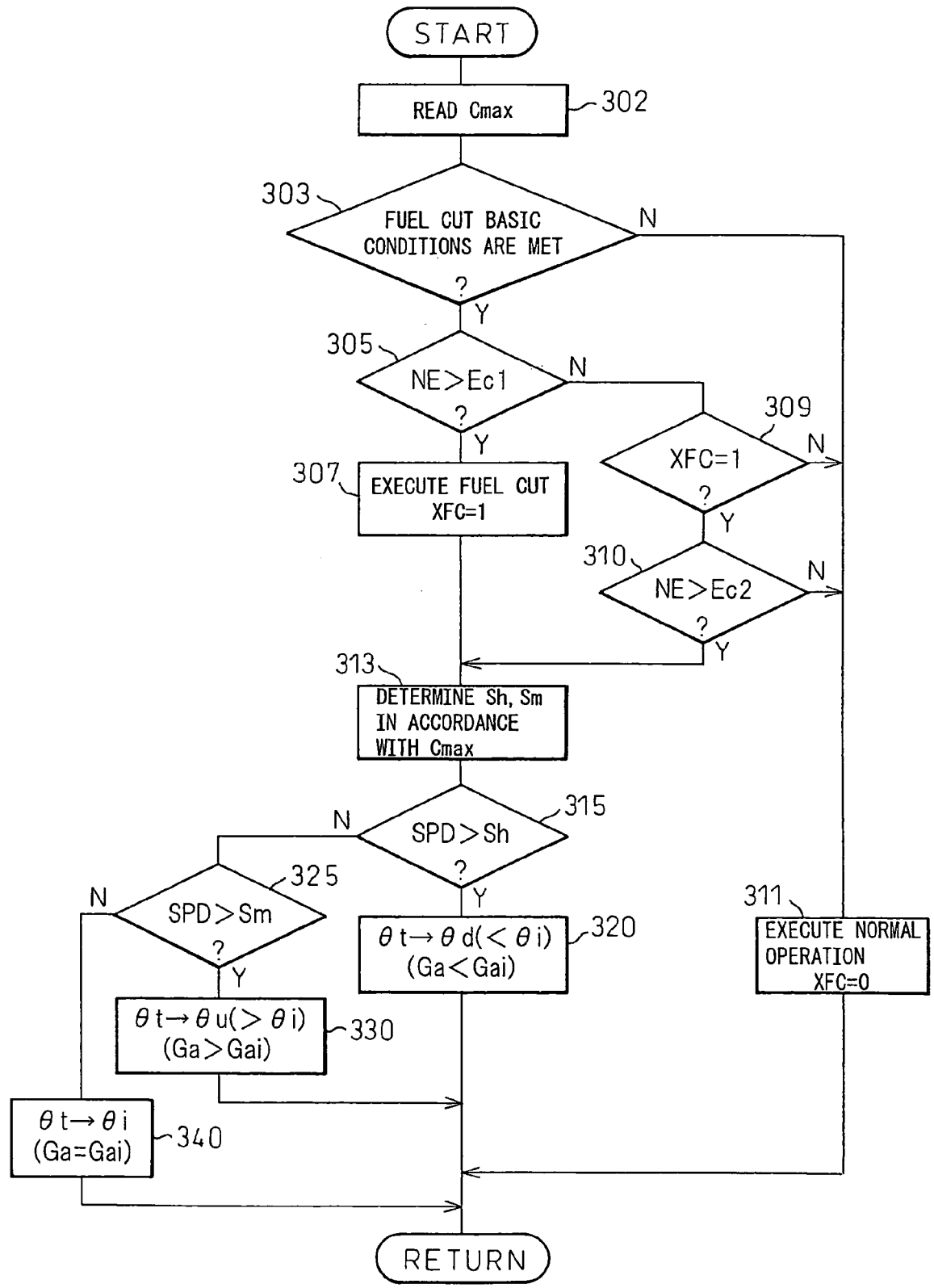
FIG. 5 is a flow chart showing a control routine of operation control executed in still another embodiment of the present invention.

Next, still another embodiment will be explained while referring to FIG. 5. In this embodiment, the larger the maximum oxygen holding amount Cmax of the catalyst 7, the higher the first vehicle speed Sh is set. FIG. 5 is a flowchart showing an example of a control routine for executing this operation control.

In general, the larger the maximum oxygen holding amount Cmax of the catalyst 7, the larger the amount of air required to flow through the catalyst 7 during deceleration to place the catalyst 7 in an oxidized state so as to sufficiently suppress the generation of an odor. According to the present embodiment, the larger the maximum oxygen holding amount Cmax of the catalyst 7, the higher the first vehicle speed Sh is set, so when the maximum oxygen holding amount Cmax of the catalyst 7 is relatively large, even if the vehicle speed Sh is relatively high, the intake air amount Ga is made larger and thereby the amount of air flowing through the catalyst 7 is made larger. As a result, the generation of an odor can be suppressed more reliably.

Referring to FIG. 5, this control routine is substantially the same as the control routine shown in FIG. 2. It differs in the point that step 302 is provided before step 303 corresponding to step 103 of FIG. 2 and in the point that step 313 is provided before step 315 corresponding to step 115 of FIG. 2.

That is, when this control routine starts, first, at step 302, the maximum oxygen holding amount Cmax of the catalyst 7 is read, then the routine proceeds to step 303. Here, the "maximum oxygen holding amount Cmax" is the maximum amount of oxygen which the catalyst 7 can hold and is found periodically. Note that the maximum oxygen holding amount Cmax can be found by various methods. For example, when a fuel cut etc. is executed, the catalyst 7 is placed in an oxidized state, then the rich operation wherein the combustion air-fuel ratio is made rich is performed, the maximum oxygen holding amount Cmax is estimated as being larger the longer the time after the start of the rich operation until the air-fuel ratio of the exhaust gas flowing out from the catalyst 7 becomes rich. Therefore, for example, if finding and mapping in advance the relationship between the time until the air-fuel ratio of the exhaust gas becomes rich and the maximum oxygen holding amount Cmax, the time until the air-fuel ratio of the exhaust gas becomes rich can be measured to find the maximum oxygen holding amount Cmax.

Further, at the step 313, the first vehicle speed Sh and second vehicle speed Sm are determined in accordance with the maximum oxygen holding amount Cmax fetched at step 302. These first vehicle speed Sh and second vehicle speed Sm are used as judgment standards at step 315 corresponding to step 115 of FIG. 2 and at step 325 corresponding to step 125 of FIG. 2, respectively.

Figure 6:
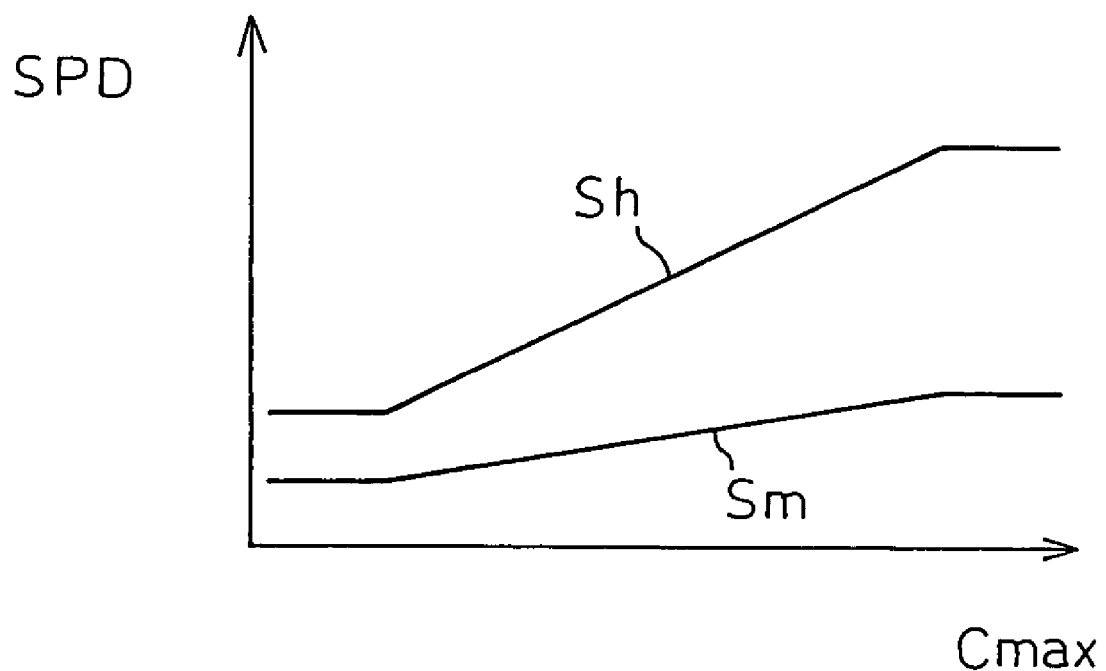
FIG. 6 is a map for finding the first vehicle speed Sh and second vehicle speed Sm used as the judgment standard at step 315 and step 325 of FIG. 5 based on the maximum oxygen holding amount Cmax of the catalyst.

The first vehicle speed Sh and second vehicle speed Sm are determined at step 313 using the map shown in for example FIG. 6. This is a map of the first vehicle speed Sh and second vehicle speed Sm suitable for the different values of the maximum oxygen holding amount Cmax found in advance. As shown in the map of FIG. 6, in the present embodiment, the larger the maximum oxygen holding amount Cmax of the catalyst 7, the higher the first vehicle speed Sh and second vehicle speed Sm tend to be. In particular, this trend is stronger for the first vehicle speed Sh. This means that the larger the maximum oxygen holding amount Cmax of the catalyst 7, the broader and higher the speed region where the amount of air flowing through the catalyst is made larger when a fuel cut is executed.

As clear from the above explanation and FIG. 5 and FIG. 6, when executing the control routine shown in FIG. 5, the larger the maximum oxygen holding amount Cmax of the catalyst 7, the higher the first vehicle speed Sh is set. Further, as explained above, if doing this, when the maximum oxygen holding amount Cmax of the catalyst 7 is relatively large, even if the vehicle speed SPD is relatively high, the intake air amount Ga is made larger and thereby the amount of air flowing through the catalyst 7 is made larger, so the more reliably the generation of an odor can be suppressed.

Figure 7:
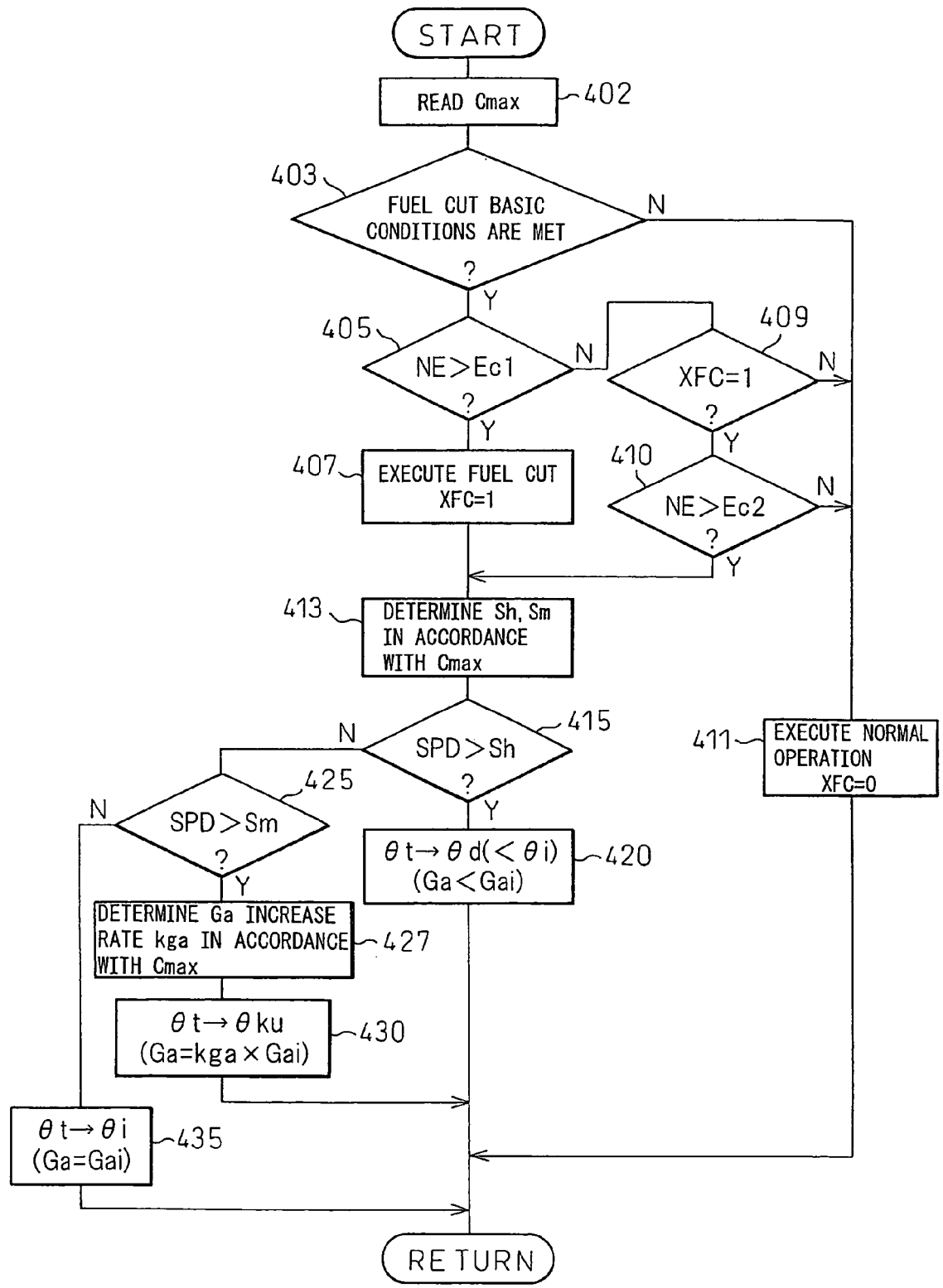
FIG. 7 is a flow chart showing a control routine of operation control executed in still another embodiment of the present invention.

Next, still another embodiment will be explained with reference to FIG. 7. In this embodiment, the larger the maximum oxygen holding amount Cmax of the catalyst 7, the larger the intake air amount Ga of the internal combustion engine at the time when the speed SPD of the vehicle is the first vehicle speed Sh or less and higher than the second vehicle speed Sm. FIG. 7 is a flowchart showing an example of a control routine for executing this operational control.

As explained above, the greater the maximum oxygen holding amount Cmax of the catalyst 7, the greater the amount of air required to flow through the catalyst 7 during deceleration to sufficiently suppress the generation of an odor. Therefore, to reliably suppress generation of an odor, the greater the maximum oxygen holding amount Cmax, the greater the amount of air which must flow through the catalyst 7 in a certain time. In this connection, in the present embodiment, the greater the maximum oxygen holding amount Cmax of the catalyst 7, the larger the intake air amount Ga of the internal combustion engine at the time when the speed SPD of the vehicle is the first vehicle speed Sh or less and higher than the second vehicle speed Sm and thereby the larger the amount of air flowing through the catalyst. Due to this, the greater the maximum oxygen holding amount Cmax, the greater the amount of air which can flow through the catalyst in a certain time, so generation of an odor can be reliably suppressed.

Referring to FIG. 7, this control routine is substantially the same as the control routine shown in FIG. 5. It differs only in the content of the control performed when it is judged at step 425 corresponding to step 325 of FIG. 5 that the current vehicle speed SPD is larger than the second vehicle speed Sm (step 427 and step 430).

Figure 8:
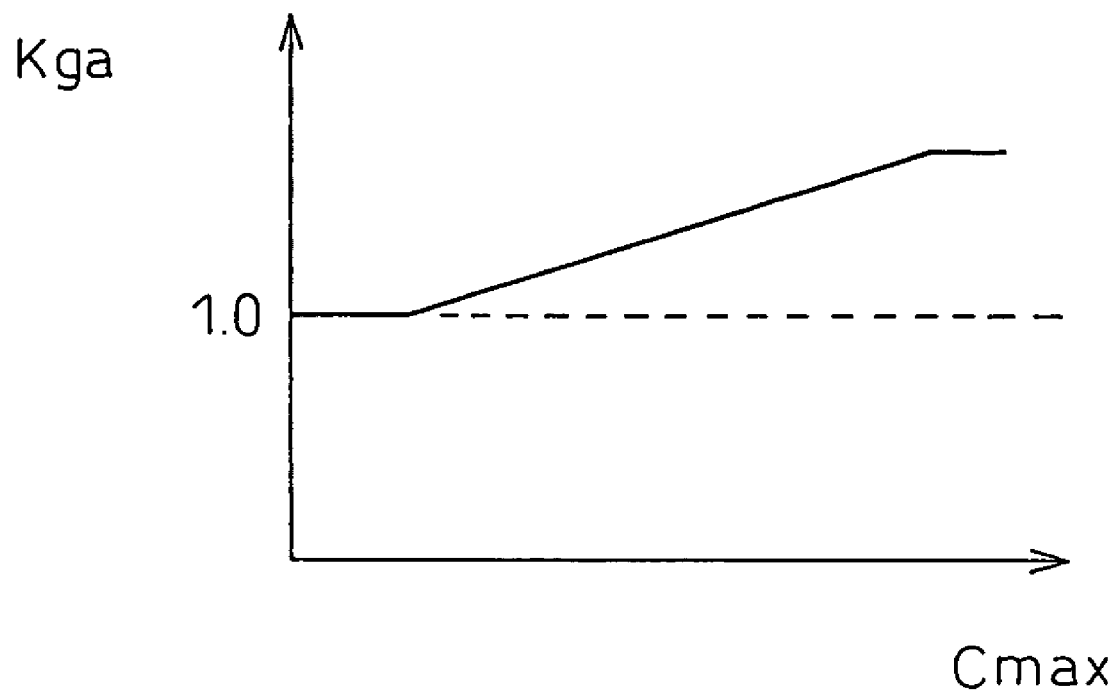
FIG. 8 is a map for finding the increase rate kga of the intake air amount based on the maximum oxygen holding amount Cmax of the catalyst.

That is, in this control routine, when it is judged at step 425 that the current vehicle speed SPD is larger than the second vehicle speed Sm, the routine proceeds to step 427. Further, at step 427 the increase rate kga of the intake air amount is determined in accordance with the maximum oxygen holding amount Cmax of the catalyst 7. This increase rate kga is determined for example using the map as shown in FIG. 8. This maps the suitable increase rates kga corresponding to the different values of the maximum oxygen holding amount Cmax found previously. As shown by the map of FIG. 8, in the present embodiment, the greater the maximum oxygen holding amount Cmax of the catalyst 7, the larger the value of the increase rate kga tends to become.

When the increase rate kga is determined at step 427, the routine proceeds to step 430 where the throttle valve opening degree θt is made the opening degree Oku where the intake air amount Ga becomes the intake air amount which is the product of the increase rate kga and the idling intake air amount Gai. Due to this, the intake air amount Ga becomes the intake air amount which is the product of the increase rate kga and the idling intake air amount Gai and the control routine ends in that state (more specifically, the control routine is executed again from the start).

As clear from the above explanation and FIG. 7 and FIG. 8, when executing the control routine shown in FIG. 7, the greater the maximum oxygen holding amount Cmax of the catalyst 7, the greater the intake air amount Ga of the internal combustion engine at the time when the speed SPD of the vehicle is the first vehicle speed Sh or less and higher than the second vehicle speed Sm. Further, as explained above, by doing this, the greater the maximum oxygen holding amount Cmax, the greater the amount of air which can flow through the catalyst 7 in a certain time, and therefore the more reliably generation of an odor can be suppressed.

Figure 9:
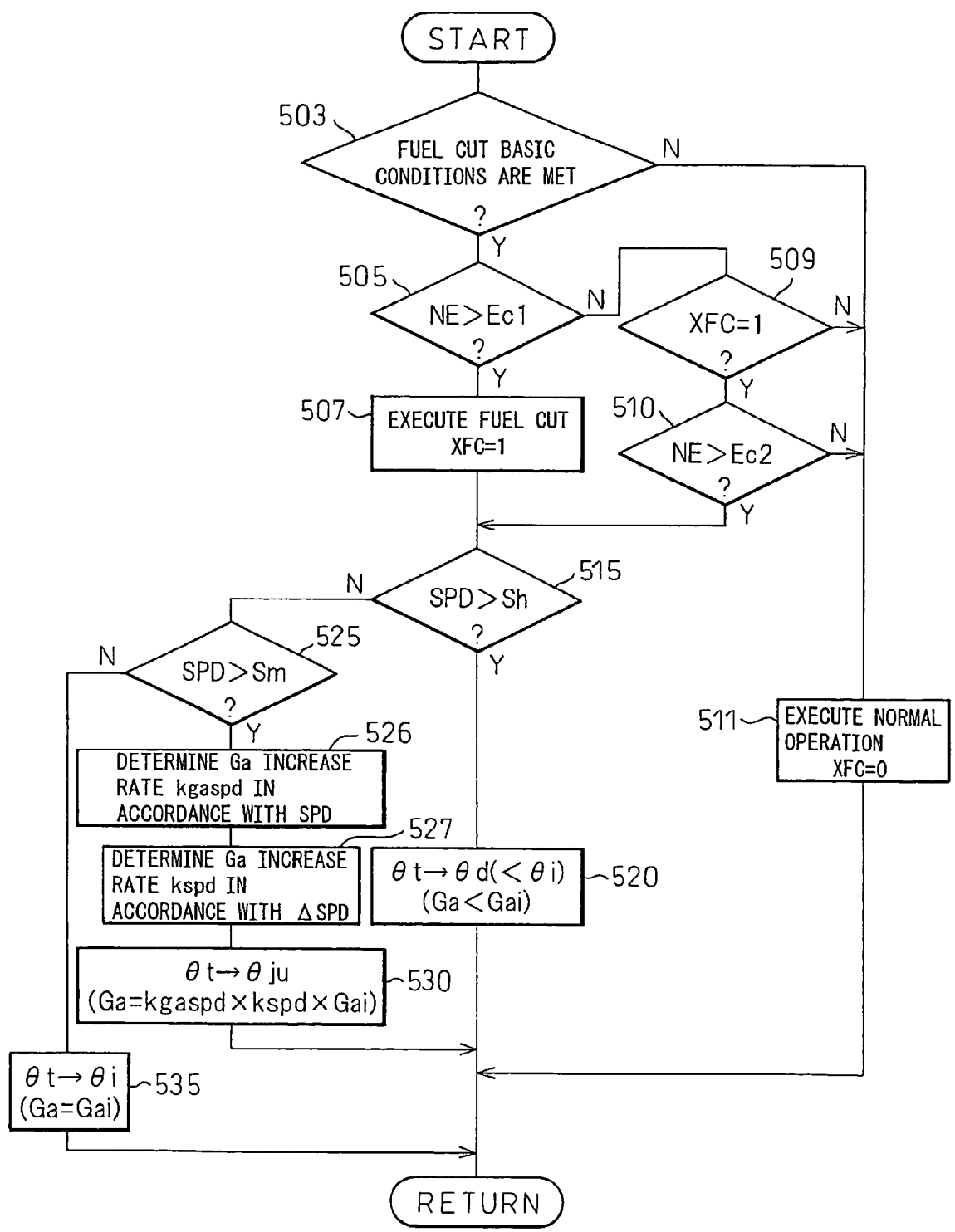
FIG. 9 is a flow chart showing a control routine of operation control executed in still another embodiment of the present invention.

Next, still another embodiment will be explained with reference to FIG. 9. In this embodiment, the greater the degree of deceleration in the decelerating state, the greater the intake air amount Ga of the internal combustion engine at the time when the speed SPD of the vehicle is the first vehicle speed Sh or less and higher than the second vehicle speed Sm. FIG. 9 is a flowchart showing an example of a control routine for executing this operation control.

The greater the degree of deceleration of the vehicle, the shorter the time until the vehicle stops so, to reliably suppress generation of an odor, the greater the degree of deceleration of the vehicle, the shorter the time in which a sufficient amount of air has to flow through the catalyst 7. In this connection, in the present embodiment, the greater the degree of deceleration in the decelerating state, the greater the intake air amount Ga of the internal combustion engine at the time when the speed SPD of the vehicle is the first vehicle speed Sh or less and higher than the second vehicle speed Sm and thereby the greater the amount of air flowing through the catalyst. Due to this, the greater the degree of deceleration, the shorter the time in which a sufficient amount of air can flow through the catalyst and the more reliably generation of an odor can be suppressed.

Referring to FIG. 9, this control routine is substantially the same as the control routine shown in FIG. 2. The only difference is the content of the control performed when it is judged at step 525 corresponding to step 125 of FIG. 2 that the current vehicle speed SPD is larger than the second vehicle speed Sm (steps 526, 527, and 530).

That is, in this control routine, when it is judged at step 525 that the current vehicle speed SPD is larger than the second vehicle speed Sm, the routine proceeds to step 426. Further, here, the increase rate kgaspd of the intake air amount Ga is determined in accordance with the current vehicle speed SPD. This increase rate kgaspd is determined for example using the map shown in FIG. 10. This maps suitable increase rates kgaspd corresponding to different values of the vehicle speed SPD found previously.

Figure 11:
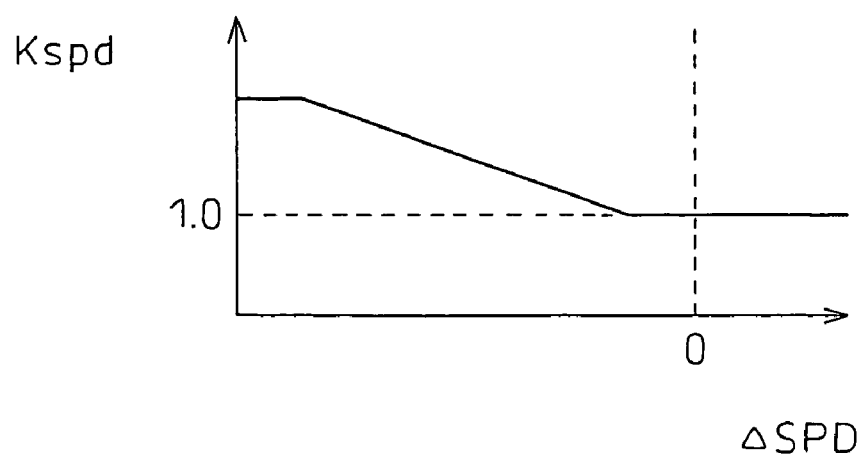
FIG. 11 is a map for finding the increase rate kspd of the intake air amount based on the acceleration ΔSPD of the vehicle (or deceleration degree).

When the increase rate kgaspd of the intake air amount Ga corresponding to the vehicle speed SPD is determined at step 526, the routine proceeds to step 527 where this time the increase rate kspd of the intake air amount Ga is determined in accordance with the acceleration ΔSPD of the vehicle (or deceleration degree). Further, this increase rate kspd is determined using for example the map as shown in FIG. 11. This maps suitable increase rates kspd corresponding to different values of the acceleration ΔSPD found in advance. As shown by the map of FIG. 11, in the present embodiment, the smaller the acceleration ΔSPD, in other words, the greater the degree of deceleration of the vehicle, the larger the value of the increase rate kspd tends to become.

When the increase rate kspd is determined at step 527, the routine proceeds to step 530 where the throttle valve opening degree θt is made the opening degree θju where the intake air amount Ga becomes the intake air amount which is the product of the increase rate kgaspd and the increase rate kspd and the idling intake air amount Gai. Due to this, the intake air amount Ga becomes the intake air amount which is the product of the increase rate kgaspd and the increase rate kspd and the idling intake air amount Gai and the control routine ends in that state (more specifically, the control routine is executed again from the start).

Figure 10:
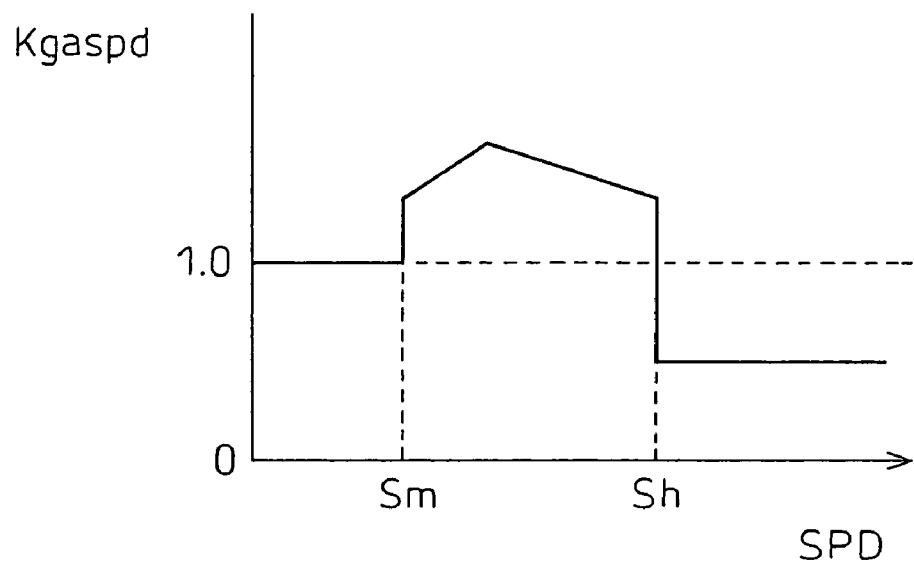
FIG. 10 is a map for finding the increase rate Kgaspd of the intake air amount based on the vehicle speed SPD.

As clear from the above explanation and FIGS. 9, 10, and 11, when the control routine shown in FIG. 9 is executed, the greater the degree of deceleration in the decelerating state, the larger the intake air amount Ga of the internal combustion engine at the time when the speed SPD of the vehicle is the first vehicle speed Sh or less and higher than the second vehicle speed Sm. Further, as explained above, by doing this, the greater the degree of deceleration, the shorter the time in which a sufficient amount of air can flow through the catalyst, so generation of an odor can be reliably suppressed.

Note that in the above-mentioned embodiment, the greater the degree of deceleration in the decelerating state, the larger the intake air amount Ga of the internal combustion engine at the time when the speed SPD of the vehicle is the first vehicle speed Sh or less and higher than the second vehicle speed Sm, but in another embodiment, when the degree of deceleration is larger than a predetermined deceleration degree in the decelerating state, compared to when the degree of deceleration is the predetermined deceleration degree or less, the intake air amount of the internal combustion engine at the time when the speed SPD of the vehicle is the first vehicle speed Sh or less and higher than the second vehicle speed Sm may be made larger.

When the degree of deceleration of the vehicle is large, the time until the vehicle stops becomes shorter, so to reliably suppress generation of an odor, it is necessary to make a sufficient amount of air flow through the catalyst faster. According to this embodiment, when the degree of deceleration is large in this way, it is possible to pass a sufficient amount of air through the catalyst faster and reliably suppress generation of an odor.

Further, in still another embodiment, when the brake is in an operating state in the decelerating state, compared to when the brake is in a nonoperating state, the intake air amount Ga of the internal combustion engine at the time when at the time the speed SPD of the vehicle is the first vehicle speed Sh or less and higher than the second vehicle speed Sm can be made larger.

When the brake is in an operating state, there is a high possibility that the vehicle will shortly be stopped, so to reliably suppress generation of an odor, it is necessary to quickly pass a sufficient amount of air through the catalyst. In this connection, in the present embodiment, when the brake is in an operating state, compared to when the brake is in a nonoperating state, the intake air amount Ga of the internal combustion engine at the time when the speed SPD of the vehicle is the first vehicle speed Sh or less and higher than the second vehicle speed Sm is made greater and thereby the amount of air flowing through the catalyst is made larger, so it is possible to quickly pass a sufficient amount of air through the catalyst and reliably suppress generation of an odor.

Note that, like in the above-mentioned embodiments, when the intake air amount Ga of the internal combustion engine at the time when the speed SPD of the vehicle is the first vehicle speed Sh or less and higher than the second vehicle speed Sm is made larger corresponding to the degree of deceleration of the vehicle or the operating state of the brake, the first vehicle speed Sh can be set lower corresponding to the amount by which the intake air amount Ga is made larger. That is, in this case, even if the first vehicle speed Sh is set lower, it is possible to reliably suppress generation of an odor.

Figure 12:
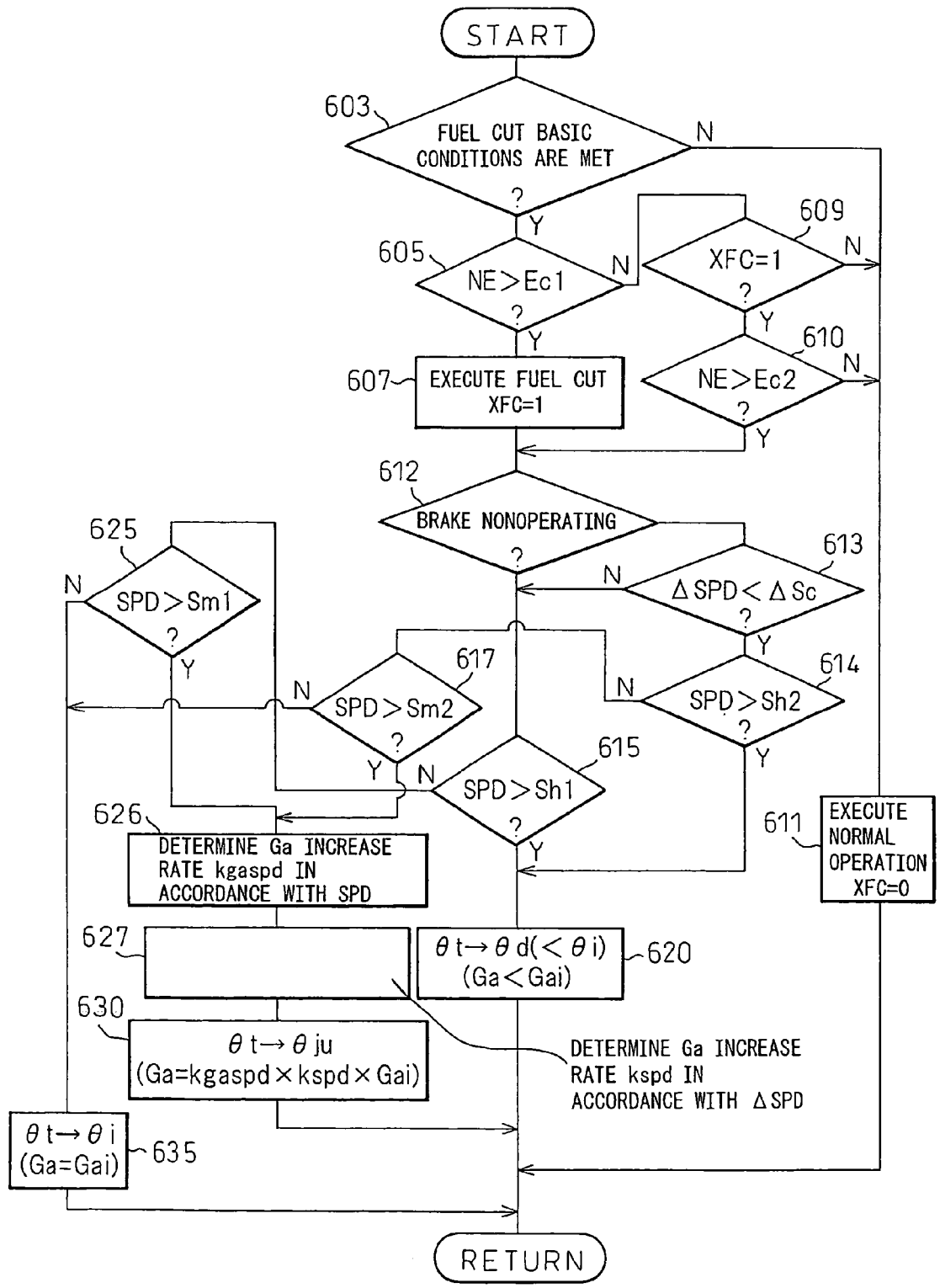
FIG. 12 is a flow chart showing a control routine of operation control executed in still another embodiment of the present invention.

Further, in another embodiment, operational control based on the control routine shown by the flowchart of FIG. 12 may also be performed. Referring to FIG. 12, this control routine is based on the control routine shown in FIG. 9 and differs from the control routine shown in FIG. 9 only on the point that steps 612, 613, 614, 615, 617, and 625 are provided at the part after step 607 corresponding to step 507 of FIG. 9 or step 610 corresponding to step 510 of FIG. 9.

That is, in this control routine, when the routine proceeds through step 607 or step 610 to step 612, it is judged if the brake is in a nonoperating state. When it is judged at step 612 that the brake is not in a nonoperating state, that is, it is in an operating state, the routine proceeds to step 613 where it is judged if the acceleration ΔSPD of the vehicle is smaller than a predetermined acceleration ΔSc (that is, if the degree of deceleration of the vehicle is larger than a predetermined degree of deceleration).

On the other hand, when it is judged at step 612 that the brake is in a nonoperating state, the routine proceeds to step 615 where it is judged if the current vehicle speed SPD is higher than a predetermined vehicle speed Sh1. Further, here, when it is judged that the vehicle speed SPD is higher than the vehicle speed Sh1, the routine proceeds to step 620 corresponding to step 520 of FIG. 9 (or step 120 of FIG. 2), while when it is judged that the vehicle speed SPD is the vehicle speed Sh1 or less, the routine proceeds to step 625.

When the routine proceeds to step 625, it is judged if the current vehicle speed SPD is a predetermined vehicle speed Sm1 or higher. Note that here, this vehicle speed Sm1 is a speed of less than the above-mentioned vehicle speed Sh1 (Sh1>Sm1). Further, when it is judged at step 625 that the vehicle speed SPD is higher than the vehicle speed Sm1, the routine proceeds to step 626 corresponding to step 526 of FIG. 9, while when it is judged that the vehicle speed SPD is the vehicle speed Sm1 or less, the routine proceeds to step 635 corresponding to step 535 of FIG. 9 (or step 135 of FIG. 2).

On the other hand, when the routine proceeds to step 613 and it is judged that the vehicle acceleration ΔSPD is a predetermined acceleration ΔSc or more, the routine proceeds to step 615. On the other hand, when it is judged at step 613 that the vehicle acceleration ΔSPD is smaller than the predetermined acceleration ΔSc (that is, the degree of deceleration of the vehicle is larger than a predetermined degree of deceleration), the routine proceeds to step 614 where it is judged that the current vehicle speed SPD is higher than a predetermined vehicle speed Sh2. Note that here, this vehicle speed Sh2 is a speed less than the above-mentioned vehicle speed Sh1 (Sh1>Sh2). Further, when it is judged at step 614 that the vehicle speed SPD is higher than the vehicle speed Sh2, the routine proceeds to step 620, while when it is judged that the vehicle speed SPD is the vehicle speed Sh2 or less, the routine proceeds to step 617.

When the routine proceeds to step 617, it is judged whether the current vehicle speed SPD is higher than a predetermined vehicle speed Sm2. Note that here this vehicle speed Sm2 is a speed less than the above-mentioned vehicle speed Sh2 (Sh2>Sm2) and a speed less than the above-mentioned vehicle speed Sm1 (Sm1>Sm2). Further when it is judged at step 617 that the vehicle speed SPD is higher than the vehicle speed Sm2, the routine proceeds to step 626, while when it is judged that the vehicle speed SPD is the vehicle speed Sm2 or less, the routine proceeds to step 635.

In the case that the control routine shown in FIG. 12 is executed, when the fuel cut is executed, if the brake is in the operating state and the degree of deceleration is larger than a predetermined deceleration degree, the intake air amount Ga of the internal combustion engine at the time when the speed of the vehicle is the vehicle speed Sh2 or less and higher than the vehicle speed Sm2 becomes larger compared to when the brake is in a nonoperating state or when the degree of deceleration is the predetermined deceleration degree or less.

When the brake is in the operating state and the degree of deceleration is large, considering that the vehicle may be rapidly decelerated or be stopped, to reliably suppress generation of an odor, it is necessary to pass a sufficient amount of air through the catalyst 7 faster. According to the present embodiment, if considering such a rapid deceleration or rapid stop, the intake air amount Ga of the internal combustion engine is made greater and thereby the amount of air flowing through the catalyst 7 is made larger, so a sufficient amount of air can flow through the catalyst 7 faster and generation of an odor can be reliably suppressed.

Note that, in another embodiment, the increase rate of the intake air amount Ga may be made different for the case where the brake is in an operating state, but the degree of deceleration is a predetermined deceleration degree or less, the case where the brake is in a nonoperating state, but the degree of deceleration is larger than the predetermined deceleration degree, and the case where the brake is in the operating state and the degree of deceleration is larger than a predetermined deceleration degree. That is, for example, when the brake is in the operating state and the degree of deceleration is larger than a predetermined deceleration degree, it is highly likely that the vehicle will be rapidly decelerated and stopped, so the increase rate of the intake air amount Ga in this case is made larger compared to the other cases. By doing this, the generation of an odor after deceleration can be suppressed more reliably.

Next, still another embodiment will be explained with reference to FIG. 13. In this embodiment, if the cumulative value of the intake air amount Ga of the internal combustion engine for the time that a fuel cut is in progress is a predetermined cumulative value or more, the opening degree θt of the throttle valve is prohibited from being made smaller than the opening degree θi of when the internal combustion engine is in the idling state while the fuel cut is in progress, that is, the intake air amount Ga is prohibited from being made smaller than the intake air amount Gai in the idling state.

Note that, as explained above, if considering the fact that when a fuel cut is being performed, the intake air amount Ga of the internal combustion engine becomes equal to the amount of air flowing through the catalyst and further therefore in this case the cumulative value of the intake air amount Ga may be considered the cumulative value of the amount of air flowing through the catalyst, in this embodiment, it can be said that if the cumulative value of the amount of air flowing through the catalyst for the time that a fuel cut is in progress is a predetermined cumulative value of the amount of air flowing through the catalyst or more, the amount of air flowing through the catalyst when a fuel cut is in progress is prohibited from becoming smaller than the amount of air flowing through the catalyst when the internal combustion engine is in the idling state, but here a detailed explanation will be given based on the opening degree θt of the throttle valve and the intake air amount Ga of the internal combustion engine.

That is, more specifically in the present embodiment, if the cumulative value of the intake air amount Ga of the internal combustion engine for the time that a fuel cut is in progress is a predetermined cumulative value or more, the opening degree θt of the throttle valve is prohibited from being made smaller than the opening degree θi of when the internal combustion engine is in the idling state when the speed SPD of the vehicle is the first vehicle speed Sh or higher, that is, the intake air amount Ga is prohibited from being made smaller than the intake air amount Gai in the idling state. FIG. 13 is a flowchart showing an example of a control routine for executing such operational control.

When the vehicle speed is high, if reducing the throttle valve opening degree θt and reducing the intake air amount Ga, the negative pressure in each cylinder becomes high and oil may leak down from the valve stem or oil may leak up from the piston ring part. For this reason, it is desirable to reduce the throttle valve opening degree θt and reduce the intake air amount Ga only when necessary for suppressing the catalyst deterioration. On the other hand, when the catalyst 7 has a sufficient amount of air flowing through it and the catalyst 7 holds sufficient oxygen, even if subsequently limiting the amount of air flowing through it, there is almost no effect of suppression of catalyst deterioration.

As explained above, in the present embodiment, if the cumulative value of the intake air amount Ga of the internal combustion engine for the time that a fuel cut is in progress is a predetermined cumulative value or more, when the speed SPD of the vehicle is the first vehicle speed Sh or higher, the throttle valve opening degree θt is prohibited from being made smaller than the opening degree θi of when the internal combustion engine is in the idling state and thereby the intake air amount Ga is prohibited from being made smaller than the intake air amount Ga in the idling state. As the cumulative value of the intake air amount Ga can be considered the cumulative value of the amount of air flowing through the catalyst, according to the present embodiment, by suitably setting the predetermined cumulative value, the effect of suppression of catalyst deterioration can be sufficiently obtained and the occurrence of the downward oil leakage and upward oil leakage can be reduced.

Figure 13:
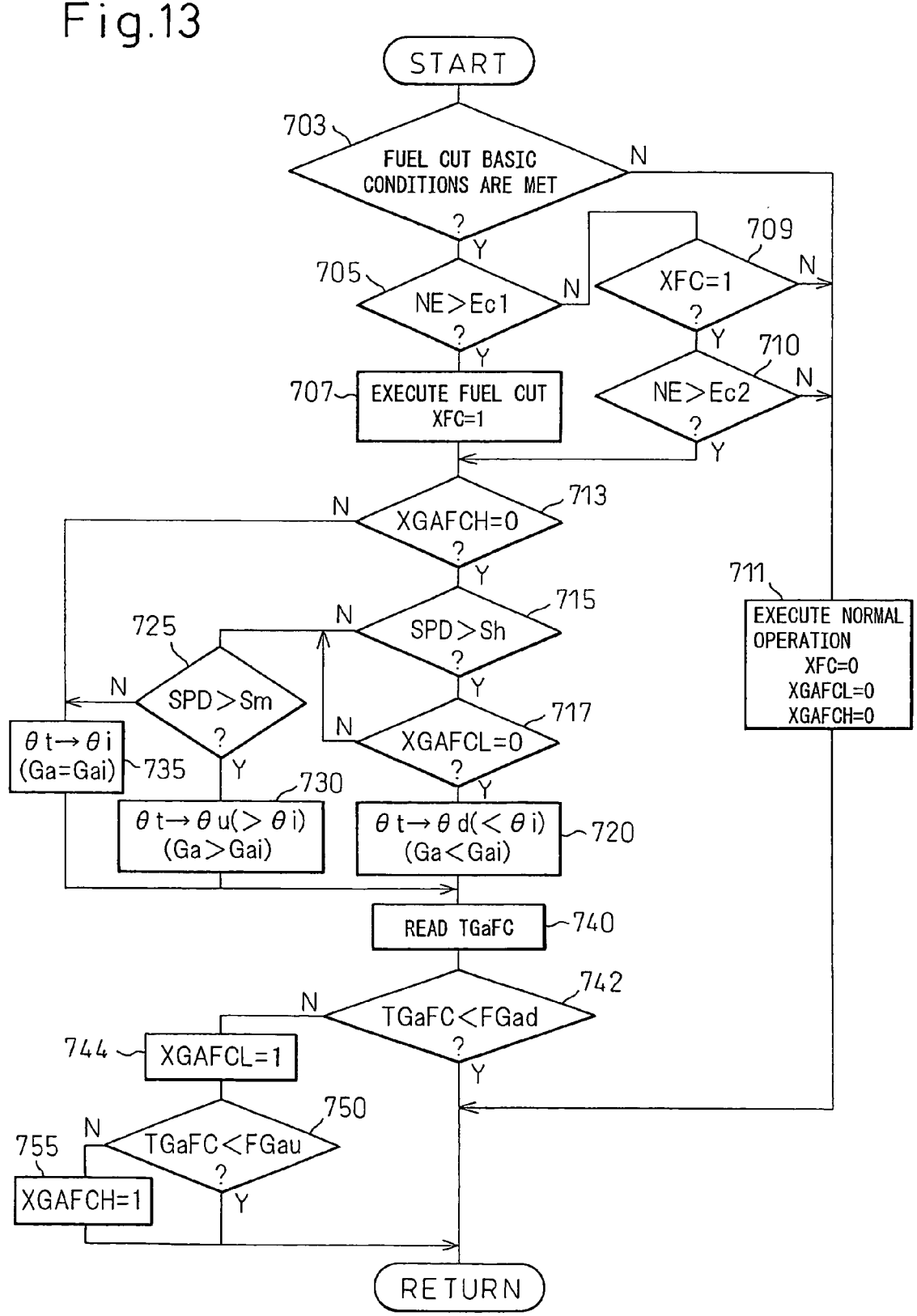
FIG. 13 is a flow chart showing a control routine of operation control executed in still another embodiment of the present invention.

Referring to FIG. 13, this control routine is based on the control routine shown in FIG. 2 and differs from the control routine shown in FIG. 2 on the point that step 713 and step 717 are respectively provided before and after step 715 corresponding to step 115 of FIG. 2 and the point that steps 740, 742, 744, 750, and 755 are provided at the parts after steps 720, 730, and 735 respectively corresponding to steps 120, 130, and 135 of FIG. 2.

That is, in this control routine, when the control proceeds through step 707 or step 710 to step 713, it is judged whether the first reference attainment flag XGAFCH is 0. This first reference attainment flag XGAFCH is set to "1" at step 755 when it is judged at the later explained step 750 that the cumulative value TGaFC of the intake air amount Ga of the internal combustion engine for the time that a fuel cut is in progress is a predetermined first cumulative value FGau or more. Therefore, in other words, the judgment at step 713 is judgment whether the cumulative value TGaFC was the first cumulative value FGau or more when the control routine was previously executed.

Note that here, the first cumulative value FGau is the value where when the cumulative value TGaFC of the intake air amount Ga of the internal combustion engine for the time that a fuel cut is in progress becomes that value or more, it is judged that a sufficient amount of air is flowing through the catalyst 7 and the catalyst 7 holds sufficient oxygen, that is, a complete oxidized state is reached. It is determined by experiments etc. in advance considering this intent.

Further, when it is judged at step 713 that the first reference attainment flag XGAFCH is not "0", that is, is "1" (that is, when the control routine was previously executed, the cumulative value TGaFC was the first cumulative value FGau or more), the routine proceeds to step 735 corresponding to step 135 of FIG. 2 where the throttle valve opening degree θt is made the opening degree θi of when the internal combustion engine is in the idling state and where the intake air amount Ga is made the intake air amount Gai of when the internal combustion engine is in the idling state.

On the other hand, when it is judged at step 713 that the first reference attainment flag XGAFCH is "0" (that is, when the control routine was previously executed, the cumulative value TGaFC was less than the first cumulative value FGau (or normal operation was executed)), the routine proceeds to step 715 (corresponding to step 115 of FIG. 2) where it is judged whether the current vehicle speed SPD is higher than the predetermined first vehicle speed Sh.

When it is judged at step 715 that the vehicle speed SPD is the first vehicle speed Sh or less, the routine proceeds to step 725 (corresponding to step 125 of FIG. 2) where it is judged if the current vehicle speed SPD is higher than a predetermined second vehicle speed Sm. Further when it is judged at step 725 that the vehicle speed SPD is the second vehicle speed Sm or less, the routine proceeds to the above-mentioned step 735, while when it is judged the vehicle speed SPD is higher than the second vehicle speed Sm, the routine proceeds to step 730 (corresponding to step 130 of FIG. 2) where the throttle valve opening degree θt is made a predetermined opening degree θu larger than the opening degree θi of when the internal combustion engine is in the idling state and the intake air amount Ga is made larger than the intake air amount Gai of when the internal combustion engine is in the idling state.

On the other hand, when it is judged at step 715 that the vehicle speed SPD is higher than the first vehicle speed Sh, the routine proceeds to step 717 where it is judged whether a second reference attainment flag XGAFCL is "0". This second reference attainment flag XGAFCL is made "1" at step 744 when it is judged at the later explained step 742 that the cumulative value TGaFC of the intake air amount Ga of the internal combustion engine for the time that a fuel cut is in progress is a predetermined second cumulative value FGad or more. Therefore, in other words, the judgment at step 717 is judgment whether the cumulative value TGaFC was the second cumulative value FGau or more when the control routine was previously executed.

Note that here, the second cumulative value FGad is a value smaller than the first cumulative value FGau (FGau>FGad) and a value where when the cumulative value TGaFC of the intake air amount Ga of the internal combustion engine for the time that a fuel cut is in progress becomes that value or more, it is judged that the catalyst 7 becomes substantially an oxidized state, so even if subsequently limiting the amount of flowing air, there is almost no effect of suppression of catalyst deterioration. It is determined by experiments etc. in advance considering this intent.

Further, when it is judged at step 717 that the second reference attainment flag XGAFCL is not "0", that is, is "1" (that is, when the control routine was previously executed, the cumulative value TGaFC was the second cumulative value FGad or more), the routine proceeds to the above-mentioned step 725. That is, in this case, as a result the throttle valve opening degree θt is prohibited from being made smaller than the opening degree θi of when the internal combustion engine is in the idling state and the intake air amount Ga is prohibited from being made smaller than the intake air amount Gai at the time of the idling state.

On the other hand, when it is judged at step 717 that the second reference attainment flag XGAFCL is "0" (that is, when the control routine was previously executed, the cumulative value TGaFC was less than the second cumulative value FGad (or when normal operation was executed)), the routine proceeds to step 720 (corresponding to step 120 of FIG. 2) where the throttle valve opening degree θt is made a predetermined opening degree θd smaller than the opening degree θi of when the internal combustion engine is in the idling state and the intake air amount Ga is made smaller than the intake air amount Gai of when the internal combustion engine is in the idling state.

Further, after the above-mentioned steps 720, 730, and 735, the routine proceeds to step 740 where the value of the cumulative value TGaFC at that time is read. Note that, here, as the intake air amount Ga for finding the cumulative value TGaFC, the intake air amount Ga estimated from the operating state of the internal combustion engine etc. may be used or an air flow meter may be provided and its detected value may be used. The cumulative value TGaFC is calculated by the ECU 8 based on the obtained value of the intake air amount Ga.

When the cumulative value TGaFC is obtained at step 740, the routine proceeds to step 742 where it is judged whether the cumulative value TGaFC is less than the above-mentioned second cumulative value FGad. Further, when it is judged at step 742 that the cumulative value TGaFC is less than the second cumulative value FGad, the control routine is ended as it is (that is, the control routine is executed again from the start), while when it is judged that the cumulative value TGaFC is the second cumulative value FGad or more, the routine proceeds to step 744 where the second reference attainment flag XGAFCL is made "1" and then the routine proceeds to step 750.

At step 750, it is judged whether the cumulative value TGaFC is less than the above-mentioned first cumulative value FGau. Further, when it is judged at step 750 that the cumulative value TGaFC is less than the first cumulative value FGau, the control routine ends as it is (that is, the control routine is executed again from the start), while when it is judged that the cumulative value TGaFC is the first cumulative value FGau or more, the routine proceeds to step 755 where the first reference attainment flag XGAFCH is made "1" and the control routine ends (more specifically, the control routine is executed again from the start).

Note that in this control routine, when the control proceeds to step 711 where the normal operation is executed, the fuel cut execute flag XFC and the above-mentioned first reference attainment flag XGAFCH and second reference attainment flag XGAFCL are made "0".

As clear from the above explanation and FIG. 13, when the control routine shown in FIG. 13 is executed, if the cumulative value TGaFC of the intake air amount Ga of the internal combustion engine for the time that a fuel cut is in progress is a predetermined cumulative value FGad or more, the opening degree θt of the throttle valve is prohibited from being made smaller than the opening degree θi of when the internal combustion engine is in the idling state and the intake air amount Ga is prohibited from being made smaller than the intake air amount Gai in the idling state when the speed SPD of the vehicle is the first vehicle speed Sh or higher. Further, as explained above, by doing this, by suitably setting the predetermined cumulative value FGad, the effect of suppression of catalyst deterioration can be sufficiently obtained and the occurrence of the downward oil leakage and upward oil leakage can be reduced.

Next, referring to FIG. 14, still another embodiment will be explained. This embodiment, as shown in FIG. 15, is one where the exhaust system of the internal combustion engine is provided with two catalysts 7a and 7b in series and provided with an air-fuel ratio sensor (intermediate air-fuel ratio sensor) 9 for measuring the air-fuel ratio between them. In FIG. 15, the exhaust gas flows from the left side to the right side of the figure as shown by the arrows. Further, the output of the intermediate air-fuel ratio sensor 9 is transmitted to the ECU 8.

When the exhaust system of the internal combustion engine is provided with two catalysts 7a and 7b in series as shown in FIG. 15, in general, compared with the upstream side catalyst 7a, the downstream side catalyst 7b is harder to supply with oxygen. Therefore, judgment of whether even the downstream side catalyst 7b becomes completely oxidized in state is also difficult. That is, speaking in terms of the embodiment explained with reference to FIG. 13, judgment of whether to make the first reference attainment flag XGAFCH "1" becomes difficult. The present embodiment is designed to enable this judgment to be made more suitably.

That is, this embodiment is basically the same as the embodiment explained with reference to FIG. 13, but differs on the point that the judgment of whether to make the above-mentioned first reference attainment flag XGAFCH "1" is made using the cumulative value TGaFCL of the intake air amount Ga after the output of the intermediate air-fuel ratio sensor 9 indicates that the air-fuel ratio is lean.

Figure 14:
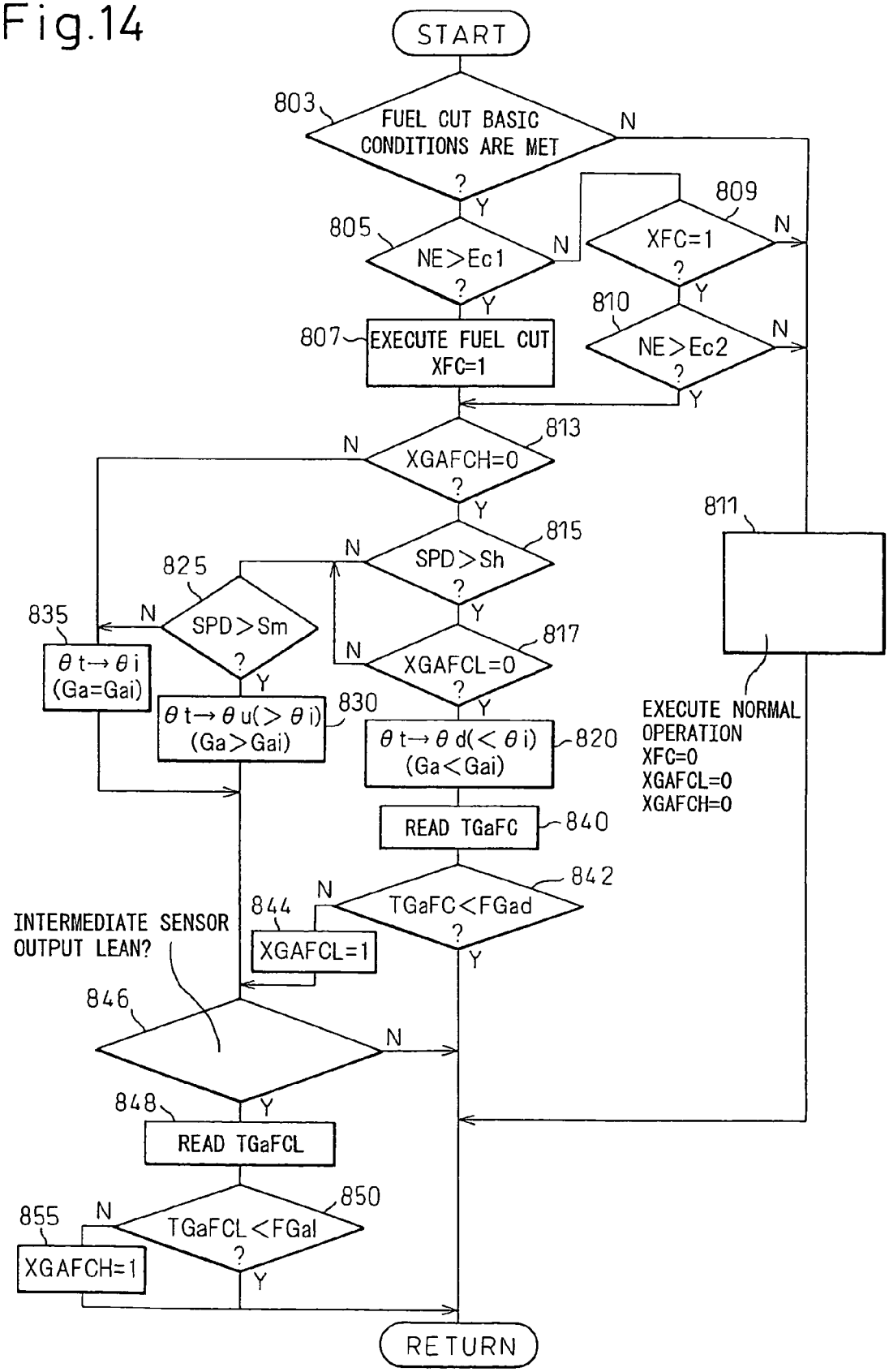
FIG. 14 is a flow chart showing a control routine of operation control executed in still another embodiment of the present invention.
Figure 15:
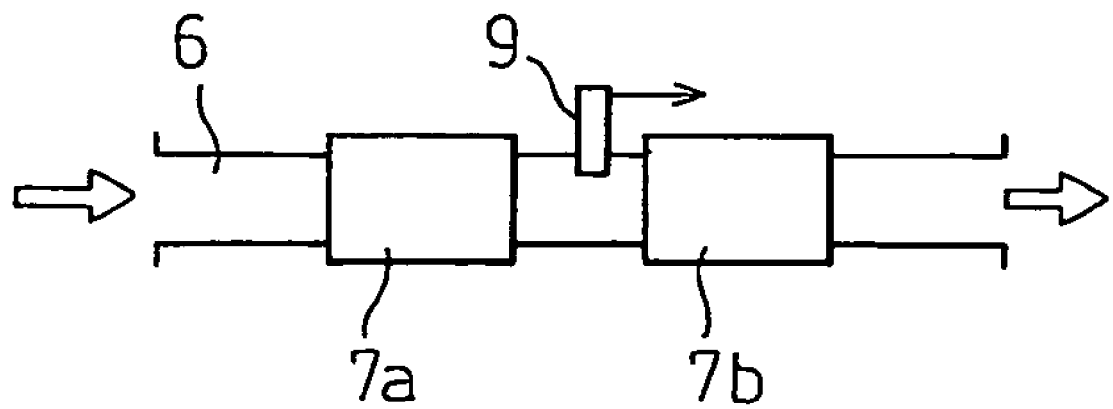
FIG. 15 is a view of the configuration of an exhaust system on which the embodiment explained with reference to FIG. 14

That is, referring to FIG. 14, this control routine is substantially the same as the control routine shown in FIG. 13. The control routine after steps 830, 835, and 844 respectively corresponding to steps 730, 735, and 744 of FIG. 13 differs from the control routine shown in FIG. 13. That is, in the present embodiment, after the steps 830, 835, and 844, the routine proceeds to step 846 where it is judged whether the output of the intermediate air-fuel ratio sensor 9 indicates lean.

Further when it is judged at step 846 that the output of the intermediate air-fuel ratio sensor 9 does not indicate lean, the control routine ends as it is (that is, the control routine is executed again from the start), while when it is judged that the output of the intermediate air-fuel ratio sensor 9 indicates lean, the routine proceeds to step 848 where the cumulative value TGaFCL at that time is read. Note that, here, as the intake air amount Ga for finding the cumulative value TGaFCL, the intake air amount Ga estimated from the operating state of the internal combustion engine etc. may be used or an air flow meter may be provided and its detection value may be used. The cumulative value TGaFCL is calculated by the ECU 8 based on the obtained value of the intake air amount Ga.

When the cumulative value TGaFCL is obtained at step 848, the routine proceeds to step 850 where it is judged whether the cumulative value TGaFCL is less than a predetermined post lean cumulative value FGal. Here, the post lean cumulative value FGal is a value where when the cumulative value TGaFCL of the intake air amount Ga after the output of the intermediate air-fuel ratio sensor 9 indicates lean becomes that value or more, it is judged that a sufficient amount of air is flowing through the catalysts 7a and 7b and even the downstream side catalyst 7b holds sufficient oxygen, that is, a complete oxidized state is reached. It is determined in advance by experiments etc. considering this intent.

Further, when it is judged at step 850 that the cumulative value TGaFCL is less than the post lean cumulative value FGal, the control routine ends as it is (that is, the control routine is executed again from the start), while when it is judged that the cumulative value TGaFL is the post lean cumulative value FGal or more, the routine proceeds to step 855 where the first reference attainment flag XGAFCH is made "1" and the control routine ends (more specifically, the control routine is executed again from the start).

Note that here, when indicating that the output of the intermediate air-fuel ratio sensor 9 is lean, the upstream side catalyst 7a may be in the oxidized state, so the post lean cumulative value FGal used as the judgment standard at the step 850 can be said more specifically to be a value for judging if the downstream side catalyst 7b is in an oxidized state. Further, by doing this, it becomes possible to judge whether to make the first reference attainment flag XGAFCH "1" or not more suitably.

In the above way, according to this embodiment, even when the exhaust system of the internal combustion engine is provided with two catalysts 7a and 7b in series, by utilizing the air-fuel ratio sensor (intermediate air-fuel ratio sensor) 9 provided between them, judgment of whether to make the first reference attainment flag XGAFCH "1" or not can be performed more suitably. Further, as a result, more suitable control can be executed.

Next, referring to FIG. 16, a modification of the embodiment explained with reference to FIG. 14 will be explained. In this embodiment, the value of the post lean cumulative value FGal used as the judgment standard for whether to make the first reference attainment flag XGAFCH "1" and the value of the second cumulative value FGad used as the judgment standard for whether to make the second reference attainment flag XGAFCL "1" are determined in accordance with the maximum oxygen holding amount Cmax of the catalysts.

Figure 16:
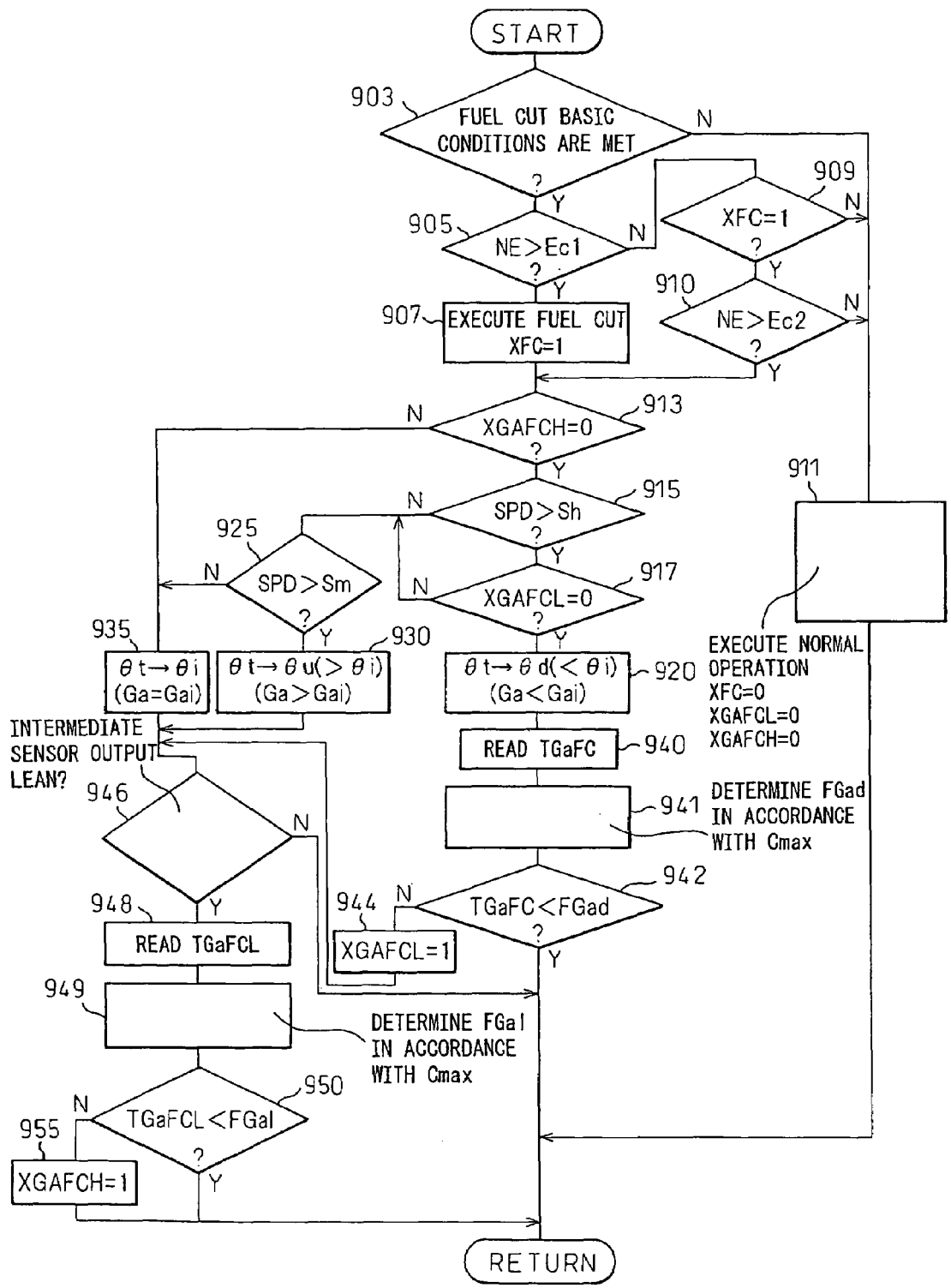
FIG. 16 is predicated.

That is, referring to FIG. 16, this control routine is substantially the same as the control routine shown in FIG. 14 and differs only on the point that step 941 is provided before step 942 corresponding to step 842 of FIG. 14 and on the point that step 949 is provided before step 950 corresponding to step 850 of FIG. 14.

At the step 941, the value of the second cumulative value FGad used as the judgment standard at the following step 942 is determined in accordance with the maximum oxygen holding amount Cmax. Further, at the step 949, the value of the post lean cumulative value FGal used as the judgment standard at the following step 950 is determined in accordance with the maximum oxygen holding amount Cmax.

Figure 17:
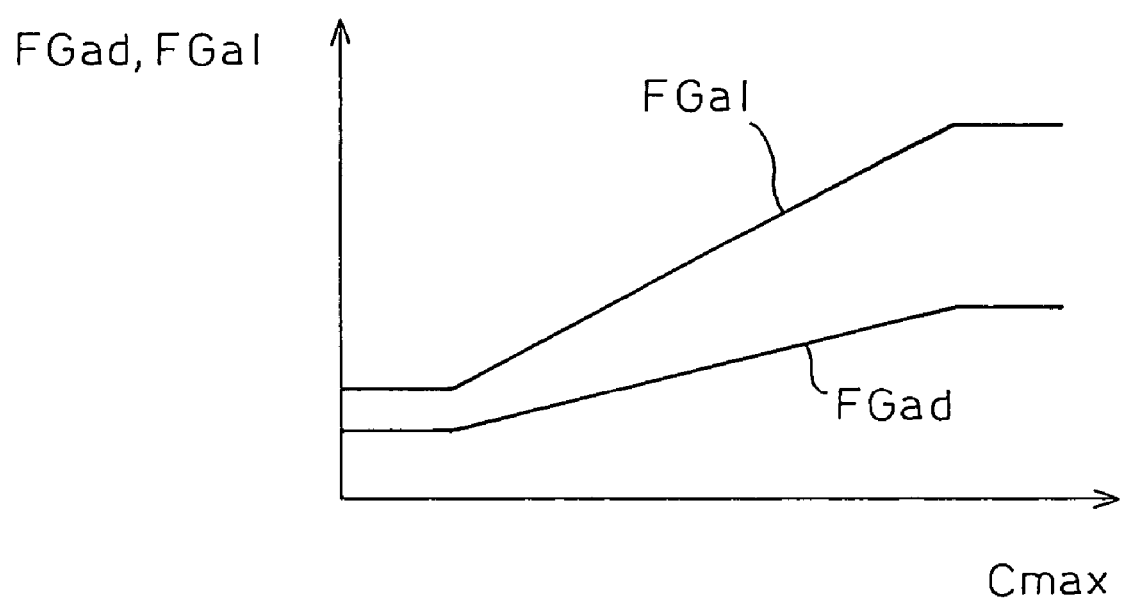
FIG. 17 is a map for finding the second cumulative value FGad and post lean cumulative value FGal used as the judgment standard at step 942 and step 950 of FIG. 16 based on the maximum oxygen holding amount Cmax of the catalyst.

The values of these second cumulative value FGad and post lean cumulative value FGal are determined using a map shown in for example FIG. 17. This maps the suitable values of the second cumulative value FGad and post lean cumulative value FGal corresponding to the values of the maximum oxygen holding amount Cmax found in advance. As shown by the map of FIG. 17, in the present embodiment, the greater the maximum oxygen holding amount Cmax, the larger the values the second cumulative value FGad and post lean cumulative value FGal tend to become. This is because it is believed that the larger the maximum oxygen holding amount Cmax, the greater the cumulative value of the amount of air flowing through the catalysts required for making the catalysts the oxidized state.

As explained above, according to the present embodiment, the values of the second cumulative value FGad and post lean cumulative value FGal are determined using a map such as FIG. 17 in accordance with the maximum oxygen holding amount Cmax. Further, by doing this, a more suitable second cumulative value FGad and post lean cumulative value FGal are set and the judgment of whether to make the first reference attainment flag XGAFCH and the second reference attainment flag XGAFCL "1" can be performed more suitably. Further, as a result, more suitable control can be realized.

Note that, in the control routines of the embodiments explained up to here, the step of judging whether the vehicle speed SPD is higher than the predetermined second vehicle speed Sm (including the vehicle speeds Sm1 and Sm2) can be omitted. That is, in this case, the step of judging whether the vehicle speed SPD is higher than the predetermined second vehicle speed Sm is omitted and the control always proceeds as if a judgment were made at that step and it was judged that the vehicle speed SPD was higher than the predetermined second vehicle speed Sm. Further, the control after it is judged that the vehicle speed SPD is the predetermined second vehicle speed Sm or less can be omitted if not necessary. Note that when the vehicle speed becomes zero, the vehicle is not in a decelerating state, so the fuel cut basic conditions are not met and the fuel cut is suspended. This is the same regardless of the existence of a step for judging of the vehicle speed SPD is higher than the predetermined second vehicle speed Sm.

Further, when omitting the step of judging whether the vehicle speed SPD is higher than the predetermined second vehicle speed Sm in this way, the vehicle speed used as the judgment standard in the control becomes only the first vehicle speed Sh (including the vehicle speed Sh1 and vehicle speed Sh2). That is, for example, taking as an example the embodiment explained with reference to FIG. 2, when omitting the step 125 of judging whether the vehicle speed SPD is higher than the predetermined second vehicle speed Sm in the control routine shown in FIG. 2 (that is, when it is judged at step 115 that the vehicle speed SPD is the first vehicle speed Sh or less, always having the routine proceed to step 130 and omitting step 135 of the control routine for the case where it is judged at step 125 that the vehicle speed SPD is the second vehicle speed Sm or less), if executing that control routine, it can be said that in the case that the fuel cut is executed, when the vehicle speed is higher than a predetermined first vehicle speed Sh, the throttle valve opening degree θt is made smaller than the opening degree θi of when the internal combustion engine is in the idling state and the intake air amount Ga of the internal combustion engine is made smaller than the intake air amount Gai of when the internal combustion engine is in the idling state, while when the speed of the vehicle is the first vehicle speed or less, the opening degree θt of the throttle valve is made larger than the opening degree θi of when the internal combustion engine is in the idling state and the intake air amount Ga of the internal combustion engine is made larger than the intake air amount Gai of when the internal combustion engine is in the idling state.

Figure 18:
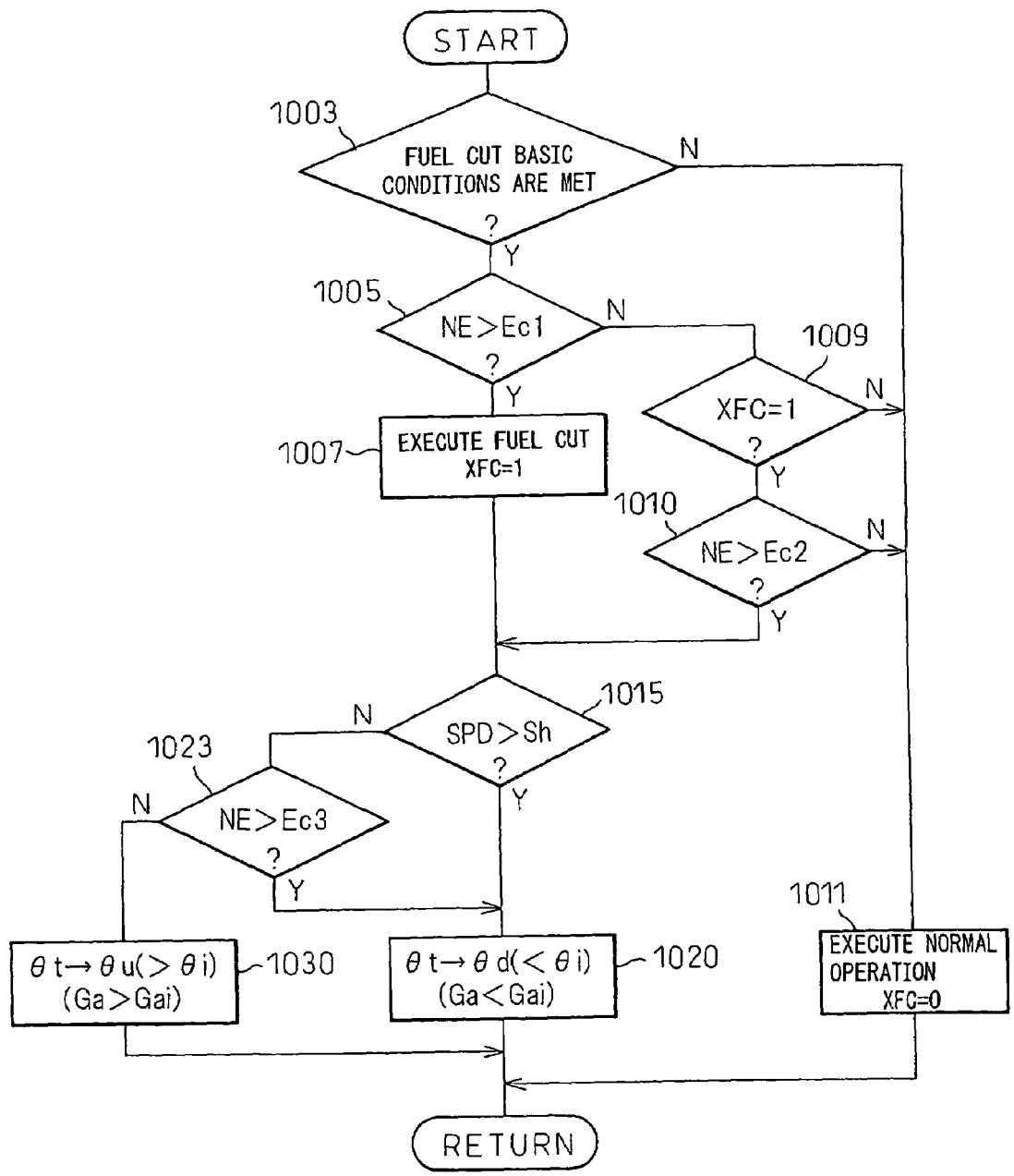
FIG. 18 is a flow chart showing a control routine of operation control executed in still another embodiment of the present invention.

Next, still another embodiment will be explained with reference to FIG. 18. In this embodiment, in the control of the intake air amount Ga when a fuel cut is executed, in addition to the vehicle speed SPD, the rotational speed of the internal combustion engine (engine rotational speed) NE is considered. That is, the operation control of the present embodiment, simply speaking, is to reduce the amount of air flowing through the catalyst when the fuel cut is executed and the vehicle speed is in the high speed region or the rotational speed of the internal combustion engine is in the high speed region, while increase the amount of air flowing through the catalyst when the vehicle speed is in the medium or low speed region and the rotational speed of the internal combustion engine is in the medium or low speed region. FIG. 18 is a flowchart showing an example of a control routine for executing this operational control.

If executing this operational control, when the vehicle speed is in the high speed region or the rotational speed of the internal combustion engine is in the high speed region where in general the catalyst temperature is high and catalyst deterioration accompanying the fuel cut easily occurs, the amount of air flowing through the catalyst is reduced, so the catalyst is prevented from being placed in an excess oxygen state and catalyst deterioration can be suppressed. Further, when the vehicle speed is in the medium or low speed region and the rotational speed of the internal combustion engine is in the medium or low speed region where the vehicle is expected to be stopped etc. soon after and the problem of odor after deceleration is feared, the amount of air flowing through the catalyst is made larger, so during deceleration the catalyst can be supplied with sufficient oxygen and, after deceleration, the state where the sulfur oxides which had been held in the catalyst become hydrogen sulfide and are easily released to the outside can be suppressed and, as a result, the generation of an odor after deceleration can be suppressed.

Referring to FIG. 18, this control routine is substantially the same as the control routine shown in FIG. 2 and differs only in the content of the control when it is judged at step 1015 corresponding to step 115 of FIG. 2 that the current vehicle speed SPD is the first vehicle speed Sh or less.

That is, in this control routine, when it is judged at step 1015 that the current vehicle speed SPD ($\geqq 0$) is the first vehicle speed Sh or less, the routine proceeds to step 1023. Further, it is judged if the engine rotational speed NE is larger than a predetermined third engine rotational speed Ec3. Here, this third engine rotational speed Ec3 is determined considering at least suppression of catalyst deterioration. That is, for example, the third engine rotational speed Ec3 is made the engine rotational speed where when the engine rotational speed NE is larger than that, it is judged that catalyst deterioration is liable to occur due to the catalyst temperature being high, etc. This is determined by experiments etc. in advance based on this intent.

When it is judged at step 1023 that the engine rotational speed NE is larger than the third engine rotational speed Ec3, the routine proceeds to step 1020. Further, at step 1020, the throttle valve opening degree θt is made a predetermined opening degree θd smaller than the opening degree θi of when the internal combustion engine is in the idling state, and the control routine ends in that state. That is, in this case, the throttle valve opening degree θt is made an opening degree θd smaller than the opening degree θi of when the internal combustion engine is in the idling state and, as a result, the intake air amount Ga is made smaller than the intake air amount Gai of when the internal combustion engine is in the idling state (for example, is made half of the intake air amount Gai in the idling state) and the control routine ends (more specifically, the control routine is executed again from the start).

On the other hand, when it is judged at step 1023 that the engine rotational speed NE is the third engine rotational speed Ec3 or less, the routine proceeds to step 1030. Further, at step 1030, the throttle valve opening degree θt is made a predetermined opening degree θu larger than the opening degree θi of when the internal combustion engine is in the idling state and the control routine ends in that state. That is, in this case, the throttle valve opening degree θt is made an opening degree θu larger than the opening degree θi of when the internal combustion engine is in the idling state and, as a result, the intake air amount Ga is made larger than the intake air amount Gai of when the internal combustion engine is in the idling state and the control routine ends (more specifically, the control routine is executed again from the start).

As explained above, when the control routine shown in FIG. 18 is executed, in the case that the fuel cut is executed, when the speed SPD of the vehicle is higher than the first vehicle speed Sh or the engine rotational speed NE is higher than a predetermined rotational speed Ec3, the throttle valve opening degree θt is made smaller than the opening degree θi of when the internal combustion engine is in the idling state and the intake air amount Ga of the internal combustion engine is made smaller than the intake air amount Gai of when the internal combustion engine is in the idling state, while when the speed SPD of the vehicle is the first vehicle speed Sh or less and the engine rotational speed NE is the predetermined rotational speed Ec3 or less, the throttle valve opening degree θt is made larger than the opening degree θi of when the internal combustion engine is in the idling state and the intake air amount Ga of the internal combustion engine is made larger than the intake air amount Gai of when the internal combustion engine is in the idling state.

Here, if considering the fact that when a fuel cut is being performed, the intake air amount Ga of the internal combustion engine becomes equal to the amount of air flowing through the catalyst provided in the exhaust system, it can be said that when the control routine shown in FIG. 18 is executed, when the speed SPD of the vehicle is higher than the first vehicle speed Sh or the engine rotational speed NE is higher than a predetermined rotational speed Ec3, the amount of air flowing through the catalyst is reduced, while when the speed SPD of the vehicle is the first vehicle speed Sh or less and the engine rotational speed NE is the predetermined rotational speed Ec3 or less, the amount of air flowing through the catalyst is made larger.

Further, as explained above, by doing this, when the vehicle speed is in the high speed region or the rotational speed of the internal combustion engine is in the high speed region where in general the catalyst temperature is high and catalyst deterioration accompanying the fuel cut easily occurs, the amount of air flowing through the catalyst is reduced, so the catalyst is prevented from being placed in an excess oxygen state and catalyst deterioration can be suppressed. Further, when the vehicle speed is in the medium or low speed region and the rotational speed of the internal combustion engine is in the medium or low speed region where the vehicle is expected to be stopped etc. soon after and the problem of odor after deceleration is feared, the amount of air circulated through the catalyst is made larger, so during deceleration the catalyst can be supplied with sufficient oxygen and, after deceleration, the state where the sulfur oxides which had been held in the catalyst become hydrogen sulfide and are easily released to the outside can be suppressed and, as a result, the generation of an odor after deceleration can be suppressed.

Note that, in the explanation of the above embodiment, the third engine rotational speed Ec3 was determined considering suppression of catalyst deterioration, but as will be understood from the explanation up to here, it is more preferably determined also considering suppression of generation of odor. That is, for example, an engine rotational speed of the engine rotational speed Z or more whereby, when the engine rotational speed NE becomes that engine rotational speed Z or less, then the amount of air flowing through the catalyst is increased as explained above, it is possible to pass the amount of air necessary for sufficiently suppressing the generation of an odor through the catalyst until the vehicle stops, is made the third engine rotational speed Ec3.

Further, as will be understood from the explanation up to here, in the present embodiment, it can be said that the engine rotational speed NE is being used as an indicator of the catalyst temperature. Therefore, even if using the catalyst temperature instead of the engine rotational speed NE, similar actions and effects can be obtained. That is, for example, in the case that the fuel cut is executed, when the speed SPD of the vehicle is higher than the first vehicle speed Sh or the temperature of the catalyst is higher than a predetermined catalyst temperature, the opening degree θt of the throttle valve may be made smaller than the opening degree θi of when the internal combustion engine is in the idling state, while when the speed SPD of the vehicle is the first vehicle speed Sh or less and the temperature of the catalyst is the predetermined catalyst temperature or less, the opening degree θt of the throttle valve may be made larger than the opening degree θi of when the internal combustion engine is in the idling state.

That is, in this case, in the case that the fuel cut is executed, when the speed SPD of the vehicle is the first vehicle speed Sh or less and the temperature of the catalyst is the predetermined catalyst temperature or less, the amount of air flowing through the catalyst is made larger compared with when the speed of the vehicle is higher than the first vehicle speed or the temperature of the catalyst is higher than the predetermined catalyst temperature. Further, by doing this, the deterioration of the catalyst accompanying the fuel cut can be suppressed and the generation of an odor after deceleration can be suppressed. Note that, here, as in the case of the third engine rotational speed Ec3, the predetermined catalyst temperature is determined considering at least suppression of catalyst deterioration and preferably is determined further considering suppression of generation of odor.

Further, in a modified embodiment of the present embodiment, as in the embodiment explained with reference to FIG. 13, when a cumulative value of the intake air amount Ga of the internal combustion engine for the time that a fuel cut is in progress is a predetermined cumulative value or more, the opening degree θt of the throttle valve is prohibited from being made smaller than the opening degree θi of when the internal combustion engine is in the idling state, that is, the intake air amount Ga is prohibited from being made smaller than the intake air amount Gai in the idling state, while the fuel cut is in progress.

That is, more specifically, in this case, when the cumulative value of the intake air amount Ga of the internal combustion engine for the time that a fuel cut is in progress is a predetermined cumulative value or more, if the speed SPD of the vehicle is higher than the first vehicle speed Sh or the engine rotational speed NE is higher than a predetermined rotational speed Ec3 the opening degree θt of the throttle valve is prohibited from being made smaller than the opening degree θi of when the internal combustion engine is in the idling state, that is, the intake air amount Ga is prohibited from being made smaller than the intake air amount Gai in the idling state. Further, by doing this, in the same way as the embodiment explained with reference to FIG. 13, by suitably setting the predetermined cumulative value, it is possible to sufficiently obtain the effect against catalyst deterioration while reducing the occurrence of downward oil leakage or upward oil leakage.

Figure 19:
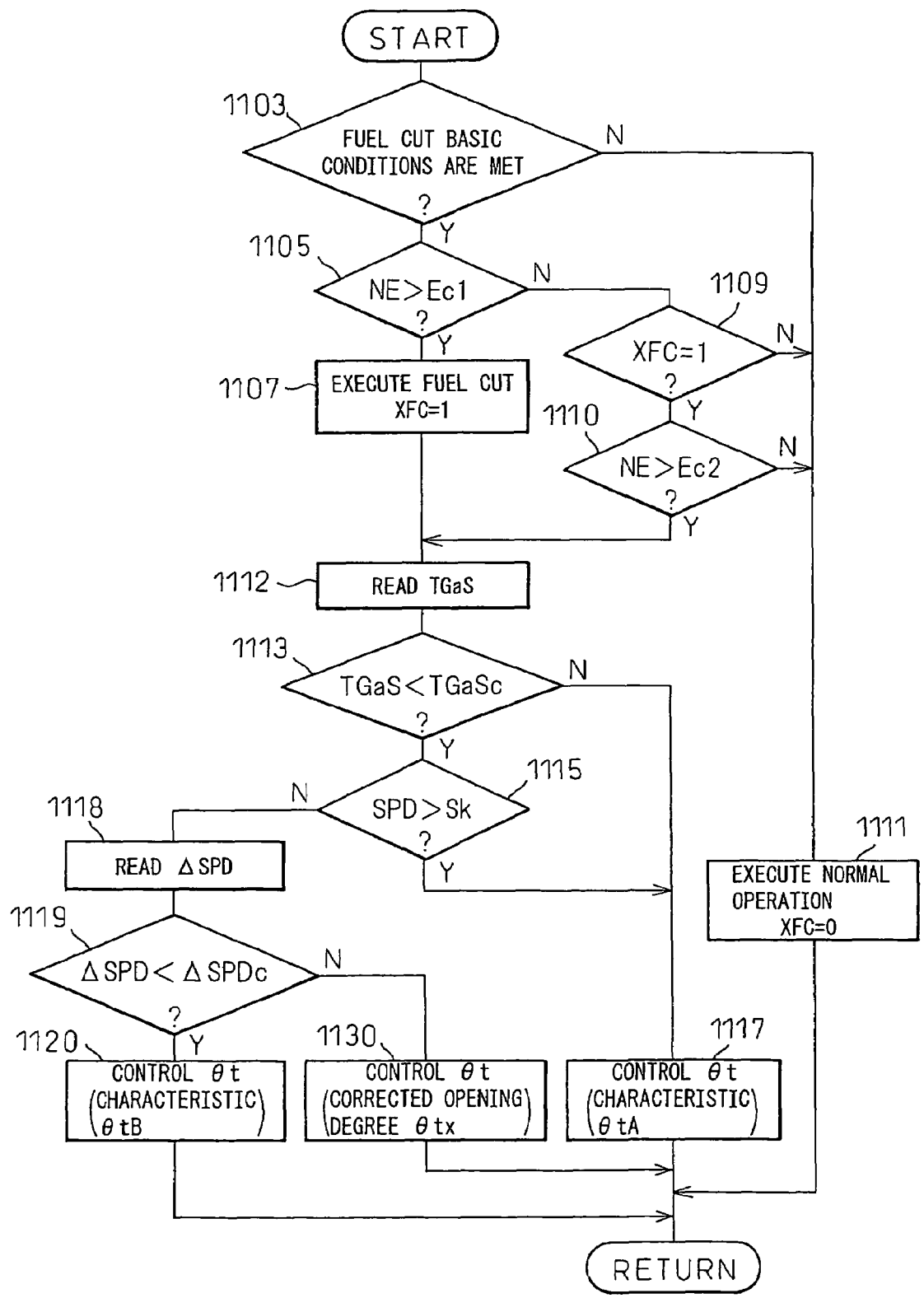
FIG. 19 is a flow chart showing a control routine of operation control executed in still another embodiment of the present invention.

Next, still another embodiment will be explained with reference to FIG. 19. In this embodiment, when the fuel cut is executed, the higher the vehicle speed, the smaller the intake air amount of the internal combustion engine is made. Further, in this embodiment, the greater the degree of deceleration in the decelerating state, the greater the intake air amount of the internal combustion engine is made when the fuel cut is executed. FIG. 19 is a flowchart showing an example of a control routine for executing such operational control.

Referring to FIG. 19, this control routine is substantially the same as the control routine shown in FIG. 2 at the beginning parts, but differs in the control routine of the steps to which the route proceeds after step 1107 corresponding to step 107 of FIG. 2 where a fuel cut is executed and a fuel cut execute flag XFC is made "1" and to which the routine proceeds when it is judged at step 1110 corresponding to step 110 of FIG. 2 that the engine rotational speed NE is larger than a predetermined second engine rotational speed Ec2.

That is, in this control routine, when a fuel cut is executed and the fuel cut execute flag XFC is made "1" at step 1107 or when it is judged that the engine rotational speed NE is larger than a predetermined second engine rotational speed Ec2 at step 1110, the routine proceeds to step 1112. Further, at step 1112 the cumulative value TGaS of the intake air amount after the end of the fuel increment operation is read. When the cumulative value TGaS is read at step 1112, the routine proceeds to step 1113 where it is judged if the cumulative value TGaS is less than a predetermined cumulative value TGaSc.

As explained above, a "fuel increment operation" is an operation wherein the fuel is increased and the combustion air-fuel ratio is made rich for the purpose of increasing the output and/or lowering the catalyst temperature. If this fuel increment operation is performed, the catalyst becomes a reduced state, so the cumulative value TGaS of the intake air amount after the end of the fuel increment operation is considered to be proportional to the amount of oxygen held in the catalyst 7.

Therefore, in the present embodiment, the cumulative value TGaS is used as an indicator showing the amount of oxygen held in the catalyst 7 and that cumulative value TGaS is used for determining the control of the intake air amount of the internal combustion engine during a fuel cut, that is, the control of the amount of air flowing through the catalyst so as to enable more suitable control. The judgment at step 1113 is performed for this purpose. The cumulative value TGaSc is suitably set so that this object is achieved considering the relationship with the control of the throttle valve opening degree $\theta t$ explained later.

When it is judged at step 1113 that the cumulative value TGaS is less than the predetermined cumulative value TGaSc, the routine proceeds to step 1115. At step 1115, it is judged if the current vehicle speed SPD is higher than a predetermined vehicle speed Sk. This judgment is performed so as to determine the control of the intake air amount of the internal combustion engine, that is, the control of the amount of air flowing through the catalyst, for the time that a fuel cut is executed, based on the vehicle speed SPD, and thereby enable more suitable control. The vehicle speed Sk is suitably set so that this object is achieved while considering the relationship with the control of the throttle valve opening degree $\theta t$ explained later.

When it is judged at step 1113 that the cumulative value TGaS is the predetermined cumulative value TGaSc or more or when it is judged at step 1115 that the vehicle speed SPD is higher than a predetermined vehicle speed Sk, the routine proceeds to step 1117. When the routine proceeds to step 1117, the throttle valve opening degree $\theta t$ is controlled in accordance with a predetermined opening degree characteristic $\theta tA$ and the control routine ends (more specifically, the control routine is executed again from the start).

Figure 20:
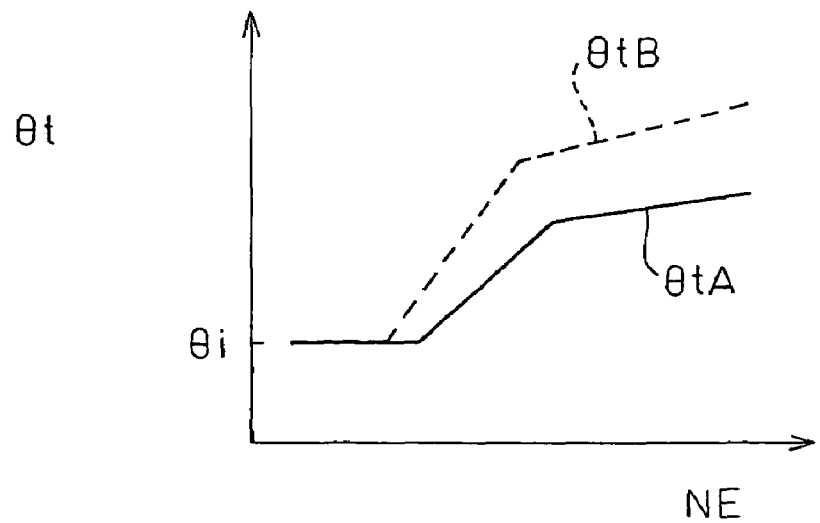
FIG. 20 is a view showing the opening degree characteristic θtA and opening degree characteristic θtB of throttle valve opening degree θt.

Here, the opening degree characteristic $\theta tA$ is, for example, the characteristic of the throttle valve opening degree $\theta t$ with respect to the engine rotational speed NE shown by the solid line in for example FIG. 20. That is, in this case, at step 1117, the throttle valve opening degree $\theta t$ is controlled to the throttle valve opening degree determined in accordance with the engine rotational speed NE at that time based on the opening degree characteristic $\theta tA$ shown in FIG. 20.

The opening degree characteristic $\theta tA$ shown in FIG. 20 is the tendency that the larger the engine rotational speed NE, the larger the throttle valve opening degree $\theta t$. Further, compared with the later explained opening degree characteristic $\theta tB$, at the same engine rotational speed NE, the throttle valve opening degree $\theta t$ is made smaller. That is, compared with the later explained opening degree characteristic $\theta tB$, at the same engine rotational speed NE, the intake air amount Ga of the internal combustion engine becomes smaller. Note that the $\theta i$ in FIG. 20 is the throttle valve opening degree when the internal combustion engine is in the idling state.

On the other hand, when it is judged at step 1115 that the vehicle speed SPD is the predetermined vehicle speed Sk or less, the routine proceeds to step 1118. At step 1118, the acceleration $\Delta SPD$ of the vehicle (or deceleration degree) is read. When the acceleration $\Delta SPD$ is read at step 1118, the routine proceeds to step 1119 where it is judged if the acceleration $\Delta SPD$ is less than a predetermined acceleration $\Delta SPDc$.

This judgment is performed to determine the control of the intake air amount of the internal combustion engine, that is, the control of the amount of air flowing through the catalyst, for the time that a fuel cut is executed, based on the acceleration $\Delta SPD$ of the vehicle (or deceleration degree), to thereby enable more suitable control. The predetermined acceleration $\Delta SPDc$ is a negative value suitably set so that this object is achieved while considering the later explained relationship with the control of the throttle valve opening degree $\theta t$.

When it is judged at step 1119 that the acceleration $\Delta SPD$ is less than a predetermined acceleration $\Delta SPDc$, that is, the degree of deceleration of the vehicle is larger than a predetermined deceleration degree $\Delta SPDc$, the routine proceeds to step 1120. When the routine proceeds to step 1120, the throttle valve opening degree $\theta t$ is controlled in accordance with the predetermined opening degree characteristic $\theta tB$ and the control routine ends (more specifically, the control routine is executed again from the start).

Here, the opening degree characteristic $\theta tB$ is the characteristic of the throttle valve opening degree $\theta t$ with respect to the engine rotational speed NE shown by the dotted line in for example FIG. 20. That is, in this case, at step 1120, the throttle valve opening degree $\theta t$ is controlled based on the opening degree characteristic $\theta tB$ shown in FIG. 20 to the throttle valve opening degree determined in accordance with the engine rotational speed NE at that time.

The opening degree characteristic $\theta tB$ shown in FIG. 20, as in the above-mentioned valve opening characteristic $\theta tA$, is the tendency that the larger the engine rotational speed NE, the larger the throttle valve opening degree $\theta t$. Further, compared with the opening degree characteristic $\theta tA$, at the same engine rotational speed NE, the throttle valve opening degree $\theta t$ becomes greater. That is, compared with the opening degree characteristic $\theta tA$, at the same engine rotational speed NE, the intake air amount Ga of the internal combustion engine becomes greater.

On the other hand, if it is judged at step 1119 that the acceleration $\Delta SPD$ is a predetermined acceleration $\Delta SPDc$ or more, that is, the degree of deceleration of the vehicle is the same as a predetermined deceleration degree $\Delta SPDc$ or smaller, the routine proceeds to step 1130. When the routine proceeds to step 1130, the throttle valve opening degree $\theta t$ is controlled to the corrected opening degree θtx found as explained below and the control routine ends (more specifically, the control routine is executed again from the start).

Figure 21:
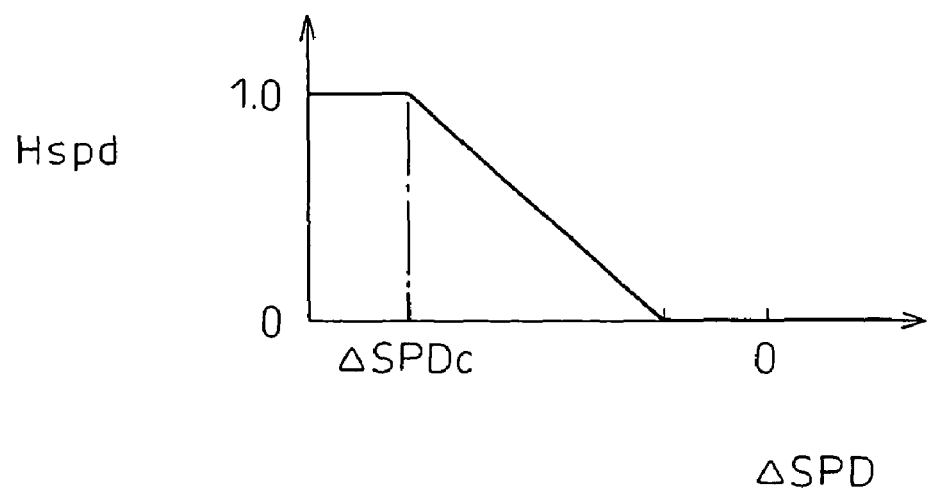
FIG. 21 is a map for finding the correction coefficient Hspd based on the acceleration ΔSPD (or deceleration degree) of the vehicle.

That is, here, the corrected opening degree θtx is found by the following equation (1).

$$\theta tx = (\theta tb - \theta ta) Hspd + \theta ta \qquad (1)$$

where, θta is the throttle valve opening degree found in accordance with the engine rotational speed NE at that time based on the opening degree characteristic θtA, θtb is the throttle valve opening degree found in accordance with the engine rotational speed NE at that time based on the opening degree characteristic θtB, and Hspd is a correction coefficient found based on the acceleration ΔSPD. This correction coefficient Hspd is found based on a map such as shown in for example FIG. 21 prepared in advance.

As explained above, when the vehicle speed is in the high speed region, in general the catalyst temperature is high and catalyst deterioration easily occurs accompanying the fuel cut. On the other hand, when the vehicle speed is in the medium or low speed region, the vehicle speed may fall considerably or the vehicle may be stopped and the problem of odor after deceleration is feared. In this connection, as clear from the above explanation, when executing the control routine shown in FIG. 19, when the fuel cut is executed, the higher the speed of the vehicle, the smaller the intake air amount Ga of the internal combustion engine. That is, when the fuel cut is executed and the vehicle speed SPD is relatively high, the intake air amount Ga is reduced and thereby the amount of air flowing through the catalyst is reduced, while when the fuel cut is executed and the vehicle speed SPD is in the medium or low speed region, the intake air amount Ga is made larger and thereby the amount of air flowing through the catalyst is made larger.

Therefore, by doing this, when the vehicle speed is in the high speed region where catalyst deterioration easily occurs, the catalyst is prevented from being placed in an excess oxygen state and the occurrence of catalyst deterioration can be suppressed, while when the vehicle speed is in the medium or low speed region where the problem of odor after deceleration is feared, the catalyst can be supplied with sufficient oxygen and after deceleration the state where the sulfur oxides which had been held in the catalyst become hydrogen sulfide and are easily released to the outside can be suppressed and therefore the generation of an odor after deceleration can be suppressed. That is, by the present embodiment, the deterioration of the catalyst provided in the exhaust system of the internal combustion engine accompanying a fuel cut can be suppressed and the generation of an odor after deceleration can be suppressed.

Further, the larger the degree of deceleration of the vehicle, the shorter the time until the vehicle stops, so to reliably suppress generation of an odor, the larger the degree of deceleration of the vehicle, the shorter the time in which a sufficient amount of air has to be passed to the catalyst. In this connection, as clear from the above explanation, when executing the control routine shown in FIG. 19, the larger the degree of deceleration in the decelerating state, the greater the intake air amount of the internal combustion engine is made when the fuel cut is executed and thereby the greater the amount of air flowing through the catalyst. Due to this, the larger the degree of deceleration, the greater the amount of air which can flow through the catalyst in a certain time and as a result the shorter the time in which a sufficient amount of air can flow through to the catalyst, so it is possible to reliably suppress generation of an odor.

Note that, in a modified embodiment of the present embodiment, a control omitted step 1112 and step 1113 in the control routine of FIG. 19 may be executed. In this case, after step 1107 or when it is judged at step 1110 that the engine rotational speed NE is larger than the second engine rotational speed Ec2, the routine proceeds to step 1115.

Further, in another modified embodiment, a control omitted step 1115 may be executed. In this case, when it is judged at step 1113 that the cumulative value TGaS is less than the predetermined cumulative value TGaSc, the routine proceeds to step 1118. In this case as well, generation of an odor can be suppressed.

Further, in still another modified embodiment, a control omitted step 1112, step 1113, and step 1115 may be executed. In this case, after step 1107 or when it is judged at step 1110 that the engine rotational speed NE is larger than the second engine rotational speed Ec2, the routine proceeds to step 1118. Note that, in this case, step 1117 is also omitted.

Next, the case where the second engine rotational speed Ec2 used in the control of the above-mentioned embodiments is determined on each occasion and takes various types of values will be explained. That is, as explained above, if the engine rotational speed NE of the internal combustion engine becomes this second engine rotational speed Ec2 or less in the state where a fuel cut is being performed, the fuel cut is suspended and normal operation is started. Therefore, this second engine rotational speed Ec2 can be said to be the fuel cut suspension rotational speed. Further, this fuel cut suspension rotational speed Ec2 may be a predetermined constant rotational speed or may be determined on each occasion in accordance with the operating conditions etc. and take various types of values.

That is, for example, the greater the intake air amount Ga of the internal combustion engine when a fuel cut is in progress, the lower the chance of the engine stalling when suspending the fuel cut (resuming fuel supply). For this reason, in this case, the fuel cut suspension rotational speed Ec2 can be set low. Further, if the fuel cut suspension rotational speed Ec2 is set low, the fuel cut execution time becomes longer by that extent, so a greater amount of air can flow through the catalyst and the generation of an odor can be suppressed more reliably. That is, by setting the fuel cut suspension rotational speed Ec2 according to the intake air amount Ga of the internal combustion engine when a fuel cut is in progress, more specifically, by setting the fuel cut suspension rotational speed Ec2 lower the higher the intake air amount Ga of the internal combustion engine when a fuel cut is in progress Ga, the generation of an odor can be suppressed more reliably.

Note that, when the fuel cut suspension rotational speed Ec2 is determined on each occasion and takes various types of values in this way, the latest fuel cut suspension rotational speed Ec2 at that time is used in the control (that is, for example, step 110 of FIG. 2).

Figure 22:
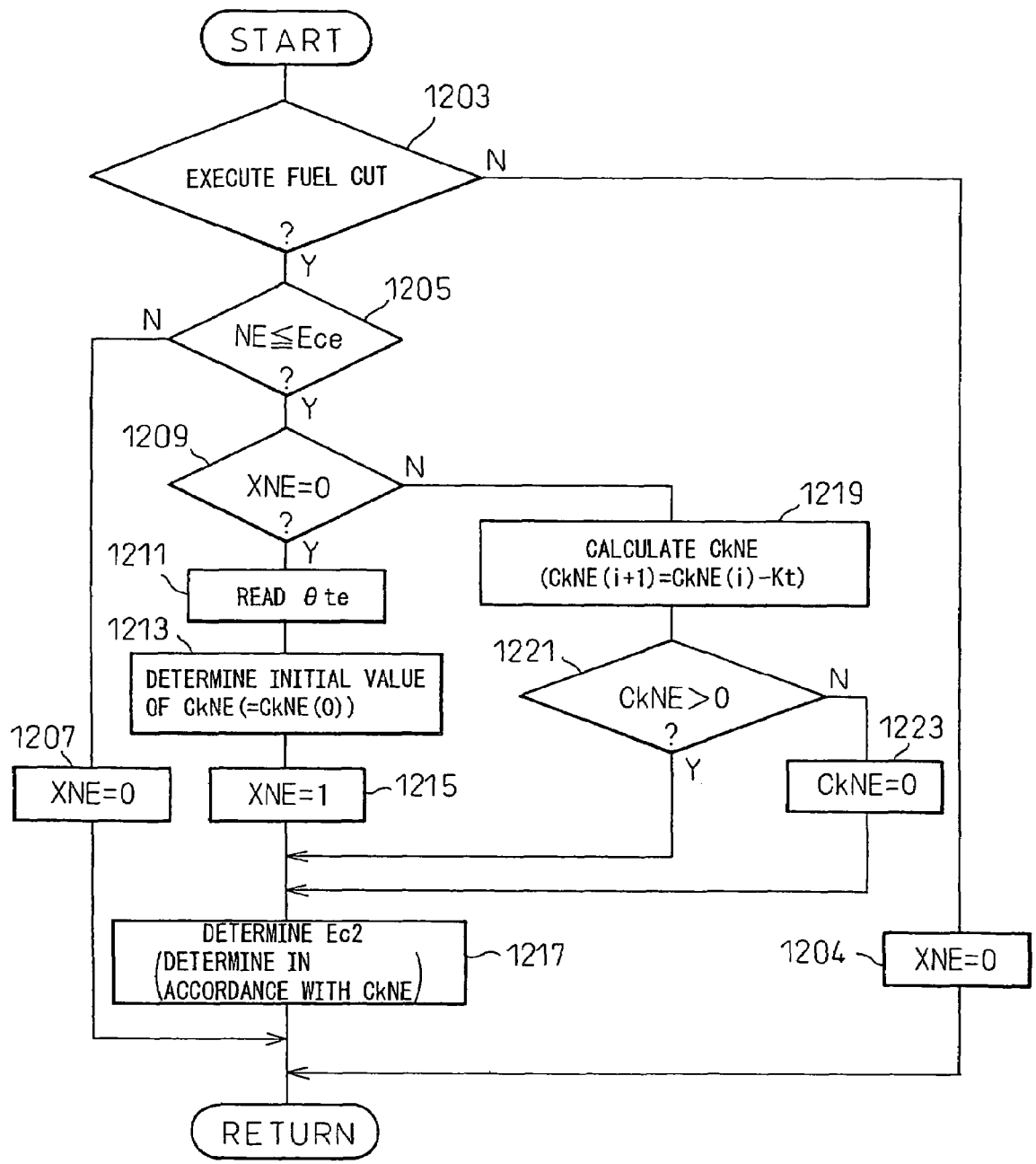
FIG. 22 is a flowchart showing the control routine for control for determining the fuel cut suspension rotational speed.

FIG. 22 is a flowchart showing an example of a control routine for execution of control for determining the fuel cut suspension rotational speed Ec2 on each occasion. This control routine is executed by the ECU 8 by interruption every certain time period.

When this control routine is started, first at step 1203, it is judged if a fuel cut is in progress. If it is judged at step 1203 that a fuel cut is not in progress, the routine proceeds to step 1204 where a suspension rotational speed setting flag XNE is set to "0" and the control routine ends (more specifically, the control routine is executed again from the start). On the other hand, when it is judged at step 1203 that a fuel cut is in progress, the routine proceeds to step 1205. At step 1205, it is judged if the engine rotational speed NE is a predetermined engine rotational speed Ece or less.

Here, the engine rotational speed Ece is a rotational speed higher than the highest rotational speed in the range where the fuel cut suspension rotational speed Ec2 may be set and is made a rotational speed of the first engine rotational speed Ec1 or more (that is, for example, is made the first engine rotational speed Ec1). This is because in the control of the above-mentioned embodiments, when the engine rotational speed NE becomes the first engine rotational speed Ec1 or less, there is a possibility of suspension of the fuel cut.

When it is judged at step 1205 that the engine rotational speed NE is larger than the engine rotational speed Ece, the routine proceeds to step 1207 where the suspension rotational speed setting flag XNE is made "0" and the control routine ends (more specifically, the control routine is executed again from the start). On the other hand, when it is judged at step 1205 that the engine rotational speed NE is the engine rotational speed Ece or less, the routine proceeds to step 1209 where it is judged if the suspension rotational speed setting flag is "0".

Figure 23:
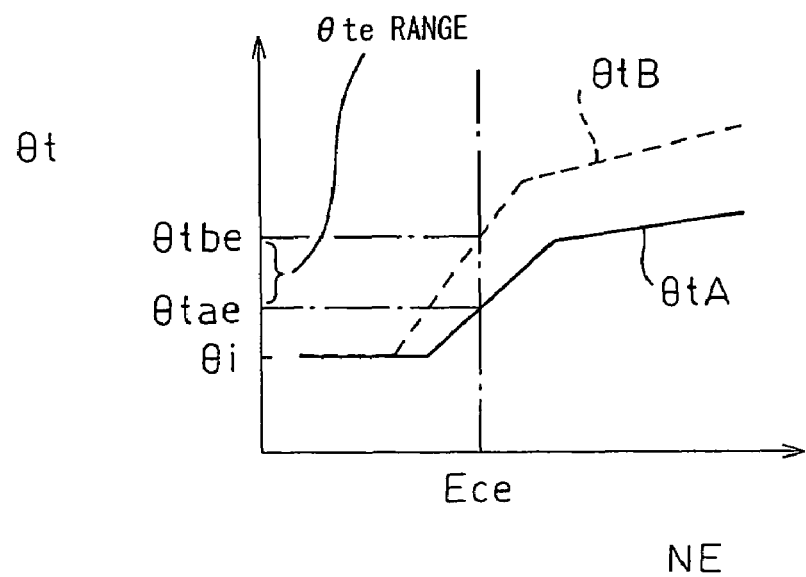
FIG. 23 is an explanatory view of the throttle valve opening degree θte for when the engine rotational speed NE becomes a predetermined engine rotational speed Ece.

When it is judged at step 1209 that the suspension rotational speed setting flag is "0", the routine proceeds to step 1211. At step 1211, the throttle valve opening degree θte of when the engine rotational speed NE becomes the engine rotational speed Ece is read. Here, for example, if the throttle valve opening degree θt for the time that a fuel cut is executed is controlled like in the embodiment explained with reference to FIG. 19, the throttle valve opening degree θte, as shown in FIG. 23, is present between the throttle valve opening degree θtae at the time of the engine rotational speed Ece based on the opening degree characteristic θtA and the throttle valve opening degree θtbe at the time of the engine rotational speed Ece based on the opening degree characteristic θtB.

Figure 24:
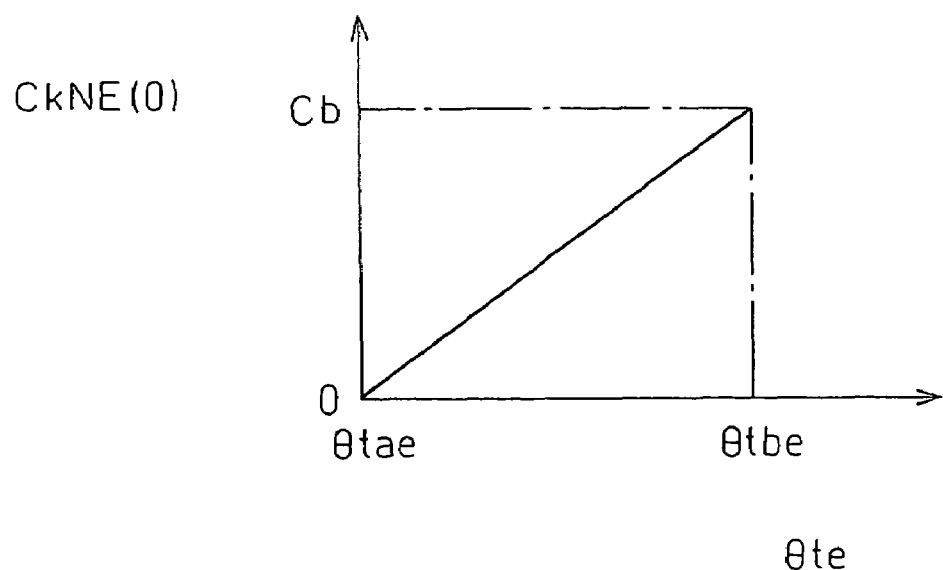
FIG. 24 is a map for finding an initial value of the suspension rotational speed correction index CkNE (that is, CkNE (0)) based on the throttle valve opening degree θte.

When the throttle valve opening degree θte is read at step 1211, the routine proceeds to step 1213. At step 1213, the initial value of the suspension rotational speed correction index CkNE (that is, CkNE(0)) is determined based on the throttle valve opening degree θte read at step 1211. This initial value CkNE(0) is determined based on a map prepared in advance for finding the suitable initial value CkNE(0) corresponding to an opening degree from the throttle valve opening degree θte as shown in for example FIG. 24. In the map shown in FIG. 24, the larger the throttle valve opening degree θte, the larger the initial value CkNE(0) as well. Further, when the throttle valve opening degree θte is the throttle valve opening degree θtae, the value of the initial value CkNE (0) becomes 0, while when the throttle valve opening degree θte is the throttle valve opening degree θtbe, the value of the initial value CkNE(0) becomes Cb.

When the initial value of the suspension rotational speed correction index CkNE (that is, CkNE(0)) is determined at step 1213, the routine proceeds to step 1215 where the suspension rotational speed setting flag XNE is set to "1" and further the routine proceeds to step 1217.

On the other hand, when it is judged at step 1209 that the suspension rotational speed setting flag is not "0" that is, it is "1", the routine proceeds to step 1219. Note that here when it is judged that the suspension rotational speed setting flag is not "0", that is, it is "1", the initial value of the suspension rotational speed correction index CkNE (that is, CkNE(0)) is already determined. At step 1219, the suspension rotational speed correction index CkNE is calculated. This suspension rotational speed correction index CkNE is calculated by subtracting a predetermined compliance constant Kt from the latest suspension rotational speed correction index CkNE at that time (CkNE(i+1)=CkNE(i)−Kt; is an integer of 0 or more). Here, the compliance constant Kt is a positive value.

When the suspension rotational speed correction index CkNE is calculated at step 1219, the routine proceeds to step 1221 where it is judged if the suspension rotational speed correction index CkNE is larger than 0. When it is judged at step 1221 that the suspension rotational speed correction index CkNE calculated at step 1219 is larger than 0, next the routine directly proceeds to step 1217. On the other hand, when it is judged at step 1221 that the suspension rotational speed correction index CkNE calculated at step 1219 is 0 or less, next first the routine proceeds to step 1223 where the suspension rotational speed correction index CkNE is made 0, then the routine proceeds to step 1217.

At step 1217, the fuel cut suspension rotational speed Ec2 is determined based on the latest suspension rotational speed correction index CkNE at that time. Note that when the routine proceeds from step 1215 to step 1217, the latest suspension rotational speed correction index CkNE at that time is the initial value CkNE(0).

Figure 25:
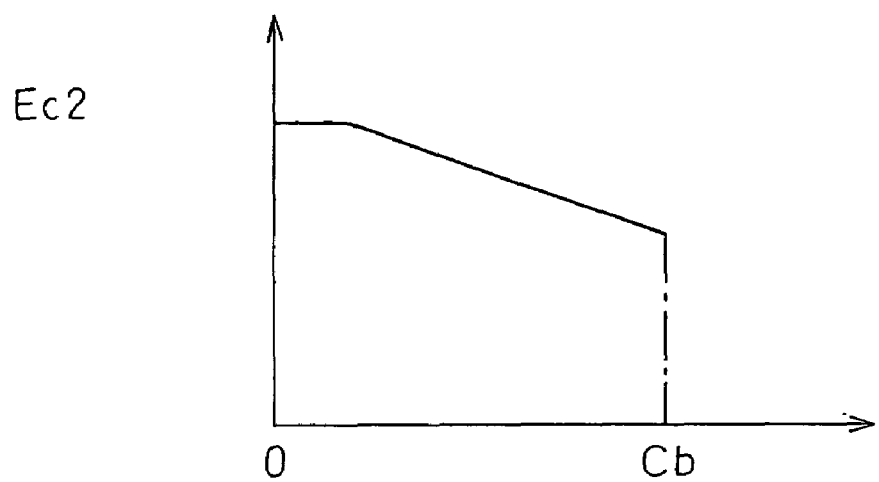
FIG. 25 is a map for finding the fuel cut suspension rotational speed Ec2 based on the suspension rotational speed correction index CkNE.

The fuel cut suspension rotational speed Ec2 is determined at step 1217 based on a map prepared in advance for finding a suitable fuel cut suspension rotational speed Ec2 corresponding to a correction index from the suspension rotational speed correction index CkNE shown in for example FIG. 25. Note that, when using the map shown in FIG. 25, there is a tendency that the larger the suspension rotational speed correction index CkNE, the smaller the fuel cut suspension rotational speed Ec2. When the fuel cut suspension rotational speed Ec2 is determined at step 1217, the control routine ends once and is executed again from the start.

Note that, as clear from the above explanation, when a fuel cut is continued while the engine rotational speed NE is the engine rotational speed Ece or less, each time the control routine shown in FIG. 22 is executed, the value of the suspension rotational speed correction index CkNE is reduced by exactly the compliance constant Kt and the set fuel cut suspension rotational speed Ec2 is made larger by that extent. This corresponds to the drop in the intake air amount Ga of the internal combustion engine for the time that a fuel cut is executed after the engine rotational speed NE has fallen to the engine rotational speed Ece, that is, after determining the initial value (0) of the suspension rotational speed correction index CkNE. The compliance constant Kt is determined in advance by experiments etc. so that a suitable fuel cut suspension rotational speed Ec2 can be found corresponding to the drop in the intake air amount Ga of the internal combustion engine.

As clear from the above explanation, when the control routine shown in FIG. 22 is executed, the larger the throttle valve opening degree θt when a fuel cut is in progress, that is, the greater the intake air amount Ga of the internal combustion engine when a fuel cut is in progress, the lower the fuel cut suspension rotational speed Ec2 is set.

As explained above, the greater the intake air amount Ga of the internal combustion engine when a fuel cut is in progress, the less a chance of the engine stalling when the fuel cut is suspended (when fuel supply is resumed), so the fuel cut suspension rotational speed Ec2 can be set low. Further, if setting the fuel cut suspension rotational speed Ec2 low, the fuel cut execution time becomes longer by that extent, so a greater amount of air can be made to flow through the catalyst and generation of an odor can be reliably suppressed. From this, by determining the fuel cut suspension rotational speed Ec2 in accordance with the control routine of FIG. 22, the generation of an odor from the catalyst can be suppressed more reliably.

Figure 26:
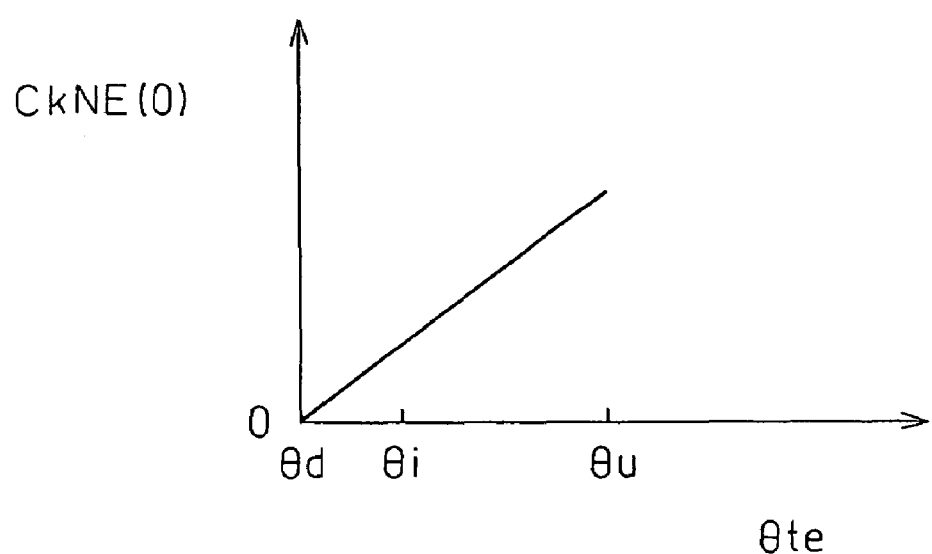
FIG. 26 is another map for finding an initial value of the suspension rotational speed correction index CkNE (that is, CkNE(0)) based on the throttle valve opening degree θte.
Figure 27:
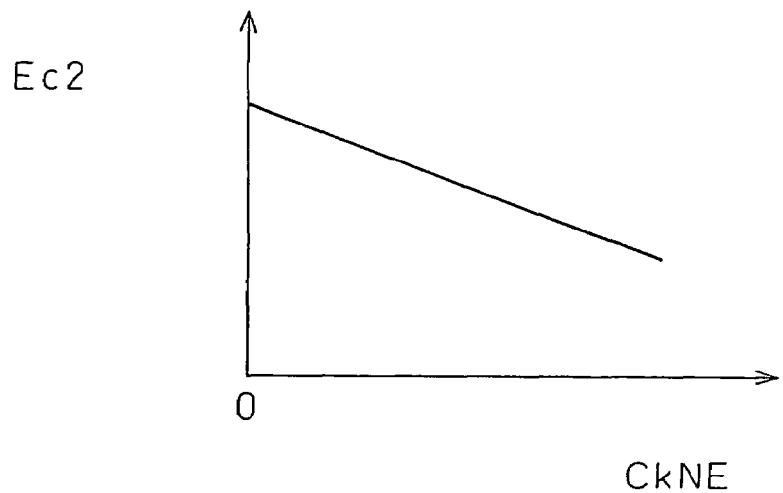
FIG. 27 is another map for finding the fuel cut suspension rotational speed Ec2 based on the suspension rotational speed correction index CkNE.

Further, in some of the embodiments explained above, when the fuel cut is executed, the throttle valve opening degree θt is controlled to be between a predetermined opening degree θd smaller than the opening degree θi of when the internal combustion engine is in the idling state and a predetermined opening degree θu larger than the opening degree θi of when the internal combustion engine is in the idling state. In this case, at step 1213, to determine the initial value of the suspension rotational speed correction index CkNE (that is, CkNE(0)), the map as shown in FIG. 26 can be used, while at step 1217, to determine the fuel cut suspension rotational speed Ec2, the map as shown in FIG. 27 can be used. In the map shown in FIG. 26, the larger the throttle valve opening degree θte, the larger the initial value CkNE(0). Further, when using the map shown in FIG. 27, the larger the suspension rotational speed correction index CkNE, the smaller the fuel cut suspension rotational speed Ec2. These maps are prepared in advance so that a suitable initial value CkNE(0) and fuel cut suspension rotational speed Ec2 can be found.

A detailed explanation will be omitted since this is probably clear from the explanation up to here, but in this case, when a fuel cut is in progress, if making the intake air amount Ga of the internal combustion engine larger than the intake air amount Gai of when the internal combustion engine is in the idling state, the fuel cut suspension rotational speed Ec2 is set lower compared to when making the intake air amount Ga of the internal combustion engine smaller than the intake air amount Gai of when the internal combustion engine is in the idling state.

When a fuel cut is in progress, if making the intake air amount Ga of the internal combustion engine larger than the intake air amount Gai of when the internal combustion engine is in the idling state, the chance of the engine stalling when the fuel cut is suspended (when the supply of fuel is resumed) becomes lower by exactly the greater amount of intake air amount. For this reason, in this case, the fuel cut suspension rotational speed Ec2 can be set lower compared with when making the intake air amount Ga of the internal combustion engine smaller than the intake air amount Gai of when the internal combustion engine is in the idling state. Further, if setting the fuel cut suspension rotational speed low, as explained above, the fuel cut execution time becomes longer by that amount, so a greater amount of air can be made to flow through the catalyst and the generation of an odor can be suppressed more reliably. Due to this, by using FIG. 26 and FIG. 27 to determine the fuel cut suspension rotational speed Ec2 in accordance with the control routine of FIG. 22, the generation of an odor from the catalyst can be suppressed more reliably.

Figure 28:
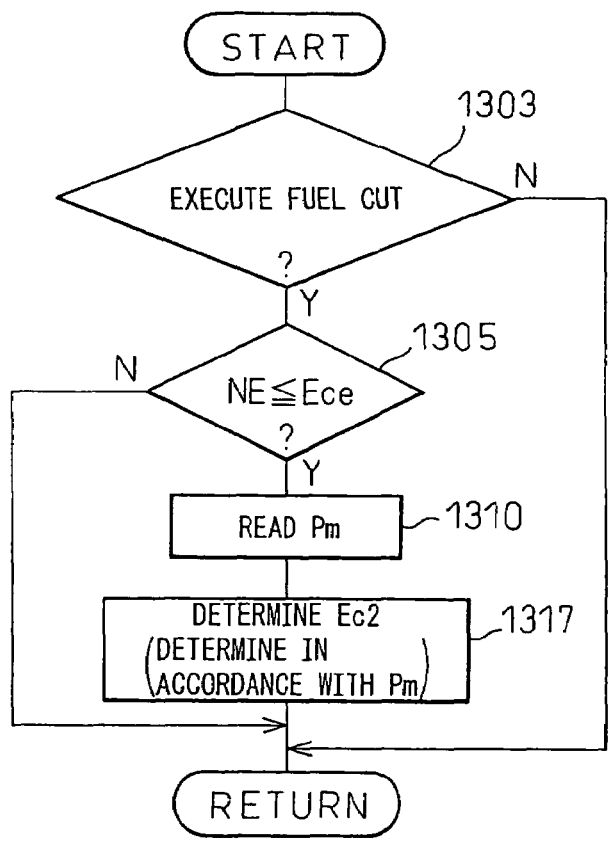
FIG. 28 is a flowchart showing a control routine of other control for determining the fuel cut suspension rotational speed.

Further, when there is an intake pipe pressure sensor or other means for detecting or estimating the intake pipe pressure Pm, the control in accordance with the control routine shown in FIG. 28 may be used to determine the fuel cut suspension rotational speed Ec2. This control routine is also executed by the ECU 8 by interruption every certain time period.

When this control routine is started, first at step 1303, it is judged if a fuel cut is in progress. The control at this step is the same as the control at the above-mentioned step 1203. When it is judged at step 1303 that a fuel cut is not in progress, the control routine ends once and is executed again from the start. On the other hand, when it is judged at step 1303 that a fuel cut is in progress, the routine proceeds to step 1305. At step 1305, it is judged if the engine rotational speed NE is a predetermined engine rotational speed Ece or less. The control at this step is the same as the control at the above-mentioned step 1205.

When it is judged at step 1305 that the engine rotational speed NE is larger than the engine rotational speed Ece, the control routine is ended once and executed again from the start. On the other hand, when it is judged at step 1305 that the engine rotational speed NE is the engine rotational speed Ece or less, the routine proceeds to step 1310 where the intake pipe pressure Pm at that time is read.

Figure 29:
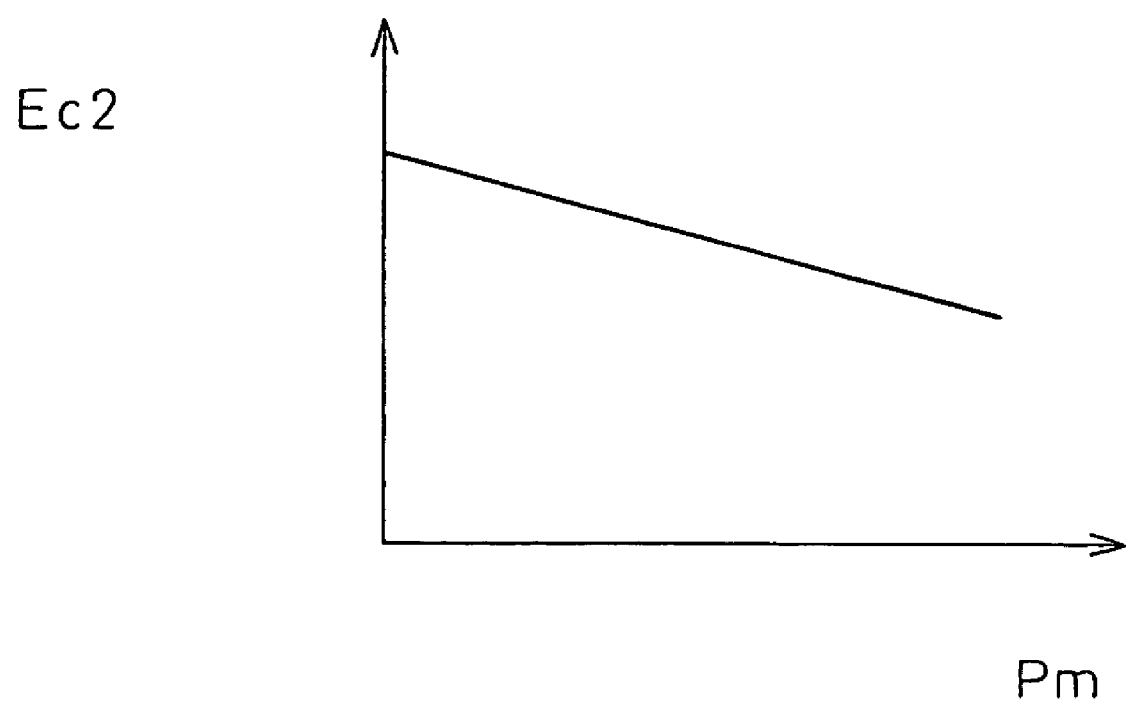
FIG. 29 is a map for finding the fuel cut suspension rotational speed Ec2 based on the intake pipe pressure Pm.

When the intake pipe pressure Pm is read at step 1310, the routine proceeds to step 1317. At step 1317, the fuel cut suspension rotational speed Ec2 is determined based on the intake pipe pressure Pm read at step 1310. This fuel cut suspension rotational speed Ec2 is determined based on a map prepared in advance so that a suitable fuel cut suspension rotational speed Ec2 corresponding to an intake pipe pressure can be found from the intake pipe pressure Pm as shown in for example FIG. 29. In the map shown in FIG. 29, the larger the intake pipe pressure Pm, the smaller the fuel cut suspension rotational speed Ec2. When the fuel cut suspension rotational speed Ec2 is determined at step 1317, the control routine is ended once and executed again from the start.

Here, considering the fact that the intake pipe pressure Pm is substantially proportional to the intake air amount Ga of the internal combustion engine, from the above explanation, when the control routine shown in FIG. 28 is executed, it is clear that the greater the intake air amount Ga of the internal combustion engine when a fuel cut is in progress, the lower the fuel cut suspension rotational speed Ec2 is set. Further, as explained above, by determining the fuel cut suspension rotational speed Ec2 in this way, the generation of an odor from the catalyst can be reliably suppressed.

Note that in another embodiment, step 1305 in the control routine of FIG. 28 may also be omitted. That is, in this case, when it is judged at step 1303 that a fuel cut is in progress, the routine proceeds to step 1310. By doing this, the fuel cut suspension rotational speed Ec2 is set, regardless of the engine rotational speed NE, at any time (that is, repeated each time the control routine is executed) while a fuel cut is executed.

Note that, above, as the means for controlling the intake air amount at the time of normal operation and at the time of idling, the case of use of a throttle valve was explained as an example, but the present invention is not limited to this. That is, the present invention may also be applied for the case where another intake air amount controlling means (for example, an idling intake air amount correction valve or a variable operation valve mechanism) is used.

Further, the controls (or characterizing parts thereof) in the above explained embodiments may be suitably combined. That is, for example, the control of the intake air amount Ga of the embodiment explained with reference to FIG. 18, considering also the rotational speed NE of the internal combustion engine, may be combined with control in another embodiment.

Note that, above, the present invention was explained in detail based on specific embodiments, but a person skilled in the art could make various changes, modifications, etc. without departing from the scope of the claims and ideas of the present invention.

The invention claimed is:

1. A control system for controlling an internal combustion engine with an exhaust system provided with a catalyst, comprising a fuel cut means for executing a fuel cut stopping the supply of fuel to said internal combustion engine when the vehicle in which said internal combustion engine is mounted is in a decelerating state, the control system of an internal combustion engine characterized in that, in the case that said fuel cut is executed, when the speed of said vehicle is higher than a predetermined first vehicle speed, the intake air amount of said internal combustion engine is made smaller than the intake air amount of when said internal combustion engine is in the idling state, while when the speed of said vehicle is said first vehicle speed or less, the intake air amount of said internal combustion engine is made larger than the intake air amount of when said internal combustion engine is in the idling state.

2. A control system of an internal combustion engine as set forth in claim 1, wherein the intake air amount of said internal combustion engine is controlled by a throttle valve and wherein, in the case that said fuel cut is executed, when said vehicle speed is higher than said first vehicle speed, the opening degree of the throttle valve is made smaller than the opening degree of when said internal combustion engine is in the idling state, while when said vehicle speed is said first vehicle speed or less, the opening degree of the throttle valve is made greater than the opening degree of when said internal combustion engine is in the idling state.

3. A control system of an internal combustion engine as set forth in claim 1, wherein, in the case that said fuel cut is executed, when said vehicle speed is higher than said first vehicle speed or a rotational speed of said internal combustion engine is higher than a predetermined rotational speed, the intake air amount of said internal combustion engine is made smaller than the intake air amount of when said internal combustion engine is in the idling state, while when said vehicle speed is said first vehicle speed or less and a rotational speed of said internal combustion engine is said predetermined rotational speed or less, the intake air amount of said internal combustion engine is made greater than the intake air amount of when said internal combustion engine is in the idling state.

4. A control system of an internal combustion engine as set forth in claim 3, wherein the intake air amount of said internal combustion engine is controlled by a throttle valve and wherein, in the case that said fuel cut is executed, when said vehicle speed is higher than said first vehicle speed or a rotational speed of said internal combustion engine is higher than said predetermined rotational speed, the opening degree of the throttle valve is made smaller than the opening degree of when said internal combustion engine is in the idling state, while when said vehicle speed is said first vehicle speed or less and a rotational speed of said internal combustion engine is said predetermined rotational speed or less, the opening degree of the throttle valve is made larger than the opening degree of when said internal combustion engine is in the idling state.

5. A control system for controlling an internal combustion engine with an exhaust system provided with a catalyst, comprising
a fuel cut means for executing a fuel cut stopping the supply of fuel to said internal combustion engine when the vehicle in which said internal combustion engine is mounted is in a decelerating state,
the control system of internal combustion engine characterized in that, in the case that said fuel cut is executed, when the speed of said vehicle is higher than a predetermined first vehicle speed, the intake air amount of said internal combustion engine is made smaller than the intake air amount of when said internal combustion engine is in the idling state, while when the speed of said vehicle is said first vehicle speed or less and higher than a predetermined second vehicle speed lower than said first vehicle speed, the intake air amount of said internal combustion engine is made larger than the intake air amount of when said internal combustion engine is in the idling state.

6. A control system of an internal combustion engine as set forth in claim 5, wherein the intake air amount of said internal combustion engine is controlled by a throttle valve and wherein, in the case that said fuel cut is executed, when the speed of said vehicle is higher than said first vehicle speed, the opening degree of the throttle valve is made smaller than the opening degree of when said internal combustion engine is in the idling state, while when the speed of said vehicle is said first vehicle speed or less and higher than said second vehicle speed, the opening degree of the throttle valve is made larger than the opening degree of when said internal combustion engine is in the idling state.

7. A control system for controlling an internal combustion engine with an exhaust system provided with a catalyst, comprising
a fuel cut means for executing a fuel cut stopping the supply of fuel to said internal combustion engine when a vehicle in which said internal combustion engine is mounted is in a decelerating state,
said control system of internal combustion engine characterized in that, in the case that said fuel cut is executed, when the speed of said vehicle is a predetermined first vehicle speed or less, the amount of air flowing through said catalyst is increased compared with when the speed of said vehicle is higher than said first vehicle speed.

8. A control system for controlling an internal combustion engine with an exhaust system provided with a catalyst, comprising
a fuel cut means for executing a fuel cut stopping the supply of fuel to said internal combustion engine when a vehicle in which said internal combustion engine is mounted is in a decelerating state,
said control system of internal combustion engine characterized in that, in the case that said fuel cut is executed, when the speed of said vehicle is higher than a predetermined first vehicle speed, the opening degree of the throttle valve is made smaller than the opening degree of when said internal combustion engine is in the idling state, while when the speed of said vehicle is said first vehicle speed or less, the opening degree of the throttle valve is made larger than the opening degree of when said internal combustion engine is in the idling state.

9. A control system of an internal combustion engine as set forth in claim 7, wherein in the case that said fuel cut is executed, when the speed of said vehicle is said first vehicle speed or less and the temperature of said catalyst is a predetermined catalyst temperature or less, the amount of air flowing through said catalyst is increased compared with when the speed of said vehicle is higher than said first vehicle speed or the temperature of said catalyst is higher than said predetermined catalyst temperature.

10. A control system of an internal combustion engine as set forth in claim 8, wherein in the case that said fuel cut is executed, when the speed of said vehicle is higher than said first vehicle speed or the temperature of said catalyst is higher than a predetermined catalyst temperature, the opening degree of the throttle valve is made smaller than the opening degree of when said internal combustion engine is in the idling state, while when the speed of said vehicle is said first vehicle speed or less and the temperature of said catalyst is said predetermined catalyst temperature or less, the opening degree of the throttle valve is made larger than the opening degree of when said internal combustion engine is in the idling state.

11. A control system for controlling an internal combustion engine with an exhaust system provided with a catalyst, comprising a fuel cut means for executing a fuel cut stopping the supply of fuel to said internal combustion engine when the vehicle in which said internal combustion engine is mounted is in a decelerating state, the control system of an internal combustion engine characterized in that, in the case that said fuel cut is executed, when the speed of said vehicle is a predetermined first vehicle speed or less and is higher than a predetermined second vehicle speed lower than said first vehicle speed, the amount of air flowing through said catalyst is increased compared with when the speed of said vehicle is higher than said first vehicle speed.

12. A control system for controlling an internal combustion engine with an exhaust system provided with a catalyst, comprising a fuel cut means for executing a fuel cut stopping the supply of fuel to said internal combustion engine when the vehicle in which said internal combustion engine is mounted is in a decelerating state, the control system of an internal combustion engine characterized in that, in the case that said fuel cut is executed, when the speed of said vehicle is higher than a predetermined first vehicle speed, the opening degree of the throttle valve is made smaller than the opening degree of when said internal combustion engine is in the idling state, while when the speed of said vehicle is said first vehicle speed or less and higher than a predetermined second vehicle speed lower than said first vehicle speed, the opening degree of the throttle valve is made larger than the opening degree of when said internal combustion engine is in the idling state.

13. A control system of an internal combustion engine as set forth in claim 1, wherein the smaller the amount of oxygen held in said catalyst, the higher said first vehicle speed is set.

14. A control system of an internal combustion engine as set forth in claim 1, wherein the greater the maximum oxygen holding amount of said catalyst, the higher said first vehicle speed is set.

15. A control system of an internal combustion engine as set forth in claim 1, wherein the greater the maximum oxygen holding amount of said catalyst or the larger the degree of deceleration in the decelerating state, the larger the intake air amount of said internal combustion engine when making the intake air amount of said internal combustion engine larger than the intake air amount of when said internal combustion engine is in the idling state.

16. A control system of an internal combustion engine as set forth in claim 1, wherein when the degree of deceleration is larger than a predetermined deceleration degree in said decelerating state, compared to when the degree of deceleration is said predetermined deceleration degree or less, the intake air amount of said internal combustion engine when the intake air amount of said internal combustion engine is made greater than the intake air amount of when said internal combustion engine is in the idling state is increased.

17. A control system of an internal combustion engine as set forth in claim 1, wherein when said brake is in an operating state in said decelerating state, compared to when said brake is in a nonoperating state, the intake air amount of said internal combustion engine when the intake air amount of said internal combustion engine is made greater than the intake air amount of when said internal combustion engine is in the idling state is increased.

18. A control system of an internal combustion engine as set forth in claim 1, wherein when the cumulative value of the intake air amount of said internal combustion engine when a fuel cut is in progress is a predetermined cumulative value of the intake air amount or more, the intake air amount of said internal combustion engine is prohibited from being made smaller than the intake air amount of when said internal combustion engine is in the idling state while said fuel cut is in progress.

19. A control system of an internal combustion engine as set forth in claim 2 wherein when the cumulative value of the intake air amount of said internal combustion engine when a fuel cut is in progress is a predetermined cumulative value of the intake air amount or more, the opening degree of the throttle valve is prohibited from being made smaller than the opening degree of when said internal combustion engine is in the idling state while said fuel cut is in progress.

20. A control system of an internal combustion engine as set forth in claim 7 wherein the greater the maximum oxygen holding amount of said catalyst or the greater the degree of deceleration in the decelerating state, the larger the amount of air flowing through said catalyst when making the amount of air flowing through said catalyst larger.

21. A control system of an internal combustion engine as set forth in claim 7 wherein when the degree of deceleration is larger than a predetermined deceleration degree in said decelerating state, compared to when the degree of deceleration is said predetermined deceleration degree or less, the amount of air flowing through said catalyst when increasing the amount of air flowing through said catalyst is made larger.

22. A control system of an internal combustion engine as set forth in claim 7 wherein when said brake is in an operating state in said decelerating state, compared to when said brake is in a nonoperating state, the amount of air flowing through said catalyst when making the amount of air flowing through said catalyst larger is made larger.

23. A control system of an internal combustion engine as set forth in claim 7 wherein when the cumulative value of the amount of air flowing through said catalyst when said fuel cut is in progress is a predetermined cumulative value of the catalyst flowing air amount or more, the amount of air flowing through said catalyst is prohibited from being made smaller than the amount of air flowing through said catalyst when said internal combustion engine is in the idling state while a fuel cut is in progress.

24. A control system of an internal combustion engine as set forth in claim 8 wherein the greater the maximum oxygen holding amount of said catalyst or the greater the degree of deceleration in the decelerating state, the greater the opening degree of the throttle valve when making the opening degree of the throttle valve larger than the opening degree of when said internal combustion engine is in the idling state.

25. A control system of an internal combustion engine as set forth in claim 8 wherein when the degree of deceleration is larger than a predetermined deceleration degree in said decelerating state, compared to when the degree of deceleration is said predetermined deceleration degree or less, the opening degree of the throttle valve when making the opening degree of the throttle valve larger than the opening degree of when said internal combustion engine is in the idling state is increased.

26. A control system of an internal combustion engine as set forth in claim 8 wherein when said brake is in an operating state in the decelerating state, compared to when said brake is in a nonoperating state, the opening degree of the throttle valve when making the opening degree of the throttle valve larger than the opening degree of when said internal combustion engine is in the idling state is increased.

27. A control system for controlling an internal combustion engine with an exhaust system provided with a catalyst, comprising
    a fuel cut means for executing a fuel cut stopping the supply of fuel to the internal combustion engine when a vehicle in which said internal combustion engine is mounted is in a decelerating state,
    the control system of internal combustion engine characterized in that, in the case that said fuel cut is executed, the higher the speed of said vehicle, the smaller the intake air amount of said internal combustion engine.

28. A control system of an internal combustion engine as set forth in claim 27, wherein the greater the degree of deceleration in the decelerating state, the greater the intake air amount of said internal combustion engine is made when said fuel cut is executed.

29. A control system of an internal combustion engine as set forth in claim 1 wherein said fuel cut is suspended when a rotational speed of said internal combustion engine becomes a predetermined fuel cut suspension rotational speed or less, and said fuel cut suspension rotational speed is set lower the greater the intake air amount of said internal combustion engine when said fuel cut is in progress.

30. A control system of an internal combustion engine as set forth in claim 29 wherein in the case that a fuel cut is in progress, when making the intake air amount of said internal combustion engine larger than the intake air amount of when said internal combustion engine is in the idling state, said fuel cut suspension rotational speed is set lower compared to when the intake air amount of said internal combustion engine is smaller than the intake air amount of when said internal combustion engine is in the idling state.

* * * * *